[US008811363B2](image)

(12) United States Patent  
Velasco

(10) Patent No.: US 8,811,363 B2  
(45) Date of Patent: Aug. 19, 2014

(54) NEXT GENERATION NETWORK SERVICES FOR 3G/4G MOBILE DATA OFFLOAD IN A NETWORK OF SHARED PROTECTED/LOCKED WI-FI ACCESS POINTS

(75) Inventor: Eduardo Velasco, Austin, TX (US)

(73) Assignee: Wavemax Corp., Austin, TX (US)

(*) Notice: Subject to any disclaimer, the term of this patent is extended or adjusted under 35 U.S.C. 154(b) by 135 days.

(21) Appl. No.: 13/610,739

(22) Filed: Sep. 11, 2012

(65) Prior Publication Data

US 2014/0071967 A1 Mar. 13, 2014

(51) Int. Cl.
*H04Q 7/24* (2006.01)
*H04W 84/12* (2009.01)
*H04W 84/18* (2009.01)
*H04W 80/04* (2009.01)

(52) U.S. Cl.
CPC .............. *H04W 84/12* (2013.01); *H04W 84/18* (2013.01); *H04W 80/04* (2013.01)
USPC ........................................................ 370/338

(58) Field of Classification Search
CPC ................. H04W 84/12–84/18; H04W 80/04; H04W 86/06; H04W 74/08
See application file for complete search history.

(56) References Cited

U.S. PATENT DOCUMENTS

| | | | | |
|---|---|---|---|---|
| 8,428,262 | B2* | 4/2013 | Shiraki | 380/270 |
| 8,442,556 | B2* | 5/2013 | Rawat et al. | 455/456.2 |
| 8,576,846 | B2* | 11/2013 | Kumar et al. | 370/392 |
| 2004/0008645 | A1 | 1/2004 | Janeski et al. | |
| 2005/0030377 | A1 | 2/2005 | Li | |
| 2006/0079228 | A1 | 4/2006 | Marsico et al. | |
| 2006/0140150 | A1 | 6/2006 | Olvera-Hernandez et al. | |
| 2008/0165740 | A1 | 7/2008 | Bachmann et al. | |
| 2008/0263628 | A1* | 10/2008 | Norman et al. | 726/1 |
| 2009/0054037 | A1 | 2/2009 | Kaippalimalil et al. | |
| 2009/0286534 | A1 | 11/2009 | Garg et al. | |
| 2010/0040016 | A1 | 2/2010 | Lor et al. | |
| 2011/0021190 | A1 | 1/2011 | Gunaratnam et al. | |
| 2011/0306364 | A1* | 12/2011 | Gossain et al. | 455/456.6 |
| 2012/0034922 | A1* | 2/2012 | Jones et al. | 455/438 |
| 2012/0044914 | A1 | 2/2012 | Chen et al. | |

(Continued)

FOREIGN PATENT DOCUMENTS

KR 10-2006-0032091 A 4/2006

OTHER PUBLICATIONS radio-electronics.com, 4G LTE Advanced Tutorial, Feb. 2011, http://www.radio-electronics.com/info/cellulartelecomms/lte-long-term-evolution/3gpp-4g-imt-lte-advanced-tutorial.php, retrieved from the Internet on Oct. 7, 2011.

(Continued)

*Primary Examiner* — Hassan Phillips
*Assistant Examiner* — Prenell Jones
(74) *Attorney, Agent, or Firm* — Michael G. Smith

(57) ABSTRACT

In some implementations, a Wi-Fi access point that is secured using WEP, WPA or WPA2 or other protection method(s) is further mapped, located and seamlessly accessed through a key that is preshared (PSK) by the Wi-Fi access point through a cloud based application over the Internet, thus a mobile device can access the Internet via the Wi-Fi access point using the PSK without the operator of the mobile device entering the PSK. The PSK is transmitted in encrypted form to the mobile device via a 3G/4G network.

20 Claims, 40 Drawing Sheets

(56) References Cited

U.S. PATENT DOCUMENTS

2012/0239500 A1* 9/2012 Monahan ............... 705/14.58
2012/0258674 A1* 10/2012 Livet et al. ................ 455/73
2013/0058274 A1* 3/2013 Scherzer et al. ........... 370/328
2013/0316705 A1* 11/2013 Kneckt et al. ............ 455/435.1

OTHER PUBLICATIONS wikipedia.com, IEEE 802.11, Oct. 7, 2011, http://en.wikipedia.org/wiki/IEEE_802.11, retrieved from the Internet on Oct. 7, 2011.
Liu et al., A Framework for Femtocells to Access Both Licensed and Unlicensed Bands, in Proceedings of the third International Workshop on Indoor and Outdoor Femto Cells (IOFC), Princeton, New Jersey, USA, May 13, 2011, http://wireless.poly.edu/attachment/wiki/Feilu_Liu/femtoWiOpt.pdf?format=raw, retrieved from the Internet, on Oct. 7, 2011.
wikipedia.com, Wi-Fi, Aug. 22, 2012, http://en.wikipedia.org/wiki/Wi-Fi, retrieved from the Internet on Aug. 23, 2012.
wikipedia.com, 3G, Aug. 18, 2012, http://en.wikipedia.org/wiki/3G, retrieved from the Internet on Aug. 23, 2012.
Dipl.-ing. Gerhard Fritze M.Sc., Customer Solution Manager, Ericsson Austria GMBH, SAE—The Core Network for LTE, http://www.3g4g.co.uk/Lte/SAE_Pres_0804_Ericsson.pdf, Apr. 10, 2008, http://www.3g4g.co.uk/Lte/SAE_Pres_0804_Ericsson.pdf, retrieved from the Internet on Aug. 25, 2012.
Webopedia, BTS, http://www.webopedia.com/TERM/B/BTS.html, retrieved from the Internet in Aug. 26, 2012.
wikipedia.com, Radio Network Controller, Aug. 3, 2012, http://en.wikipedia.org/wiki/Radio_Network_Controller, retrieved from the Internet in Aug. 26, 2012.
wikipedia.com, Node B, Aug. 16, 2012, http://en.wikipedia.org/wiki/Node_B, retrieved from the Internet in Aug. 26, 2012.
wikipedia.com, EnodeB, Aug. 5, 2012, http://en.wikipedia.org/wiki/EnodeB, retrieved from the Internet in Aug. 26, 2012.
wikipedia.com, Smartphone, Aug. 27, 2012, http://en.wikipedia.org/wiki/Smartphone, retrieved from the Internet in Aug. 27, 2012.
Wavesat Inc., EvolutiveTM WiMAX DM256 3.5 GHZ Reference Kit, Jun. 15, 2005.

* cited by examiner

1400

| NGN | Mobile Device | 3G/4G network | Access Point |
|---|---|---|---|
| Register mobile device 1202 | | | |
| Register shared Wi-Fi enabled access point 1204 | | | |
| | Display downloaded map of shared Wi-Fi-enabled access points within proximity of the device based on GPS of the device 902 | | |
| | Scan SSID beacons, reading the signal strength and protection method 904 | | |
| | transmit via a 3G/4G-network a request including GPS coordinates of the mobile device and user ID and PW to confirm scanned list of shared SSIDs to a NGN 906 | | |
| | | Receive from the mobile device a request for list of shared SSIDs using HTTPS and XML with list of SSIDS, the request including GPS coordinates of the mobile device user ID and PW 1302 | |
| | | transmit to NGN a request for list of shared SSIDs using HTTPS and XML with list of SSIDS, the request including GPS coordinates of the mobile device user ID and PW 1304 | |

| NGN | Mobile Device | 3G/4G network | Access Point |
|---|---|---|---|
| Receive from the mobile device via the 3G/4G-network a request for a list of shared SSIDs, the request Including GPS coordinates of the mobile device user ID and PW 1206 | | | |
| Generate the list of shared SSIDs and corresponding preshared secret keys (PSK) in the vicinity of the mobile device based on GPS coordinates 1208 | | | |
| transmit the list of shared SSIDs and the corresponding preshared secret keys to the 3G/4G-network the list of shared SSIDs 1210 | | | |
| | | receive from NGN the list of shared SSIDs and the corresponding preshared secret keys 1306 | |
| | | transmit to the mobile device the list of shared SSIDs and the corresponding preshared secret keys 1308 | |
| | Receive from the NGN an authentication and authorization message and the list of shared SSIDs and the corresponding preshared secret keys via the 3G/4G-network 916 | | |
| | receive from the NGN via the 3G/4G-network a location based service communication on the device 918 | | |

FIG. 15

| NGN | Mobile Device | 3G/4G network | Access Point |
|---|---|---|---|
| | Display the list of shared SSIDS in response to the receiving 920 | | |
| | Receive selection/identification of a single SSID in the list 922 | | |
| | activate a Wi-Fi transceiver of the mobile device when Wi-Fi transceiver not activated 924 | | |
| | establish a 802.11 wireless session with the shared Wi-Fi-enabled access point 926 | | |
| | | | Receive from mobile device an Attempt to associate the device with the shared Wi-Fi-enabled access point including a preshared secret key 1102 |
| | | | Determine whether the mobile device is authorized and authenticated to associate with the shared Wi-Fi-enabled access point based on the preshared secret key 1104 |
| | | | establish a 802.11 wireless session with the mobile device by associate and automatically login with the selected shared Wi-Fi-enabled access point 1108 |
| | turn off 3G data connection 928 | | communicate with the mobile device through the 802.11 wireless session, wherein data is transferred between the mobile device and the shared Wi-Fi-enabled access point 1110 |
| | communicate with the shared Wi-Fi-enabled access point through the 802.11 wireless session with the shared Wi-Fi-enabled access point 930 | receive request from the mobile device to turn off 3G data connection with the mobile device 1310 | |

| NGN | Mobile Device | 3G/4G network | Access Point |
|---|---|---|---|
| | communicate with the shared Wi-Fi-enabled access point through the 802.11 wireless session with the shared Wi-Fi-enabled access point 930 | turn off 3G data connection with the mobile device 1312 | |
| | transmit a Radius start accounting message to the NGN via HTTPS and XML via the 802.11 wireless session with the shared Wi-Fi-enabled access point 932 | | |
| | | | Receive from the mobile device a Radius start accounting message for the NGN via HTTPS and XML via the 802.11 wireless session 1112 |
| | | | transmit to the NGN a Radius start accounting message 1114 |
| Receive from the mobile device via the shared Wi-Fi-enabled access point a Radius start accounting message 1212 | | | |
| start accounting the 802.11 wireless session between the mobile device and the shared Wi-Fi-enabled access point 1214 | optionally display the location based service communication on the mobile device 934 | | |
| | transmit interim radius accounting messages while the 802.11 wireless session is active and data is being transferred between the mobile device and the shared Wi-Fi-enabled access point 936 | | |

| Receive from the mobile device via the shared Wi-Fi-enabled access point Radius interim accounting message(s) 1216 | transmit radius stop accounting message when the user opts to log out or when Wi-Fi signal is lost 938 | | |
|---|---|---|---|
| | | | Receive from the mobile device a Radius stop accounting message for the NGN via HTTPS and XML via the 802.11 wireless session 1120 |
| | | | transmit to the NGN a Radius stop accounting message 1122 |
| Receive from the mobile device via the shared Wi-Fi-enabled access point a Radius end accounting message 1218 | Turn off the shared Wi-Fi transceiver in the mobile device 940 | | |
| | turn on 3G data connection 942 | | |
| | | enable a wireless data session to the mobile device 1314 | |

| HOME | USERS | MANAGERS | ACCESS POINTS | MAP |

REGISTRATION AND LOGIN

IF YOU ARE A NEW USER
PLEASE PROCEED TO
REGISTER OTHERWISE
USE YOUR LOGIN
CREDENTIALS

HELP

FORGOT PASSWORD

LOG IN — 2502
USER NAME: [          ] — 2504
PASSWORD: [          ]
☐ REMEMBER ME NEXT TIME — 2506
[LOG IN]

[REGISTER]

| ADD FUNDS | BACK |

| ACCOUNT | ADD FUNDS | INVOICES | USAGE | STATEMENT |

ADD FUNDS TO YOUR
ACCOUNT

PLEASE SELECT AMOUNT
AND PROCEED TO
SECURELY MAKE YOUR
PAYMENT WITH PAYPAL

YOUR CURRENT ACCOUNT BALANCE IS: [    ] — 2704
PAYPAL AMOUNT: [    ] — 2706

CHAT ONLINE

CUSTOMER SUPPORT

INVOICES

THIS IS THE LIST OF
INVOICES THAT HAVE
BEEN GENERATED
DURING THE LAST 12
MONTHS.

CHAT ONLINE

CUSTOMER SUPPORT

FIG. 34

3. ACCESSABILITY | BACK 404 — 3402

1. IDENTIFY | 2. LOCATE | 3. ACCESS | 4. LBS | 5. PREMIUM — 3304

ACCESSABILITY

⊙ ALWAYS FREE
○ SELECT DATE/TIME

☐ MONDAY ☐ TUESDAY ☐ WEDNESDAY ☐ THURSDAY ☐ FRIDAY ☐ SATURDAY ☐ SUNDAY
MORNING
☐ 6 ☐ 7 ☐ 8 ☐ 9 ☐ 10 ☐ 11   ○ ALL
AFTERNOON
☐ 12 ☐ 13 ☐ 14 ☐ 15 ☐ 16 ☐ 17   ○ ALL
NIGHT
☐ 18 ☐ 19 ☐ 20 ☐ 21 ☐ 22 ☐ 23   ○ ALL
AFTER HOURS
☐ 0 ☐ 1 ☐ 2 ☐ 3 ☐ 4 ☐ 5   ○ ALL

ACCEPT AND CONTINUE — 3408

} 3406

3400

PLEASE DEFINE
ACCESSABILITY OPTIONS.
YOU MAY CONFIGURE
ACCESS FOR FREE ALL
THE TIME, OR WITH A
PREMIUM IN CERTAIN
DAYS OR TIMES

CHAT ONLINE

TECH SUPPORT

NEXT GENERATION NETWORK SERVICES FOR 3G/4G MOBILE DATA OFFLOAD IN A NETWORK OF SHARED PROTECTED/LOCKED WI-FI ACCESS POINTS

FIELD

This disclosure relates generally to communication between 3G/4G networks, Wi-Fi networks and mobile devices, and more particularly to authorization, authentication, accounting and roaming between 3G/4G networks, Wi-Fi networks and mobile devices.

BACKGROUND

With the proliferation of smartphones, tablets, and other connected mobile devices, wireless consumers are increasingly using the mobile Web as a primary gateway to the Internet. According to Cisco, the resulting mobile data traffic is growing at 108% from 2010 to 2014 and it is expected to reach 3.6 Petabytes of data per month on 2014, a 25× increase. Current carrier networks that rely solely on 3G or 4G protocol to shoulder the burden of this ever increasing demand are being stretched to the limits of their networks.

A smartphone is a mobile phone built on a mobile operating system, with more advanced computing capability and connectivity than a feature phone. Later models of smartphones include the functionality of portable media players, low-end compact digital cameras, pocket video cameras, and GPS navigation units to form one multi-use device. Conventional smartphones also include high-resolution touchscreens and web browsers that display standard web pages as well as mobile-optimized sites. High-speed data access is provided by Wi-Fi and mobile broadband. One of the most significant differences is that the advanced application programming interfaces (APIs) on smartphones for running third-party applications can allow those applications to have better integration with the phone's OS and hardware than is typical with feature phones. In comparison, feature phones more commonly run on proprietary firmware.

3G, short for 3rd Generation, is a term used to represent the 3rd generation of mobile telecommunications technology. 3G is a set of standards used for mobile devices and mobile telecommunication services and networks that comply with the International Mobile Telecommunications-2000 (IMT-2000) specifications by the International Telecommunication Union. 3G finds application in wireless voice telephony, mobile Internet access, fixed wireless Internet access, video calls and mobile TV.

Several telecommunications companies market wireless mobile Internet services as 3G, indicating that the advertised service is provided over a 3G wireless network. Services advertised as 3G are required to meet IMT-2000 technical standards, including standards for reliability and speed (data transfer rates). To meet the IMT-2000 standards, a system is required to provide peak data rates of at least 200 kbit/s (about 0.2 Mbit/s). However, many services advertised as 3G provide higher speed than the minimum technical requirements for a 3G service. Recent 3G releases, often denoted 3.5G and 3.75G, also provide mobile broadband access of several Mbit/s to smartphones and mobile modems in laptop computers.

The following standards are typically branded 3G: the UMTS system, first offered in 2001, standardized by 3GPP, used primarily in Europe, Japan, China (however with a different radio interface) and other regions predominated by GSM 2G system infrastructure. The cell phones are typically UMTS and GSM hybrids. Several radio interfaces are offered, sharing the same infrastructure. The original and most widespread radio interface is called W-CDMA. The TD-SCDMA radio interface was commercialized in 2009 and is only offered in China. The latest UMTS release, HSPA+, can provide peak data rates up to 56 Mbit/s in the downlink in theory (28 Mbit/s in existing services) and 22 Mbit/s in the uplink. The CDMA2000 system, first offered in 2002, standardized by 3GPP2, used especially in North America and South Korea, sharing infrastructure with the IS-95 2G standard. The cell phones are typically CDMA2000 and IS-95 hybrids. The latest release EVDO Rev B offers peak rates of 14.7 Mbit/s downstream.

3G is based on spread spectrum radio transmission technology. While the GSM EDGE standard ("2.9G"), DECT cordless phones and Mobile WiMAX standards formally also fulfill the IMT-2000 requirements and are approved as 3G standards by ITU, these are typically not branded 3G, and are based on completely different technologies.

4G is also known as Long Term Evolution (LTE) and 3rd Generation Partnership Project (3GPP). 4G is the fourth generation of cellular wireless standards that is a successor to the 3G and 2G families of standards. In year 2009, the ITU-R organization specified the IMT-Advanced (International Mobile Telecommunications Advanced) requirements for 4G standards, setting peak speed requirements for 4G service at 100 Mbit/s for high mobility communication (such as from trains and cars) and 1 Gbit/s for low mobility communication (such as pedestrians and stationary users). 4G features includes smooth handoff across heterogeneous networks, seamless connectivity and global roaming across multiple networks, high quality of service for next generation multimedia support (real time audio, high speed data, HDTV video content, mobile TV, etc.), interoperability with existing wireless standards, an all IP, packet switched network, IP-based femtocells (home nodes connected to fixed Internet broadband infrastructure).

Wi-Fi allows an electronic device to exchange data wirelessly (using radio waves) over a computer network, including high-speed Internet connections. Wi-Fi" is a trademark of the Wi-Fi Alliance and the brand name for products using the IEEE 802.11 family of standards. The Wi-Fi Alliance defines Wi-Fi as any "wireless local area network (WLAN) products that are based on the Institute of Electrical and Electronics Engineers' (IEEE) 802.11 standards". However, since most modern WLANs are based on these standards, the term "Wi-Fi" is used as a synonym for "WLAN". A device that can use Wi-Fi (such as a personal computer, video game console, smartphone, tablet, or digital audio player) can connect to a network resource such as the Internet via a wireless network access point (AP). Such an access point (or hotspot) has a range of about 20 meters (65 feet) indoors and a greater range outdoors. Hotspot coverage can comprise an area as small as a single room with walls that block radio waves, or as large as many square miles, which is achieved by using multiple overlapping access points.

BRIEF DESCRIPTION

In some implementations, a preshared key (PSK) is shared initially between an owner of a Wi-Fi access point and a next-generation-network (NGN). The Wi-Fi access point is locked/protected from unauthorized access. Presentation of the PSK to the Wi-Fi access point is required to unlock or unprotect the Wi-Fi access point. The PSK is based on a secret that is shared between the owner of the Wi-Fi access point and the NGN via a secure channel before the PSK is used. The Wi-Fi access point becomes a shared Wi-Fi access point through the sharing or distribution of the PSK of the Wi-Fi access point.

In one aspect, a method of communication by a next-generation network with a mobile device, with a 3G/4G network and with a shared Wi-Fi access point includes receiving from the mobile device via the 3G/4G network a request for a list of shared SSIDs. The method also includes the request including GPS location coordinates of the mobile device. The method also includes a user ID and a password. The method also includes generating the list of shared SSIDs and corresponding preshared secret keys in a one-for-one correspondence between the shared SSIDs and corresponding preshared secret keys in a vicinity of the mobile device based on the GPS coordinates of the GPS location. The method also includes transmitting the list of shared SSIDs and the corresponding preshared secret keys to the 3G/4G network.

In another aspect, a method of communication by a next-generation network with a mobile device, with a 3G/4G network and with a shared Wi-Fi access point includes registering the shared Wi-Fi access point. The method also includes registering the mobile device. The method also includes receiving from the mobile device via the 3G/4G network a request for a list of shared SSIDs. The method also includes the request including GPS coordinates of the mobile device. The method also includes a user ID and a password. The method also includes generating the list of shared SSIDs and corresponding preshared secret keys in a one-for-one correspondence between the shared SSIDs and corresponding preshared secret keys in a vicinity of the mobile device based on the GPS coordinates. The method also includes transmitting the list of shared SSIDs and the corresponding preshared secret keys to the 3G/4G network.

In yet another aspect, an apparatus of communication between a mobile device includes a 3G/4G network and a shared Wi-Fi access point includes a receiver of a request for a list of shared SSIDs from the mobile device via the 3G/4G network. The apparatus also includes the request including GPS coordinates of the mobile device. The request also includes a user ID and a password. The apparatus also includes a transmitter of the list of shared SSIDs and the corresponding preshared secret keys to the 3G/4G network; the transmitter operably coupled to the receiver.

In still another aspect, a method of communication by a next-generation network-service-provider with a mobile device and a Wi-Fi access point includes transmitting a preshared secret key to a Wi-Fi access point. The method also includes the transmitting being performed by a device that is not the Wi-Fi access point. The method also includes transmitting the preshared secret key to a mobile device. The method also includes the transmitting being performed by a device that is not the mobile device. Systems, clients, servers, methods, and computer-readable media of varying scope are described herein. In addition to the aspects and advantages described in this summary, further aspects and advantages will become apparent by reference to the drawings and by reading the detailed description that follows.

BRIEF DESCRIPTION OF THE DRAWINGS

FIG. 14-18 are a series of sequence diagrams of the interaction between a mobile device, a shared Wi-Fi, a next-generation network and a 3G/4G mobile network, according to an implementation;

FIG. 25 illustrates a webpage that supports registration of Users of mobile devices, according to an implementation;

FIG. 27 illustrates a webpage that supports adding funds to User Accounts, according to an implementation;

FIG. 34 illustrates a webpage that supports configuring Wi-Fi AP accessibility, according to an implementation;

DETAILED DESCRIPTION

Figure 1:
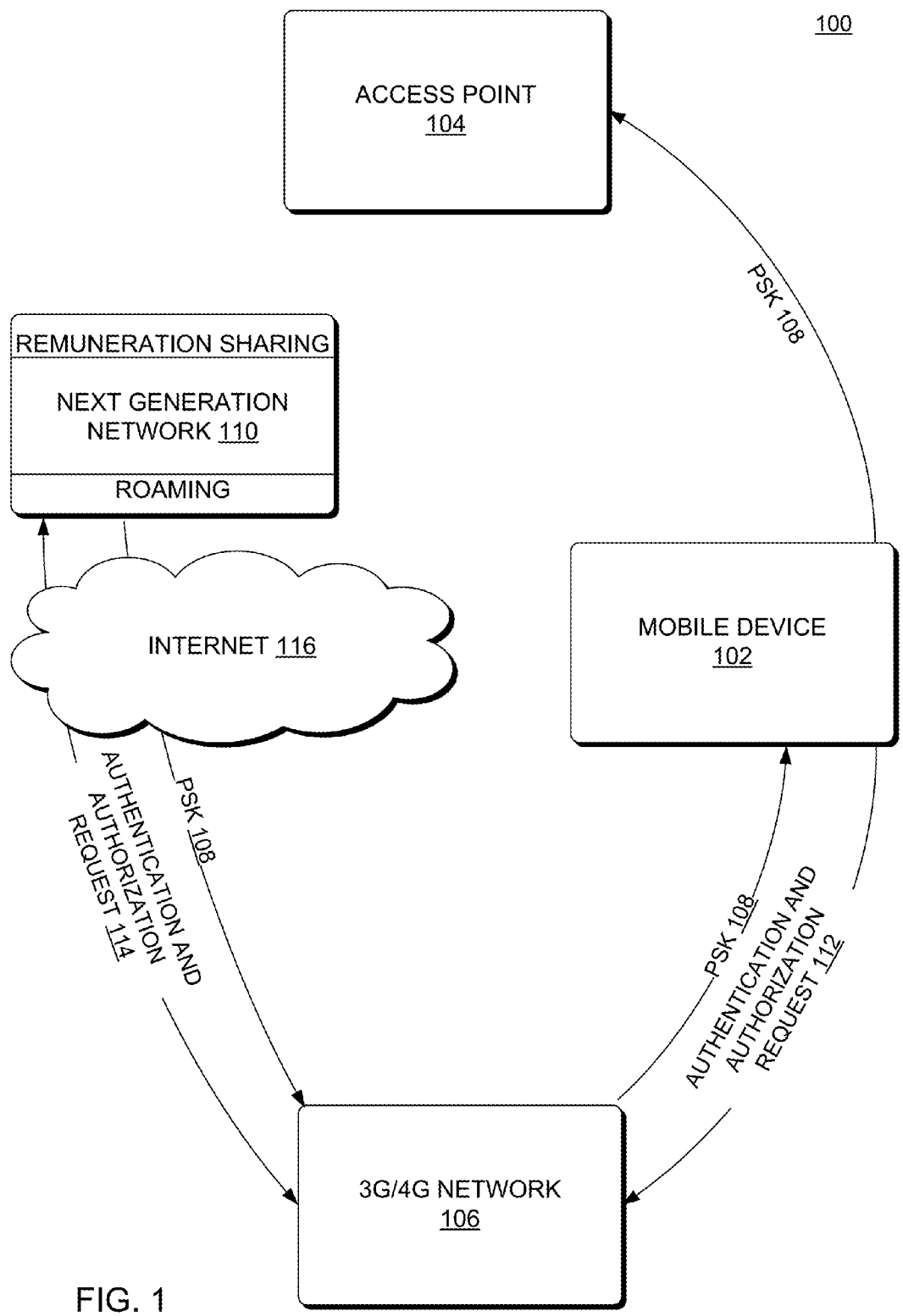
FIG. 1 is a block diagram of an overview of a system to provide switching between heterogeneous wireless networks, according to an implementation.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

In the following detailed description, reference is made to the accompanying drawings that form a part hereof, and in which is shown by way of illustration specific implementations which may be practiced. These implementations are described in sufficient detail to enable those skilled in the art to practice the implementations, and it is to be understood that other implementations may be utilized and that logical, mechanical, electrical and other changes may be made without departing from the scope of the implementations. The following detailed description is, therefore, not to be taken in a limiting sense.

The detailed description is divided into five sections. In the first section, a system level overview is described. In the second section, implementations of apparatus are described. In the third section, methods are described. In the fourth section, hardware and the operating environments in conjunction with which implementations may be practiced are described. In the fifth section, particular implementations are described. Finally, in the sixth section, a conclusion of the detailed description is provided.

System Level Overview

The system level overview of the operation of an implementation is described in this section of the detailed description.

FIG. 1 is a block diagram of an overview of a system 100 to provide access to heterogeneous wireless networks, according to an implementation.

System 100 includes a mobile device 102 that is operable to access heterogeneous wireless networks such as a shared Wi-Fi access point 104 and a 3G/4G network 106 that is operated by a 3G/4G mobile operator. The 3G/4G network is a wireless network that operates in both 3G and 4G protocols. In some implementations, the shared Wi-Fi access point 104 is operated by a retail commercial establishment such as a coffee shop.

In some implementations, a preshared key (PSK) 108 is shared initially between an owner of the shared Wi-Fi access point 104 and a next-generation-network (NGN) 110. The PSK 108 is based on a secret that is shared between the owner of the shared Wi-Fi access point 104 and the NGN 110 via a secure channel before the PSK 108 is to be used. To build the PSK 108 from the shared secret, a key derivation function is used. The key derivation conventionally uses symmetric key cryptographic algorithms. The term PSK is used in Wi-Fi encryption such as WEP or WPA, where conventionally only the shared Wi-Fi access point 104 and the mobile device 102 share the PSK 108.

The mobile device 102 transmits, via the 3G/4G-network 106, a request 112 for a preshared key (PSK) 108 to a NGN 110. The 3G/4G network 106 receives from the mobile device 102 the request 112, and in response the 3G/4G network 106 transmits to the NGN 110 a request 114 for a PSK 108 of the mo0062ile device 102. The NGN 110 receives from the mobile device 102 via the 3G/4G-network 106 the request 114 and the NGN 110 responds by transmitting the PSK 108 to the mobile device 102 via the 3G/4G-network 106 in which the 3G/4G network 106 receives from the NGN 110 the PSK 108 and the 3G/4G network 106 transmits the PSK 108 to the mobile device 102. The mobile device 102 receives from the NGN 110 the PSK 108 via the 3G/4G-network 106 and the mobile device 102 transmits the PSK 108 to the shared Wi-Fi access point 104 to establish a 802.11 wireless session with the shared Wi-Fi access point 104. In some implementations, the 3G/4G network 106 and the NGN 110 are operatively coupled via the Internet cloud 116.

In some implementations, the PSK 108 is shared using a cloud based application. The NGN 110 also shares the same PSK 108 with the mobile device 102. The mobile device 102 accesses the shared Wi-Fi access point 104 using the PSK 108. The exchange of the PSK 108 between the NGN 110 and the shared Wi-Fi access point 104 provides the Wi-Fi access point 104 as shared because distribution of the PSK 108 by the NGN 110 to the mobile device 102 provides access to the Wi-Fi access point 104 to mobile device 102, wherein the mobile device 102 would not otherwise have the PSK 108 or access to the shared Wi-Fi access point 104 in another manner. The operator of the mobile device 102 never enters, knows or sees the PSK 108, nor does the operator of the mobile device have a need to capture the PSK 108 in any way, therefore maintaining secrecy of the PSK 108 exclusively between the owner of the shared Wi-Fi access point 104 and the NGN 110. The NGN 110 provides access by the mobile device 102 to the shared Wi-Fi access point 104, and makes use of the 3G/4G network 106. The NGN 110 is not the Wi-Fi access point 104, is not the mobile device 102 and is not the 3G/4G network 106.

Cloud based refers to cloud computing as the delivery of computing capacity as a service to a community of end-recipients. Cloud computing entrusts services with a user's data, software and computation over a network. Cloud providers (such as the NGN 110 in some implementations) manage the infrastructure and platforms on which the applications run. The mobile device 102 accesses cloud-based applications through a web browser or a light-weight desktop or mobile app while the business software and user's data are stored on servers at a remote location. Cloud computing relies on sharing of resources to achieve coherence and economies of scale similar to a utility (like the electricity grid) over a network (typically the Internet). At the foundation of cloud computing is the broader concept of converged infrastructure and shared services, which in the example of this disclosure the shared services are the shared services of the shared Wi-Fi access point 104 to the mobile device 102.

In some implementations the operator of the mobile device 102 is informed as to whether the shared Wi-Fi access point 104 has shared with the mobile device 102 the PSK 108 of the Wi-Fi access point 104 for free or for a fee. When the PSK of the Wi-Fi access point 104 is shared for a fee, usage of the shared PSK 108 of the Wi-Fi access point 104 is accounted and tracked.

In some implementations, the PSK 108 is transmitted from the NGN 110 to the shared Wi-Fi access point 104 via Hypertext Transfer Protocol Secure (HTTPS) or HTTP. HTTPS is a widely-used communications protocol for secure communication over a computer network, with especially wide deployment on the Internet. HTTPS is not a protocol; rather, HTTPS is SSL/TLS protocol layered on the Hypertext Transfer Protocol (HTTP), thus adding the security capabilities of SSL/TLS to standard HTTP communications. In a conventional deployment on the Internet, HTTPS provides authentication, which protects against Man-in-the-middle attacks. Additionally, HTTPS provides bidirectional encryption of communications between a client and server, such as the shared Wi-Fi access point 104 and the NGN 110 which protects against eavesdropping and tampering with and/or forging the contents of the communication In practice, the encryption provides a reasonable guarantee that the two devices are communicating with precisely the two devices (as opposed to an impostor), as well as ensuring that the contents of communications between the two devices cannot be read or forged by any third party. In some implementations, the PSK 108 is transmitted from the NGN 110 to the shared Wi-Fi access point 104 using and/or any other prestablished data formatting such as Simple Object Access Protocol (SOAP) or JavaScript Object Notation (JSON).

In some implementations, the NGN 110 shares the PSK 108 with the shared Wi-Fi access point 104 in response to a request 112 from the 3G/4G for authentication and authorization of the mobile device 102 on the Wi-Fi access point 104. In some implementations, the authentication and authorization of this disclosure is complaint with EAP-SIM. EAP-SIM is Extensible Authentication Protocol (EAP) mechanism for authentication and session key distribution using the Subscriber Identity Module (SIM) from the Global System for Mobile Communications (GSM). EAP-SIM is described in RFC 4186 by the IEFT.

The NGN 110 transports all information and services (voice, data, and media (such as video) by encapsulating the information into packets, similar to those used on the Internet. In some implementations, the NGN 110 is built around the Internet Protocol (IP), and therefore the term all IP is also sometimes used to describe the transformation toward NGN 110.

In some implementations, the mobile device 102 sends test data packages to the shared Wi-Fi access point 104 to measure the bandwidth of the shared Wi-Fi access point 104. In this way the NGN 110 can build an always increasing, continually re-validated, list of shared Wi-Fi access points 104, including locations of the shared Wi-Fi access points 104 and performance levels of the shared Wi-Fi access points 104.

A 4G network 106 includes a signaling gateway (SGW) that transfers signaling messages, a packet gateway server (PGW) that communicates using different protocols and transports and which is also known as a packet data network server (PDN), and a MME (Mobility Management Entity) server that includes a MME protocol stack that supports the S1 interface with eNodeB, the integrated S1 MME interface stack including IP, SCTP, S1AP, all of which are described in greater detail below in regard to network apparatus 400. Physical layer transmission of 4G via the network 106 may include MIMO to attain ultra high spectral efficiency by means of spatial processing including multi-antenna and multi-user MIMO, frequency-domain-equalization—for example multi-carrier modulation (OFDM) in the downlink or single-carrier frequency-domain-equalization (SC-FDE) in the uplink to exploit the frequency selective channel property without complex equalization, frequency-domain statistical multiplexing, for example (OFDMA) or (single-carrier FDMA) (SC-FDMA, a.k.a. linearly precoded OFDMA, LP-OFDMA) in the uplink: Variable bit rate by assigning different sub-channels to different users based on the channel conditions, and turbo principle error-correcting codes to minimize the required SNR at the reception side.

The 4G network 106 also includes channel-dependent scheduling to utilize a time-varying channel, link adaptation—adaptive modulation and error-correcting codes and relaying that includes fixed relay networks (FRNs), and the cooperative relaying concept known as multi-mode protocol.

Long Term Evolution (LTE) is a standard in Release 8 and 9 by the 3rd Generation Partnership Project (3GPP) and LTE-Advanced is a standard in Release 10 by 3GPP. 3GPP is located at 06921 Sophia-Antipolis Cedex, France.

LTE-Advanced key features include peak data rates in downlink of 1 Gbps and uplink of 500 Mbps, spectrum efficiency that is 3 times greater than LTE, peak spectrum efficiency in downlink of 30 bps/Hz and uplink of 15 bps/Hz, spectrum use provides scalable bandwidth use and spectrum aggregation for non-contiguous spectrums, latency from idle to connected in less than 50 ms and then shorter than 5 ms one way for individual packet transmission, cell edge user throughput to be twice that of LTE, average user 3 times that of LTE, mobility same as LTE, compatibility is capable of interworking with LTE and 3GPP legacy systems. LTE and LTE-Advanced uses orthogonal frequency division multiple (OFDM) as the basis of the radio bearer; and LTE and LTE-Advanced uses orthogonal frequency division multiple access (OFDMA) along with single channel orthogonal frequency division multiple access (SC-FDMA) and multiple input multiple output (MIMO).

OFDM is a form of transmission that uses a large number of close spaced carriers that are modulated with low rate data. Normally the closed spaced carrier signals would be expected to interfere with each other, but by making the signals orthogonal to each another, there is no mutual interference. The orthoganility of the signals is achieved by having the carrier spacing equal to the reciprocal of the symbol period.

When the orthogonal signals are demodulated, the demodulated signals have a whole number of cycles in the symbol period and the contribution of the demodulated signals will sum to zero, which yield no interference contribution. The data to be transmitted is split across all the carriers so that by using error correction techniques, if some of the carriers are lost due to multi-path effects, then the data can be reconstructed. Additionally having data carried at a low rate across all the carriers means that the effects of reflections and inter-symbol interference can be overcome. Moreover, having data carried at a low rate across all the carriers also means that single frequency networks, where all transmitters can transmit on the same channel can be implemented.

MIMO provides a way of using the multiple signal paths that exist between a transmitter and receiver to significantly improve the data throughput available on a given channel with defined bandwidth of the given channel. By using multiple antennas at the transmitter and receiver along with some complex digital signal processing, MIMO technology enables the system to set up multiple data streams on the same channel, thereby increasing the data capacity of a channel.

Because a LTE femtocell wireless interface is identical to that of a standard eNodeB, femto cells provide inherent advantages over shared Wi-Fi access points in regards to inter-technology mobility.

There are two basic categories of indoor base stations (eNodeBs) for LTE—pico/micro cells and femto cells. Pico cells and micro cells are simply small, lower-capacity base stations that can be deployed indoors or outdoors. For indoor applications the pico/micro cells are typically used to support large spaces such as shopping malls or office buildings. Femto cells, which are also referred to as "Home eNodeBs" (eNB), have very low power and extremely limited capacity and are specifically designed to be deployed in a customer's home or small business. Femto cells are typically owned or leased by the customer and are targeted to have a cost in the range of a few hundred dollars or less. Femto cells normally use customer-provided backhaul such as DSL or cable and connect to the operator's LTE network through a gateway. Micro and pico cells on the other hand adhere to the same deployment and ownership models that are used for macro ENodeBs—i.e. the operator owns them and provides the backhaul for them. As a consequence of this difference, femto cells typically restrict their services to small groups of users (closed user group) that are associated with the home or small business where the femto cells are located while micro and pico cells typically provide open service to all of an operator's customers.

Femtocells provide faster handovers by using the LTE intra-technology handover rather that LTE-inter technology handover to move between indoor and outdoor coverage. Intra-technology handovers are simpler and faster than inter-technology handovers.

Wi-Fi is a set of standards in the 802.11 family (802.11-1997 [802.11 legacy], 802.11a, 802.11b, 802.11g, 802.11-2007 and 802.11n) for implementing wireless local area network (WLAN) computer communication in the 2.4, 3.6 and 5 GHz frequency bands. The Wi-Fi standard is created and maintained by the Institute of Electrical and Electronics Engineers (IEEE) LAN/MAN Standards Committee (IEEE 802). IEEE is located at 3 Park Avenue, 17th Floor, New York, N.Y. 10016-5997.

The 802.11 "Wi-Fi" standard divides each of the above-described bands into channels, analogously to how radio and TV broadcast bands are sub-divided. For example the 2.4000-2.4835 GHz band is divided into 13 channels each spaced 5 MHz apart, with channel 1 centered on 2.412 GHz and 13 on 2.472 GHz to which Japan adds a 14th channel 12 MHz above channel 13. Since 802.11g OFDM signals use 20 MHz there are only four non-overlapping channels, which are 1, 5, 9 and 13. The previous standard 802.11b was based on DSSS waveforms which used 22 MHz and did not have sharp borders. Due to the way the signal is generated, OFDM waveforms do. Thus only three channels did not overlap. Many devices are shipped with channels 1, 6 or 11 as the preset option, slowing the adoption of the newer four channel scheme. Availability of channels is regulated by country, constrained in part by how each country allocates radio spectrum to various services. At one extreme, Japan permits the use of all 14 channels (with the exclusion of 802.11g/n from channel 14), while other countries like Spain initially allowed only channels 10 and 11, and France only allowed 10, 11, 12 and 13 (now both countries follow the European model of allowing channels 1 through 13. Most other European countries are almost as liberal as Japan, disallowing only channel 14, while North America and some Central and South American countries further disallow 12 and 13. Besides specifying the center frequency of each channel, 802.11 also specifies (in Clause 17 of 802.11) a spectral mask defining the permitted distribution of power across each channel. The mask requires that the signal be attenuated by at least 30 dB from peak energy of the signal at +11 MHz from the center frequency, the sense in which channels are effectively 22 MHz wide. One consequence is that stations can only use every fourth or fifth channel without overlap, typically 1, 6 and 11 in the Americas, and in theory, 1, 5, 9 and 13 in Europe although 1, 6 and 11 is typical there too. Another is that channels 1-13 effectively require the band 2.401-2.483 GHz, the actual allocations being, for example, 2.400-2.4835 GHz in the UK, 2.402-2.4735 GHz in the US, etc. Since the spectral mask only defines power output restrictions up to ±11 MHz from the center frequency to be attenuated by −50 dBr, the energy of the channel is often assumed to extend no further than these limits. Given the separation between channels 1, 6 and 11, the signal on any channel should be sufficiently attenuated to minimally interfere with a transmitter on any other channel. Due to the near-far problem a transmitter can impact a receiver on a "non-overlapping" channel, but only if the transmitter is close to the victim receiver (within a meter) or operating above allowed power levels. Although the statement that channels 1, 6 and 11 are "non-overlapping" is limited to spacing or product density, the 1-6-11 guideline has merit. If transmitters are closer together than channels 1, 6 and 11 (for example, 1, 5, 7, and 10), overlap between the channels may cause unacceptable degradation of signal quality and throughput. However, overlapping channels may be used under certain circumstances. Overlapping channels has the effect of providing more available channels. Current 802.11 standards define "frame" types for use in transmission of data as well as management and control of wireless links. Frames are divided into very specific and standardized sections. Each frame consists of a MAC header, payload and frame check sequence (FCS). Some frames may not have the payload. The first two bytes of the MAC header form a frame control field specifying the form and function of the frame. The frame control field is further subdivided into the following sub-fields: Protocol Version: two bits representing the protocol version. Currently used protocol version is zero. Other values are reserved for future use. Type: two bits identifying the type of WLAN frame. Control, Data and Management are various frame types defined in IEEE 802.11; Sub Type: Four bits providing addition discrimination between frames. Type and Sub type together to identify the exact frame; ToDS and FromDS: Each is one bit in size. The ToDS and FromDS bits indicate whether a data frame is headed for a distributed system. Control and management frames set these values to zero. All the data frames will have one of these bits set. However communication within an IBSS network always set these bits to zero; More Fragments: The More Fragments bit is set when a packet is divided into multiple frames for transmission. Every frame except the last frame of a packet will have the More Fragments bit set; Retry: Sometimes frames require retransmission, for which a Retry bit is provided, which is set to '1' when a frame is resent. The Retry bit aids in the elimination of duplicate frames; Power Management: The Power Management bit indicates the power management state of the sender after the completion of a frame exchange. Access points are required to manage the connection and will never set the power saver bit; More Data: The More Data bit is used to buffer frames received in a distributed system. The access point uses the More Data bit to facilitate stations in power saver mode. The More Data bit indicates that at least one frame is available and addresses all stations connected; WEP: The WEP bit is modified after processing a frame. The WEP bit is toggled to '1' after a frame has been decrypted or if no encryption is set the WEP bit will have already been one; Order: The Order bit is only set when the "strict ordering" delivery method is employed. Frames and fragments are not always sent in order as it causes a transmission performance penalty. An 802.11 frame can have up to four address fields. Each field can carry a MAC address. Address 1 is the receiver, Address 2 is the transmitter, Address 3 is used for filtering purposes by the receiver. Management Frames allow for the maintenance of communication. Some common 802.11 subtypes include: Authentication frame: 802.11 authentication begins with the Wireless Network Interface Controller (WNIC) transmitting an authentication frame to the access point in which the authentication frame contains an identity of the WNIC. With an open system authentication, the WNIC sends only a single authentication frame and the access point responds with an authentication frame indicating acceptance or rejection. With shared key authentication, after the WNIC sends an initial authentication request, the WNIC will receive an authentication frame from the access point containing challenge text. The WNIC sends an authentication frame containing the encrypted version of the challenge text to the access point. The access point ensures the text was encrypted with the correct key by decrypting the text with a key associated with the access point. The result of decrypting with a key associated with the access point determines the WNIC's authentication status; Association request frame: When sent from a station, the Association request frame enables the access point to allocate resources and synchronize. The frame carries information about the WNIC including supported data rates and the SSID of the network the station wishes to associate with. If the request is accepted, the access point reserves memory and establishes an association ID for the WNIC; Association response frame: sent from an access point to a station containing the acceptance or rejection to an association request. If the Association response frame indicates an acceptance, the Association response frame will contain information such an association ID and supported data rates; Beacon frame: Sent periodically from an access point to announce presence of the access point and provide the SSID, and other parameters for WNICs within range; Deauthentication frame: Sent from a station wishing to terminate connection from another station; Disassociation frame: Sent from a station wishing to terminate connection. The Disassociation frame is an elegant way to allow the access point to relinquish memory allocation and remove the WNIC from the association table; Probe request frame: Sent from a station when the station requires information from another station; Probe response frame: Sent from an access point containing capability information, supported data rates, etc., after receiving a probe request frame; Reassociation request frame: A WNIC sends a reassociation request when the WNIC drops from range of the currently associated access point and finds another access point with a stronger signal. The new access point coordinates the forwarding of any information that may still be contained in the buffer of the previous access point; Reassociation response frame: Sent from an access point containing the acceptance or rejection to a WNIC reassociation request frame. The frame includes information required for association such as the association ID and supported data rates. Control frames facilitate in the exchange of data frames between stations. Some common 802.11 control frames include: Acknowledgement (ACK) frame: After receiving a data frame, the receiving station will transmit an ACK frame to the transmitting station if no errors are found. If the transmitting station doesn't receive an ACK frame within a predetermined period of time, the transmitting station will retransmit the frame; Request to Send (RTS) frame: The RTS and CTS frames provide an optional collision reduction scheme for access point with hidden stations. A station sends a RTS frame to as the first step in a two-way handshake required before transmitting data frames; Clear to Send (CTS) frame: A station responds to an RTS frame with a CTS frame. The CTS frame provides clearance for the requesting station to transmit a data frame. The CTS provides collision control management by including a time value for which all other stations are to hold off transmission while the requesting stations transmits; Data frames carry packets from web pages, files, etc. within the body.

Figure 2:
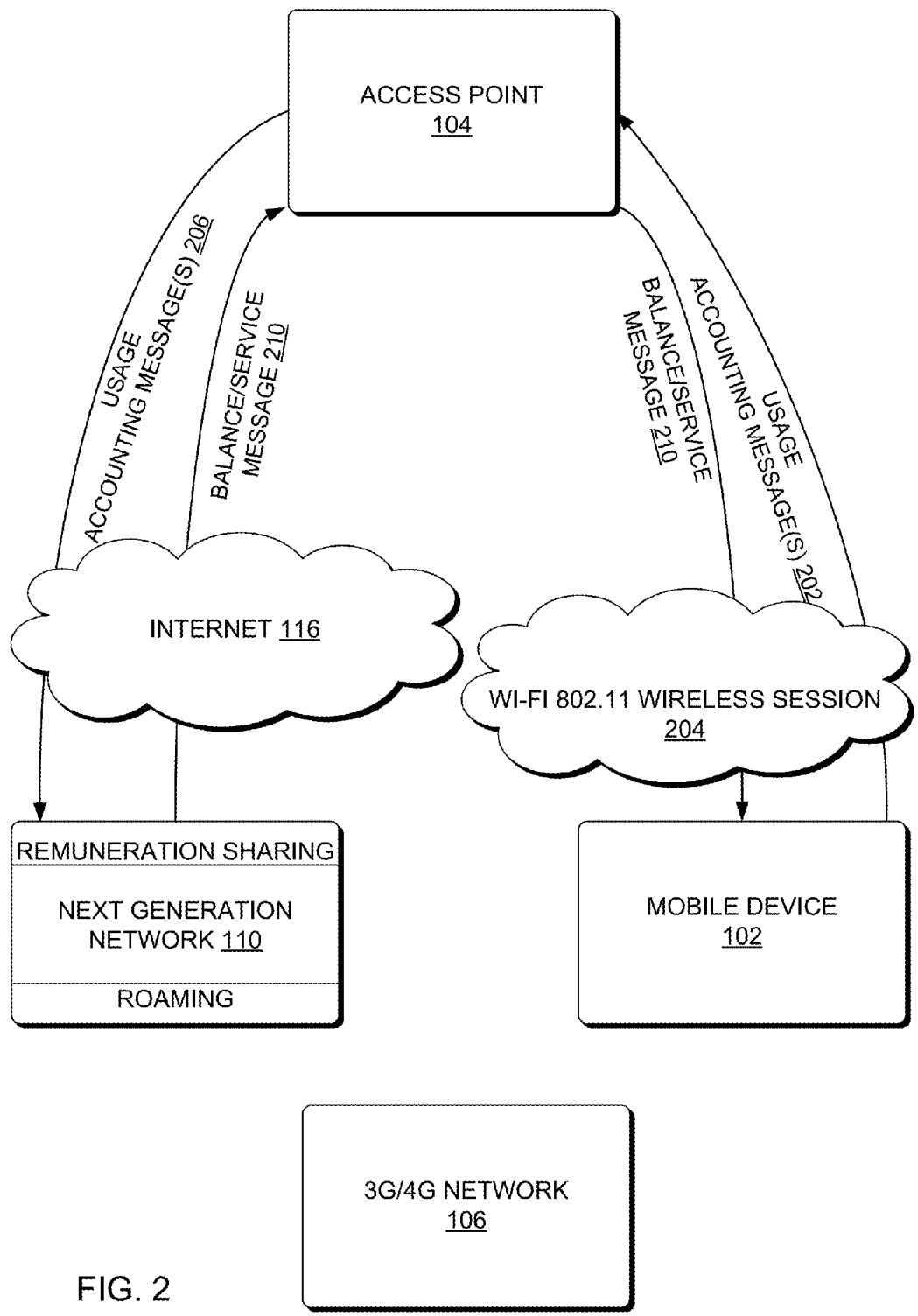
FIG. 2 is a block diagram of an overview of a system to provide usage accounting of a Wi-Fi access point between heterogeneous wireless networks, according to an implementation.

FIG. 2 is a block diagram of an overview of a system 200 to provide usage accounting of a Wi-Fi access point between heterogeneous wireless networks, according to an implementation.

In system 200, the mobile device 102 is operable to generate and transmit to the Wi-Fi access point 104 at least one usage accounting message 202 that describes activity between the mobile device 102 and the Wi-Fi access point 104. The usage accounting message(s) 202 are transmitted via a Wi-Fi 802.11 wireless session 204 between the mobile device 102 and the Wi-Fi access point 104. The Wi-Fi access point 104 is operable to receive the usage accounting message(s) 202 from the mobile device 102 via the Wi-Fi 802.11 wireless session 204. The Wi-Fi access point 104 is operable to aggregate the usage accounting message(s) 202 into usage accounting message(s) 206 and Internet cloud 116. The NGN 110 is operable to generate a balance/service message 210 and operable to transmit the balance/service message 210 to the Wi-Fi access point 104 through the Wi-Fi wireless session 204 when the account balance of the mobile device 102 for usage of the Wi-Fi wireless session 204 through the Wi-Fi access point 104 is at or below a predetermined threshold, and the Wi-Fi access point 104 is operable to receive and transmit the balance/service message 210 to the mobile device 102 via the Wi-Fi 802.11 wireless session 204. The mobile device 102 is operable to receive and to display the balance/service message 210. The 3G/4G network is not involved in the generation, transmission or receipt of the usage accounting message(s), the usage accounting message(s) 202 and 206 or the balance/service message 210.

Apparatus

Figure 3:
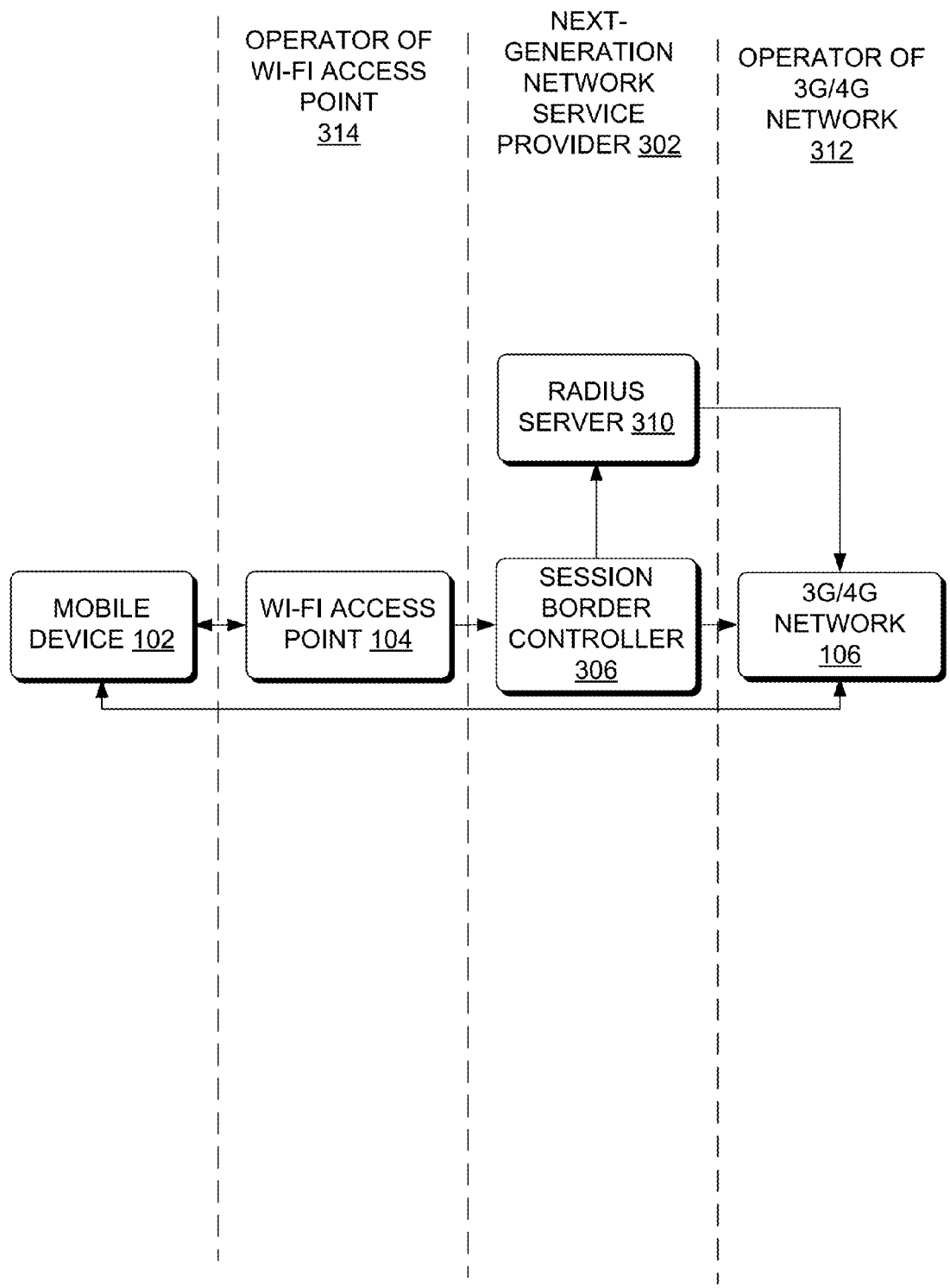
FIG. 3 is a block diagram of an overview of apparatus to provide switching between heterogeneous wireless networks, according to an implementation.

FIG. 3 is a block diagram of an overview of apparatus 300 to provide switching between heterogeneous wireless networks, according to an implementation.

System 300 includes a next-generation network service provider 302. In some implementations, the next-generation network service provider 302 operates one or more session border controllers (SBC) 306. The SBCs 306 are operably coupled with and interact with a shared Wi-Fi access point 104 and a mobile device registration server (not shown in FIG. 3) in support of authentication and authorization between the mobile device into a Wi-Fi network and both 3G and 4G mobile networks. The mobile device registration server is discussed in greater detail below. The SBCs 306 are operably coupled with, and interact with a shared Wi-Fi access point 104.

The network 106 of the 3G/4G mobile operator/owner/manager 312 is operably coupled to, and communicates with, both the mobile device 102. In some implementations the operator/owner/manager of the shared Wi-Fi access point 104 only shares a PSK 108 of the shared Wi-Fi access point 104 with a list of predefined mobile devices, and in a similar manner the operator/owner/manager of the shared Wi-Fi access point 104 negates, prohibits or excludes access to only a predefined list of mobile devices.

In 4G implementations of the 3G/4G network 106, the mobile device registration server includes a home locator register (HLR), a 3G visitor location register (VLR) or a 4G Home Subscriber Service (HSS), and may include a policy control register function (PCRF).

In 4G implementations of the 3G/4G network 106, the HSS in FIG. 3 is a central database for subscriber information. The HSS data includes the Public and Private identities of subscribers, credentials used for authentication, data defining which services and media types are allowed for each subscriber, and call control logic in the form of Initial Filter Criteria (IFC)'s used to instruct the S-CSCF in terms of Session Initiation Protocol (SIP) message routing.

In 4G implementations of the 3G/4G network 106, the HSS in FIG. 3 is a component of the 4G network and stores public and private identities of subscribers, credentials used for authentication, data defining which services and media types are allowed for each subscriber, and call control logic in the form of initial filter criteria.

The PCRF in FIG. 3 is a component of a 4G network that manages policy control. The PCRF aggregates information to and from the network, operational support systems, and other sources (such as portals) in real time, supports the creation of rules and then make policy decisions for each subscriber active on the network in regards to multiple services, quality of service (QoS) levels and charging rules.

Figure 4:
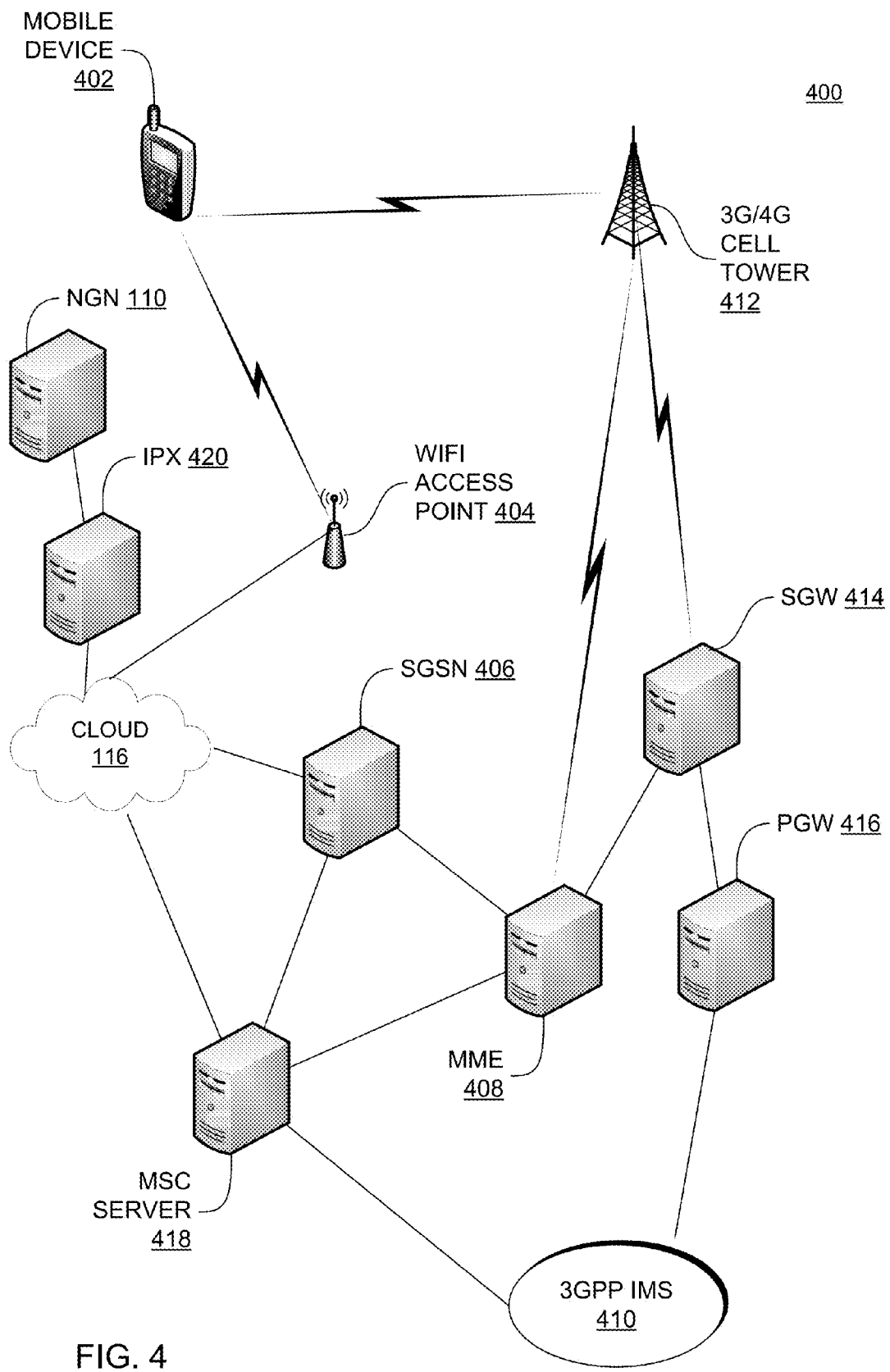
FIG. 4 is a block diagram of an overview of network apparatus to provide switching between 4G/LTE network and a shared Wi-Fi network, according to an implementation.

FIG. 4 is a block diagram of an overview of network apparatus 400 to provide switching between 4G/LTE network and a shared Wi-Fi network, according to an implementation.

A mobile device 402 in network apparatus 400 includes a hybrid femtocell/Wi-Fi protocol stack. Mobile device 402 is one example of mobile device 102 in FIG. 1.

Figure 21:
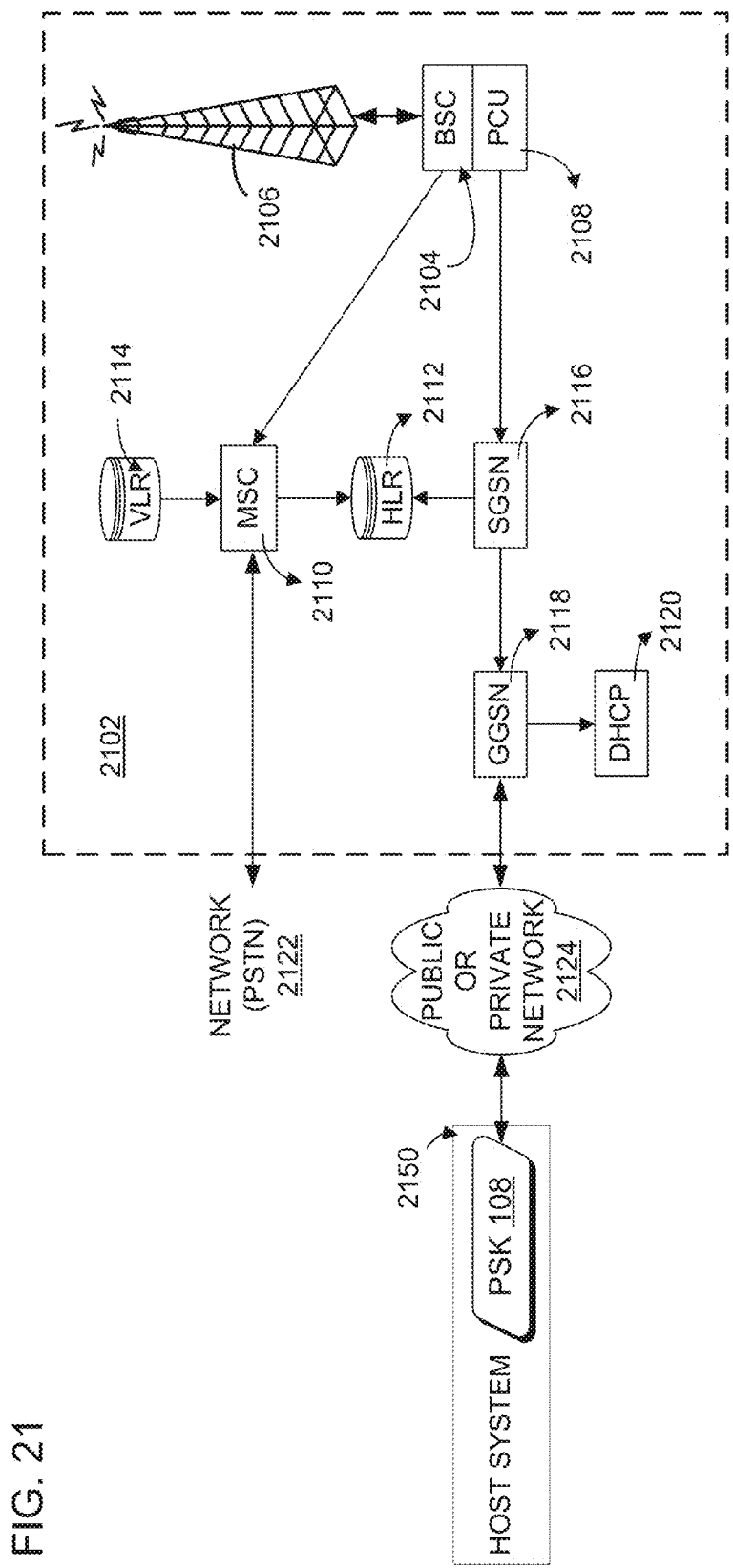
FIG. 21 is a block diagram of a node of a wireless network, according to an implementation.

Network apparatus 400 also includes a serving GPRS support node (SGSN) 406 that mediates access to network resources on behalf of mobile device 402 in a 4G/LTE network and mobile device 102 coupled to 3G/4G network 106 in FIG. 1, that implements packet scheduling policy between different quality of service (QoS) classes and that establishes the Packet Data Protocol (PDP) context. SGSN 2116 in FIG. 21 is one example of the SGSN 406.

Network apparatus 400 also includes a mobility management entity (MME) server 408 that is connected to a 3GPP KIP Multimedia (IMS) carrier network 410.

Recent Wi-Fi technology has increased range, faster speeds, and improved reliability from previous years. Thus a shared Wi-Fi access point 404 using current Wi-Fi technology is a reasonable alternative to offload traffic from a 4G/LTE cell tower 412 or a 3G/4G network 106.

However in some implementations of Wi-Fi, LTE femtocells add significant complexity to the operator's network, the additional CAPEX (shared Wi-Fi access points are cheap and many homes, hotspots and offices are already equipped) and the need for the operator to provide a deployment service to support customer-installation.

3G and LTE mobile devices support dual-transmit Wi-Fi/LTE. These 3G and LTE mobile devices support low latency and low delay handover while providing competitive battery life.

Network apparatus 400 also includes a signaling gateway (SGW) 414. The SGW 414 is responsible for transferring signaling messages (i.e. information related to call establishment, billing, location, short messages, address conversion, and other services) between the mobile device 402 through the 3G/4G cell tower 412, and the rest of the network, such as the MME server 408 and a packet gateway server (PGW) 416, that communicate using different protocols and transports, as described in RFC 2719 "Architectural Framework for Signaling Transport" published by the Internet Engineering Task Force (IEFT). The SGW 414 can be implemented as an embedded component of some other network element, or can be provided as a stand-alone network element. The PGW 416 is also known as packet data network server (PDN).

Network apparatus 400 also includes a mobile switching center (MSC) server 418 that is operably coupled to the SGSN 406, the MME 408, the 4GPP IMS 410 and the cloud 116.

Network apparatus 400 can be commercially implemented using diverse economic models including, among others, one or a combination of the following: per service charges to the mobile operator on traffic offloaded to the shared Wi-Fi access point 404, recurring revenue sharing with the owner of the shared Wi-Fi access point 404 in a per user per month basis or per offloaded traffic basis and/or a turnkey project for the mobile operator.

Figure 5:
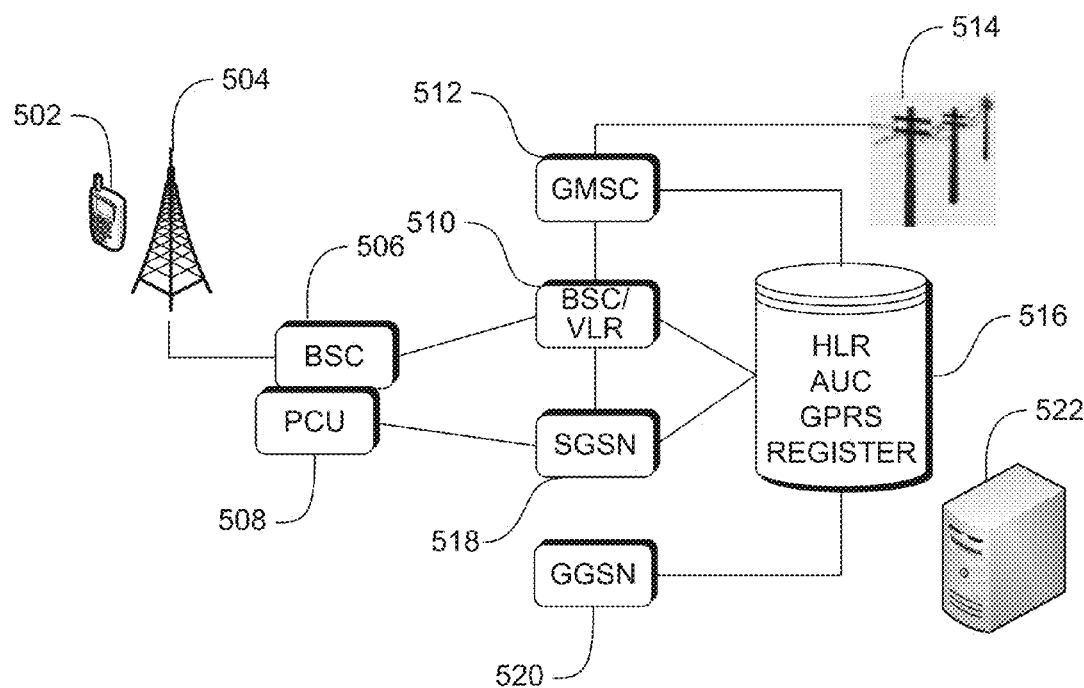
FIG. 5 is a block diagram of an overview of 3G network apparatus, according to an implementation.

FIG. 5 is a block diagram of an overview of 3G network apparatus 500, according to an implementation.

A mobile device 502 in network apparatus 500 is operable to wirelessly couple to a 3G base transceiver station (BTS) 504. Mobile device 502 is one example of mobile device 102 in FIG. 1. The 3G BTS 504 is communicatively coupled to a base station controller (BSC) 506. BSC 506 is one example of the BSC 2104 in FIG. 21. The BSC 506 is communicatively coupled to a packet control unit (PCU) 508. PCU 508 is one example of the PCU 2108 in FIG. 21. The BSC 506 is also communicatively coupled to a mobile switching center (MSC) and a visitor location register (VLR) 510. The MSC in 510 is one example of the MSC 418 in FIG. 4. The VLR in 510 is one example of VLR 2114 in FIG. 21. The MSC/VLR 510 is communicatively coupled to a Gateway Mobile Switching Centre (GMSC) 512 that is communicatively coupled to the public switched telephone network (PSTN) 514 and a home locator register (HLR), an Authentication Center (AUC) and a General Packet Radio Services (GPRS) 516. The HLR in 516 is one example of HLR 802 in FIG. 8. The AUC in 516 is a device located in the (HLR) that manages the authentication and encryption of information that is associated with individual subscribers by authenticating each SIM card in a mobile device that tries to connect to the 3G (GSM) network. The PCU 508 is communicatively coupled to a serving GPRS support node (SGSN) 518. The SGSN 518 is one example of the SGSN 406 in FIG. 4. The SGSN 518 is communicatively coupled to a gateway GPRS support node (GGSN) 520. The GGSN 520 is communicatively coupled to the HLR/AUC/

GPRS 516 and to a packet data network server (PDN) 522. The PDN 522 is one example of PDN 416 in FIG. 4.

Figure 6:
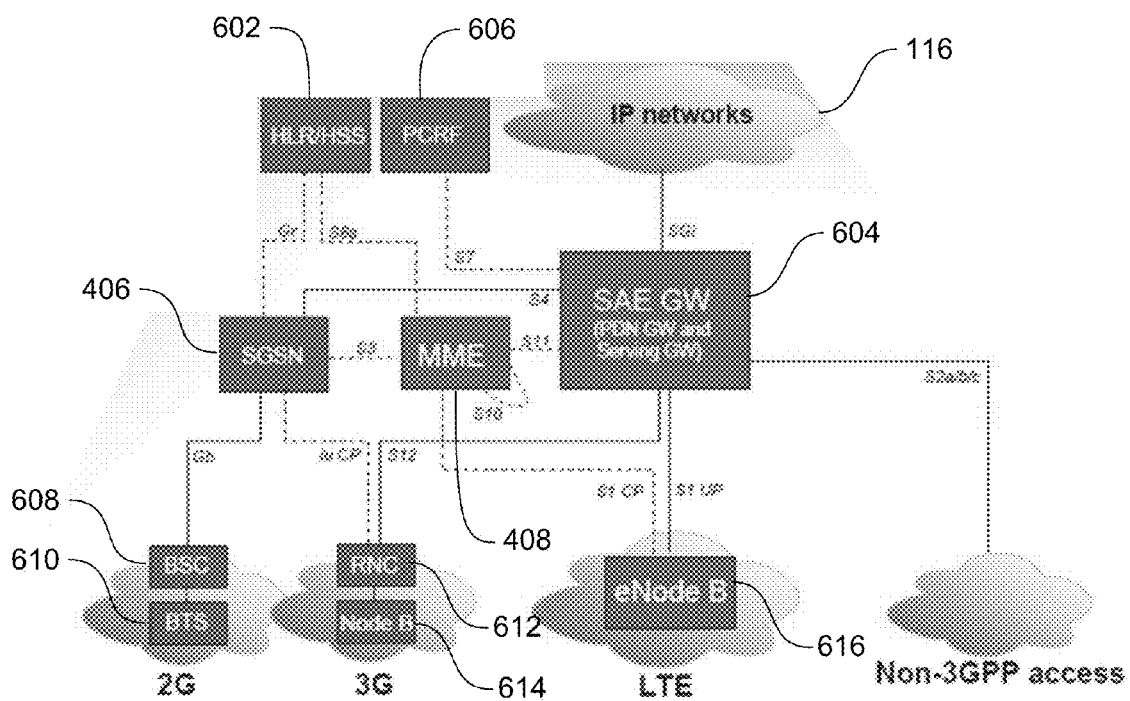
FIG. 6 is a block diagram of an overview of network apparatus to provide switching between a 3G/4G network and a shared Wi-Fi network, according to an implementation.

FIG. 6 is a block diagram of an overview of network apparatus 600 to provide switching between a 3G/4G network and a shared Wi-Fi network, according to an implementation.

Apparatus 600 includes a home locator register (HLR) and a 4G Home Subscriber Service (HSS) 602 that is operably coupled to a serving GPRS support node (SGSN) 406 that mediates access to network resources on behalf of mobile device in a 4G/LTE network and mobile device coupled to 3G/4G network, that implements packet scheduling policy between different quality of service (QoS) classes and that establishes the Packet Data Protocol (PDP) context. The HLR/HSS 602 is operably coupled to a mobility management entity (MME) server 408 is operably coupled to a System Architecture Evolution (SAE) gateway 604. The SAE Gateway 604 is operably coupled to the cloud 116 and a policy control register function (PCRF) 606. The SGSN 406 is operably coupled to a binary synchronous communications (BSC) server 608 that is operably coupled to a 2G base transceiver station (BTS) 610. The BTS 610 holds the radio transceivers that define a cell and coordinates the radio-link protocols with the mobile device. The BTS 610 is the networking component of a mobile communications system from which all signals are sent and received. The BTS 610 is controlled by a base station controller. The BTS 610 is also called a base station and is commonly referred to as a "cell phone tower". The SGSN 406 and the SAE Gateway 604 is operably coupled to a radio network controller (RNC) 612. The RNC 612 is a governing element in the UMTS radio access network (UTRAN) and is responsible for controlling at least one Node Bs 614 that are connected to the RNC 612. The RNC 612 carries out radio resource management, some of the mobility management functions and is the point where encryption is done before user data is sent to and from the mobile device. The Node B 614 is also called a base station and is commonly referred to as a "cell phone tower". The Node B uses WCDMA/TD-SCDMA for GSM. The MME 408 and the SAE Gateway 604 are operably coupled to a E-UTRAN Node B, also known as Evolved Node B (eNode B) 616. The eNode B 616 uses 4G/LTE. eNode B 616 is also called a base station and is commonly referred to as a "cell phone tower".

Figure 7:
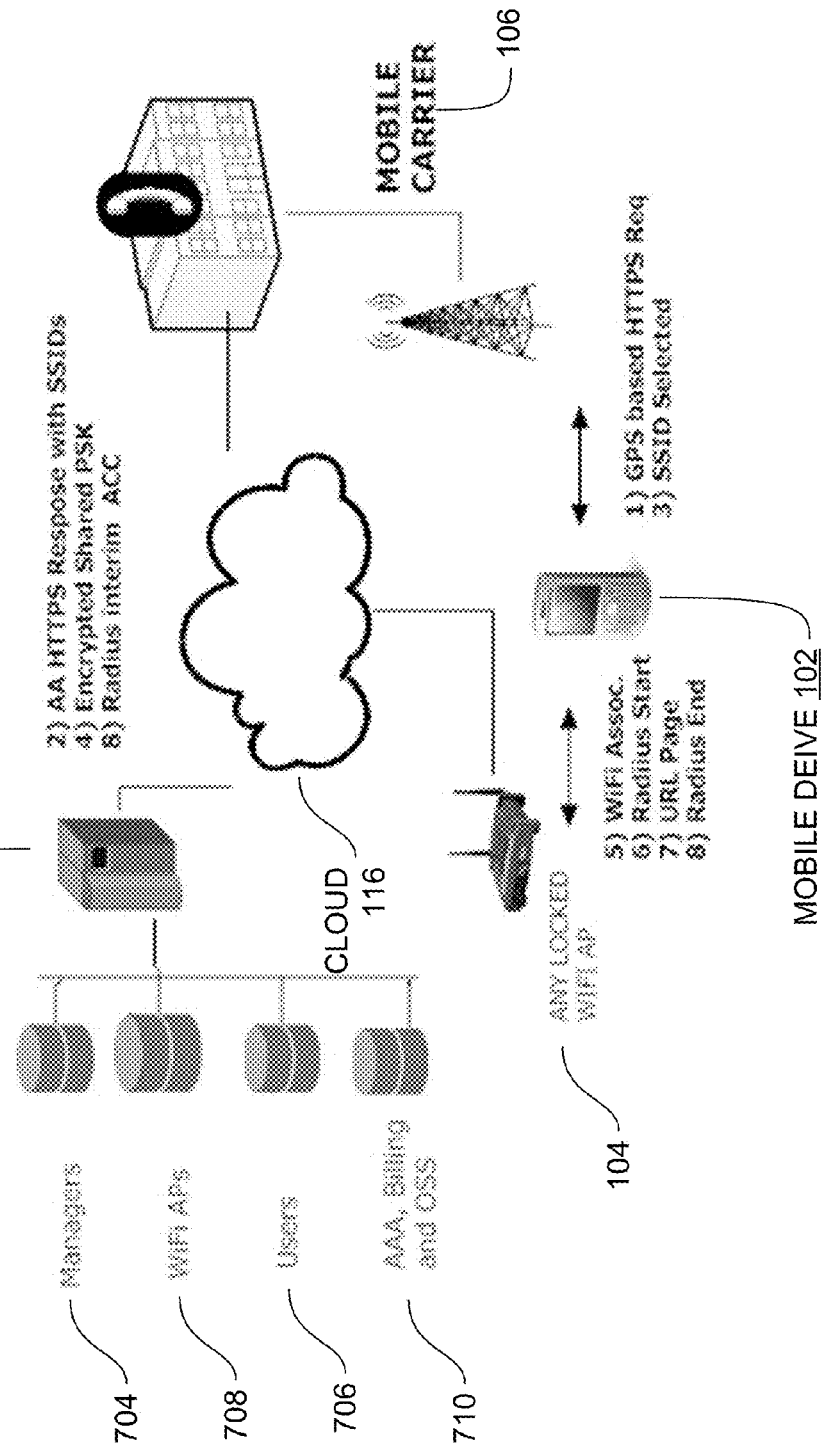
FIG. 7 is a block diagram of a system in which a pre-shared key is distributed by a next-generation network via the cloud and a 3G/4G network to a mobile device to provide access to a shared Wi-Fi access point by the mobile device in support of a B2C economic model, according to an implementation.

FIG. 7 is a block diagram of a system 700 in which a pre-shared key is distributed by a next-generation network via the cloud and a 3G/4G network to a mobile device to provide access to a shared Wi-Fi access point by the mobile device in support of a business-to-commerce (B2C) economic model, according to an implementation. Method 700 supports payment from an end user of the mobile device 102, for example via Paypal®, where no interconnection to the 3G/4G network 106 via a GRX/IPX is required.

In system 700, the mobile device 102 is operable to generate and transmit to a Web services server and a usage accounting server 702 of the NGN 110 via the 3G/4G network 106 a request for a list of shared SSIDs that includes an indication of the location of the mobile device 102 and a user ID and a password to confirm the scanned list of shared SSIDs using HTTP or HTTPS and XML. In some implementations, the mobile device 102 is operable to transmit the request using and/or any other prestablished data formatting such as Simple Object Access Protocol (SOAP) or JavaScript Object Notation (JSON). In some implementations the indication of the location of the mobile device 102 is a GPS coordinate of the mobile device 102 that is received from a GPS radio in the mobile device 102. In some implementations the indication of the location of the mobile device 102 is based on information received from the 3G/4G network. The Web services server 702 of the NGN 110 is operable to receive from the mobile device 102 via the 3G/4G network 106 the request, then authenticate and authorize the mobile device 102 and to transmit the requested list of SSIDs of shared Wi-Fi access points 104 to the mobile device 102 via the 3G/4G network. The mobile device 102 is operable to receive via the 3G/4G network 106 the list of SSIDs of shared Wi-Fi access points 104 and to select one of the shared Wi-Fi access points 104 from the list of SSIDs. The Web services server 702 of the NGN 110 is also operable to transmit an encrypted PSK of the selected shared Wi-Fi access point 104 to the mobile device 102 via the 3G/4G mobile network and the mobile device 102 is operable to receive the encrypted PSK, and to transmit the encrypted PSK to the selected shared Wi-Fi access point 104. The shared Wi-Fi access point 104 is operable to create a wireless session with the mobile device 102, transmit to the usage accounting server 702 of the NGN 110 a usage start accounting message, such as a Radius Accounting Start message, to transmit to the mobile device 102 a commercial message that is associated with a URL of a webpage, and to transmit to the usage accounting server 702 of the NGN 110 a Radius Accounting Stop message.

In some implementations, the Web services server and the usage accounting server 702 of the NGN 110 provides access by manager accounts 704 to mobile user accounts 706 stored on the NGN 110. The Web services server and the usage accounting server 702 of the NGN 110 also includes a database 708 that identifies which mobile devices 102 have access to which shared Wi-Fi access points 104 and that describes the financial terms under which the mobile devices 102 have access to the shared Wi-Fi access points 104. The Web services server and the usage accounting server 702 of the NGN 110 also includes access to a database 710 that stores information on authentication, authorization and access to the shared Wi-Fi access points 104. The Web services server and the usage accounting server 702 of the NGN 110, shared Wi-Fi access point 104 and the 3G/4G network are operably coupled to each other through the cloud 116. In the implementation shown in FIG. 7, the NGN 110 includes the Web services server and the usage accounting server 702, the manager accounts 704, the mobile user accounts 706, the database 708 and the database 710.

In some implementations, access by manager accounts to mobile user accounts 706 stored on the NGN 110 is provided using HTTP (without SSL security of HTTPS). In some implementations, access by manager accounts to mobile user accounts 706 stored on the NGN 110 is provided using and/or any other prestablished data formatting like Simple Object Access Protocol (SOAP) or JavaScript Object Notation (JSON).

Figure 8:
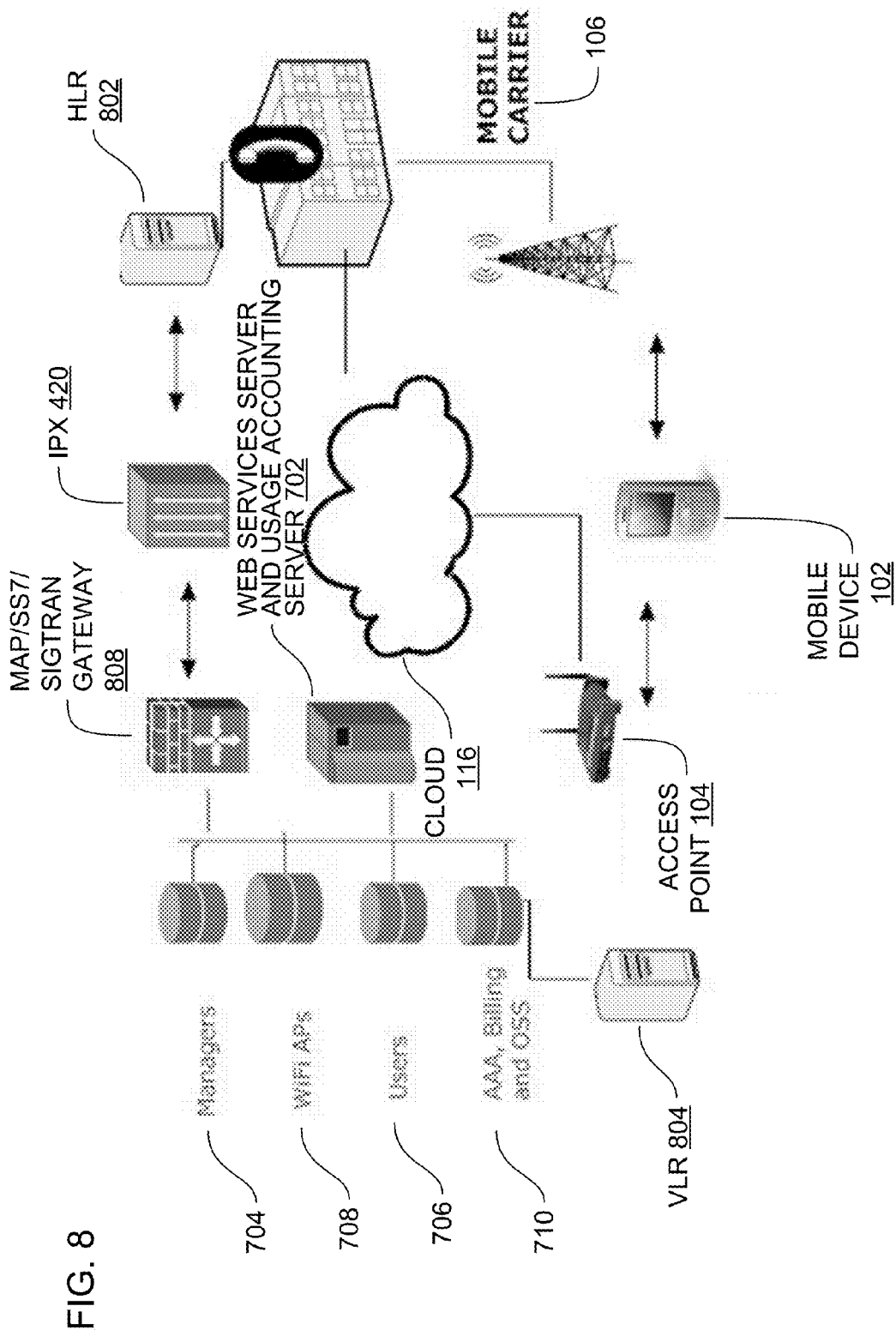
FIG. 8 is a block diagram of a system in which a pre-shared key is distributed by a next-generation network via the cloud and a 3G/4G network to a mobile device to provide mobile data offload to a shared Wi-Fi access point by the mobile device in support of a B2B economic model via roaming with an operator of the 3G/4G network, according to an implementation.

FIG. 8 is a block diagram of a system 800 in which a pre-shared key distributed by a next-generation network via a 3G/4G network to a mobile device to provide mobile data offload to a shared Wi-Fi access point by the mobile device in support of a business-to-business (B2B) economic model via roaming with an operator of the 3G/4G network, according to an implementation. In method 800, the 3G/4G network 106 transports the PSK, SSID and authorization, etc, from the 3G/4G network 106 to support roaming in the B2B business model.

The NGN 110 of system 800 includes a home locator register (HLR) 802, a 3G visitor location register (VLR) 804, the IPX server 420, the Web services server and the usage accounting server 702, the manager accounts 704, the mobile user accounts 706, the database 708, the database 710 and in some implementations to connect to a 3G GSM, network system 800 includes a MAP/SS7/Sigtran Gateway 808.

The HLR 802, such as HLR 2112 in FIG. 21, registers mobile devices with a specific network, such as the 3G/4G network 106 and stores permanent configuration data such as a user profiles. The HLR 802 also stores location information for each registered mobile device and the HLR 802 can be queried to determine the current location of a mobile device. The HLR 802 is the main database of permanent subscriber information for the 3G/4G network 106. The HLR 802 is an integral component of 3G code division multiple access (CDMA), time division multiple access (TDMA), and global system for mobile communications (GSM) networks. The HLR 802 is maintained by the home carrier of the mobile device, such as the mobile operator of the 3G/4G network 106, or the network operator where the mobile device initiated the call. The HLR 802 stores pertinent user information, including address, account status, and preferences. The HLR 802 interacts with a mobile switching center (MSC), which is a switch used for call control and processing. The MSC also serves as a point-of-access to the Public Switched Telephone Network (PSTN—the fixed network).

The VLR 804, such as VLR 2114 in FIG. 21, stores and updates temporary user information (such as current location) of the mobile device 102 to manage requests from mobile devices 102 of subscribers who are roaming (out of the area covered by the 3G/4G network 106 to which the mobile device 102 subscribed). When a mobile device 102 initiates a call, the 3G/4G network to which the mobile device 102 is connected determines whether or not the call is coming from the home area of the network from which the mobile device is subscribed. If the mobile device 102 is out of the home area of the network from which the mobile device is subscribed, the area VLR 804 sends out a request for information in support of authentication and authorization between the roaming mobile device 102 to the share Wi-Fi access point 104 and the 3G/4G mobile network 106. The VLR 804 is operably coupled to the database 808 that stores information on authentication, authorization and access to the shared Wi-Fi access points 104. The request for the authentication and authorization of the mobile device can be sent either directly to the network of the 3G/4G mobile operator 106 or to the network of the 3G/4G mobile operator 106 through the IPX server 420 and the MAP/SS7/Sigtran Gateway 808.

Method Implementations

In the previous section, a system level overview of the operation of an implementation is described. In this section, the particular methods of such an implementation are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware are also composed of computer-executable instructions.

Figure 19:
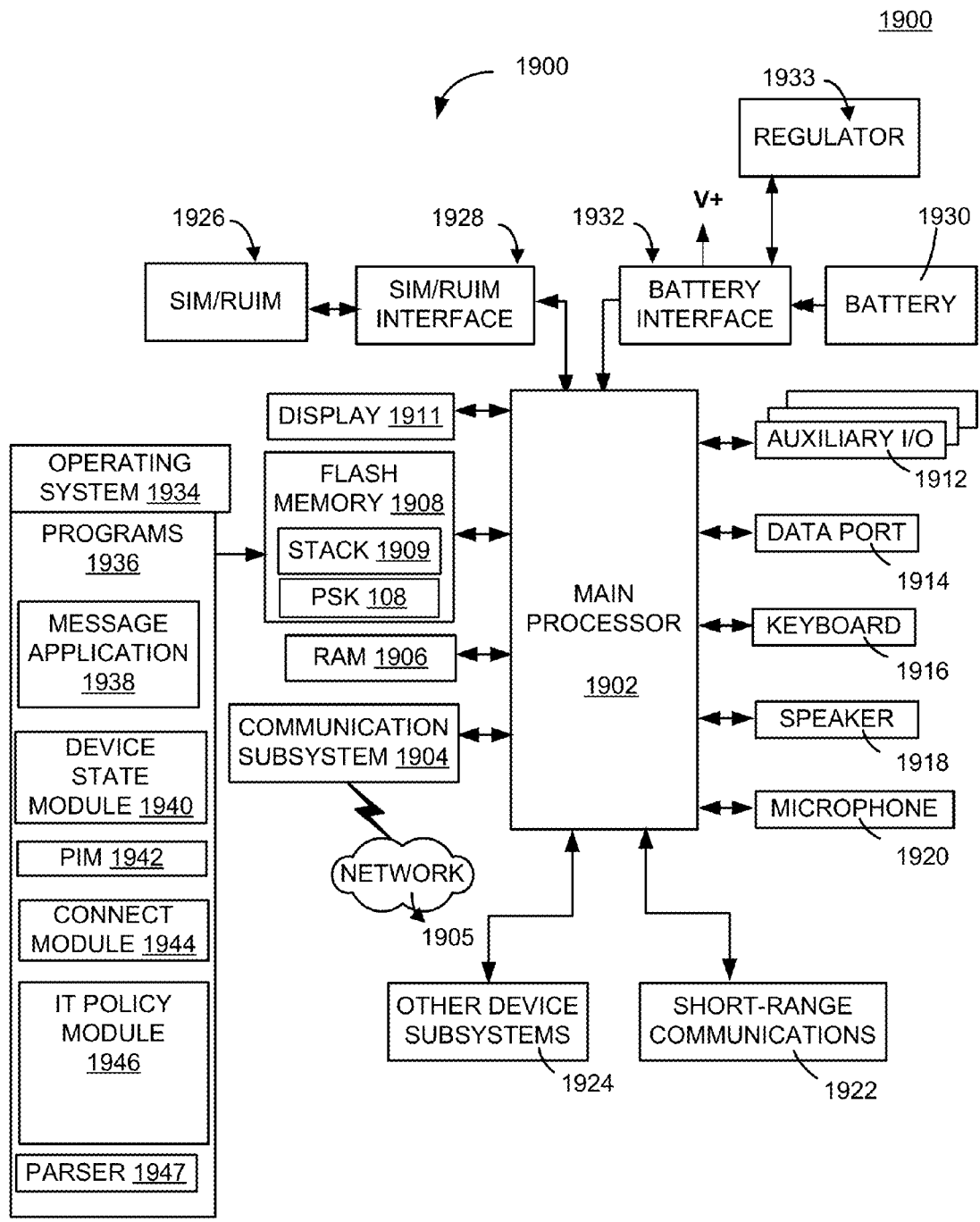
FIG. 19 is a block diagram of a mobile device, according to an implementation.

Mobile device 102 in FIG. 1 and mobile device 1900 in FIG. 19 are examples of the mobile device of FIG. 9-18. The NGN 110 of FIG. 1 is an example of the NGN in FIG. 9-18. The shared Wi-Fi access point 104 in FIG. 1 is one example of the shared Wi-Fi access point of FIG. 9-18. The 3G/4G network 106 of FIG. 1 is one example of the 3G/4G network of FIG. 9-18.

Figure 9:
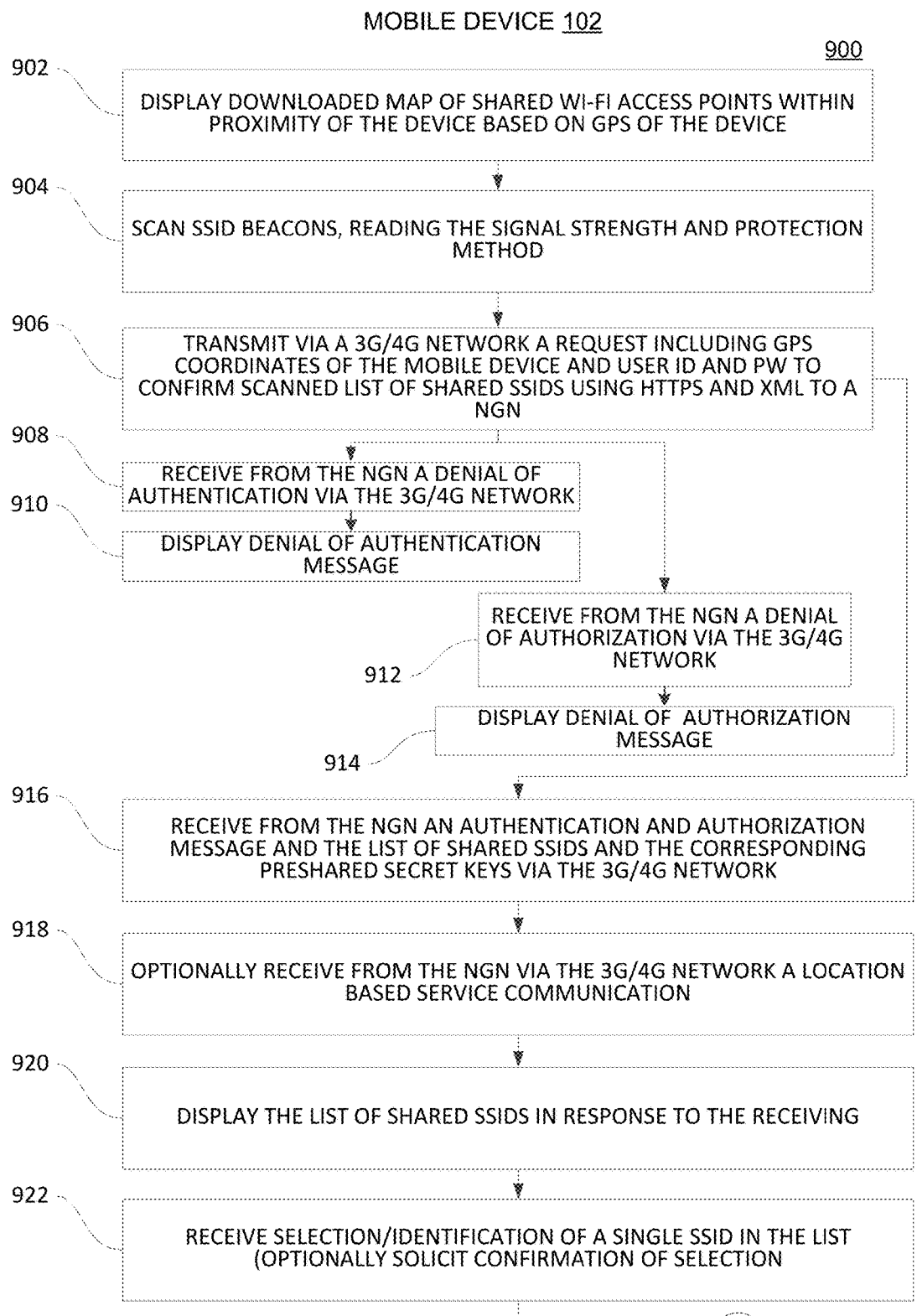
FIG. 9-10 illustrate a flowchart of a method of communication of a mobile device between a 3G/4G network and a shared Wi-Fi access point, according to an implementation.
Figure 10:
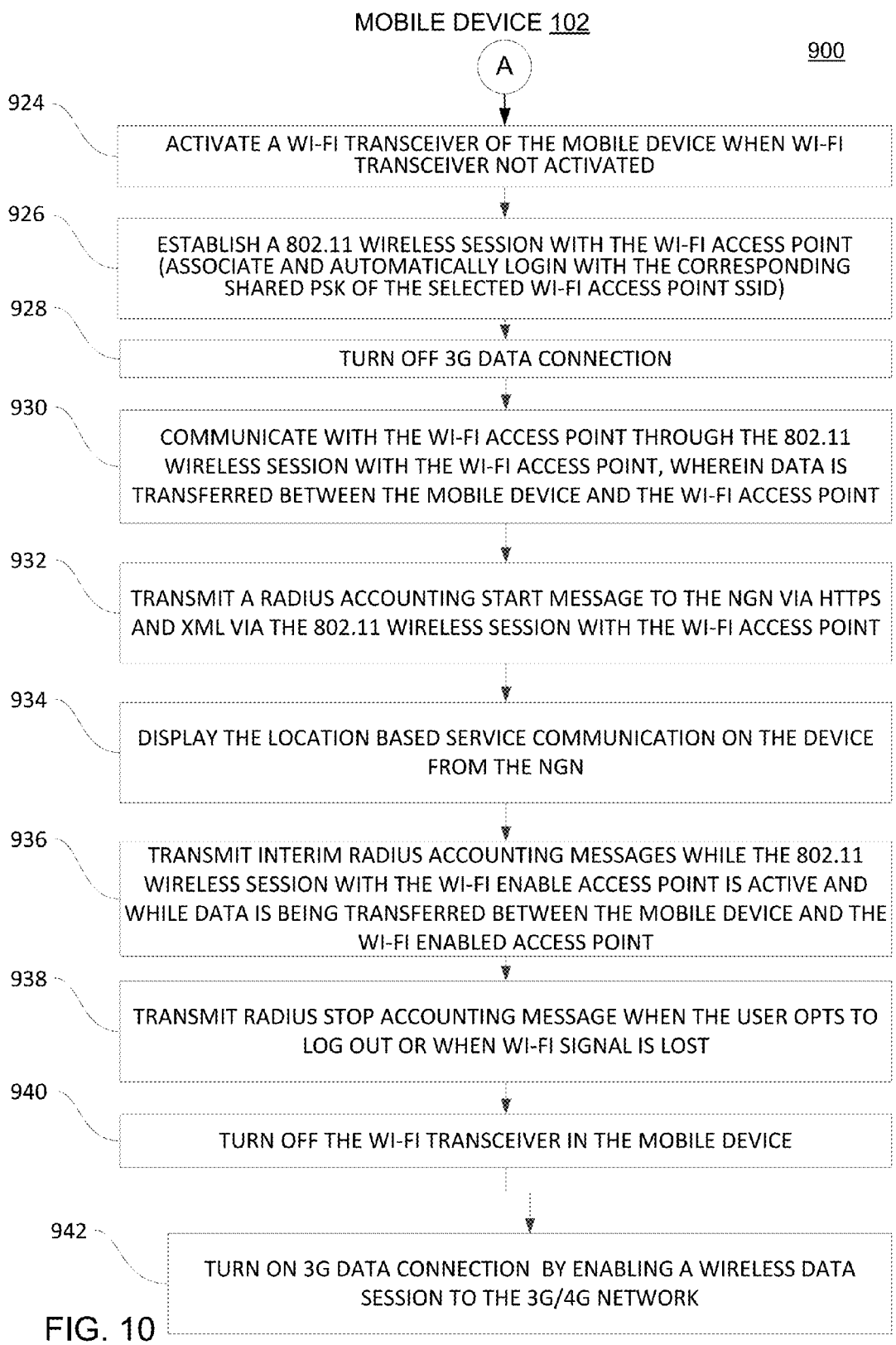

FIG. 9-10 illustrate a flowchart of a method of communication 900 of a mobile device between a 3G/4G network and shared Wi-Fi access point, according to an implementation. Method 900 is performed by a program executing on, or performed by firmware or hardware that is a part of, a computer, such as mobile device 102 in FIG. 1 and FIG. 3 and mobile device 402 in FIG. 4 and mobile device 1900 in FIG. 19 and FIG. 22. The mobile device is operable to communicate in both a 3G/4G protocol and a Wi-Fi protocol. Method 900 begins with the mobile device communicating non-voice data through the 3G/4G network, and thereafter non-voice data communication is switched to the shared Wi-Fi access point.

In some implementations, method 900 includes displaying a map that portrays shared Wi-Fi access point(s) that are within proximity of the mobile device, at block 902. The proximity is based on a GPS location of a shared Wi-Fi access point 104 that is within a physical distance of the device, based on a GPS location of the device that is received from a GPS radio in the Wi-Fi access point 104. In some implementations, the map is downloaded via the 3G/4G network. In some implementations, the map is generated by the mobile device. In some implementations, the center of the map is the physical location of the mobile device 104.

In some implementations, method 900 includes scanning SSID beacons to read the signal strength and protection method of the SSID beacons, at block 904. The SSIDs are not displayed on the mobile device. SSID is short for service set identifier. SSID is a case sensitive, up to 32 alphanumeric character unique identifier attached to the header of packets sent over a wireless local-area network (WLAN) of the shared Wi-Fi access point that acts as a password when a mobile device tries to connect to the basic service set (BSS)—a component of the IEEE 802.11 WLAN architecture. The SSID differentiates one WLAN from another, so all access points and all devices attempting to connect to a specific WLAN must use the same SSID to enable effective roaming. As part of the association process, the mobile device client must have the same SSID as the one broadcast in the access point or the mobile device will not be permitted to join the BSS. An SSID is also referred to as a network name because essentially it is a name that identifies a wireless network.

In some implementations, method 900 includes transmitting via a 3G/4G network a request that includes GPS coordinates of the mobile device and a user ID and a password to confirm the scanned list of shared SSIDs using HTTP or HTTPS and XML to a NGN, at block 906. In some implementations, the request is transmitted using and/or any other prestablished data formatting such as Simple Object Access Protocol (SOAP) or JavaScript Object Notation (JSON). In some implementations the GPS coordinate of the mobile device 102 is received from a GPS radio in the mobile device 102. In some implementations the GPS coordinates are based on information received from the 3G/4G network. In some implementations the user ID can be an identification number of a SIM card of the mobile device or MAC address of the mobile device.

In some implementations, method 900 includes receiving from the NGN a denial of authentication via the 3G/4G network, at block 908, and in some implementations, method 900 thereafter includes displaying a message indicating the denial of authentication, at block 910.

In some implementations, method 900 includes receiving from the NGN a denial of authorization via the 3G/4G network, at block 912, and in some implementations, method 900 thereafter includes displaying a message of denial of authorization, at block 914.

In some implementations, method 900 includes receiving from the NGN an authentication and authorization message and the list of shared SSIDs and the corresponding preshared secret keys (PSK) via the 3G/4G network, at block 916. The PSK is not displayed on the display of the mobile device.

In some implementations, method 900 includes receiving from the NGN via the 3G/4G network a location based service communication (such as an advertisement that is related to the GPS locale of the mobile device) on the mobile device, at block 918. The communication can be in either a webpage URL or HTTP message.

In some implementations, method 900 includes displaying the list of shared SSIDs in response to the receiving, at block 920. In some implementations, method 900 thereafter includes displaying access cost and signal strength (RSSI) of each SSID.

In some implementations, method 900 includes receiving from the user a selection, identification or representation of a single SSID in the list, at block 922. In some implementations, method 900 thereafter includes soliciting confirmation of selection, displaying the RSSI and receiving confirmation of the selection.

In some implementations, method 900 includes activating a Wi-Fi transceiver of the mobile device when a Wi-Fi transceiver is not activated, at block 924.

In some implementations, method 900 includes establishing a 802.11 wireless session with the shared Wi-Fi access point, at block 926, which in some implementations includes associating and automatically logging-in with the corresponding shared PSK of the selected shared Wi-Fi access point SSID.

In some implementations, method 900 includes turning off a 3G data connection, at block 928, which in some implementations includes disabling a wireless data session to the 3G/4G network.

In some implementations, method 900 includes communicating with the shared Wi-Fi access point through the 802.11 wireless session with the shared Wi-Fi access point, wherein data is transferred between the mobile device and the shared Wi-Fi access point, at block 930. The data can be either voice, data and/or video.

In some implementations, method 900 includes transmitting a Radius start-accounting message to the NGN via HTTP or HTTPS and XML and via the 802.11 wireless session with the shared Wi-Fi access point, at block 932. In some implementations the message is transmitted using and/or any other prestablished data formatting such as Simple Object Access Protocol (SOAP) or JavaScript Object Notation (JSON).

In some implementations, method 900 includes displaying the location based service communication (e.g. advertisement) on the mobile device from the NGN, at block 934. The communication can be represented either by a webpage URL or HTTP message).

In some implementations, method 900 includes transmitting a usage interim accounting message, such as a Radius interim-accounting message(s), via the 802.11 wireless session with the shared Wi-Fi access point while the 802.11 wireless session with the shared Wi-Fi access point is active and while data is being transferred between the mobile device and the shared Wi-Fi access point, at block 936.

In some implementations, method 900 includes transmitting a usage stop accounting message, such as a Radius Stop-Accounting message, via the 802.11 wireless session with the shared Wi-Fi access point when the user opts to log out or when the Wi-Fi signal is lost, at block 938. The usage accounting messages at blocks 932, 936 and 938 are an important aspect of this disclosure because one purpose of the systems, methods and apparatus disclosed herein is to provide commercial access by the mobile device 102 to the shared Wi-Fi access point 104. But commercial access cannot be financially justified without providing accounting of data usage of the shared Wi-Fi access point 104 by the mobile device 102. Thus, the Radius accounting messages support an important aspect of the systems, methods and apparatus disclosed herein.

In some implementations, method 900 includes turning off the Wi-Fi transceiver in the mobile device, at block 940.

In some implementations, method 900 includes turning on the 3G data connection to enable a wireless data session to the 3G/4G network, at block 942.

Figure 11:
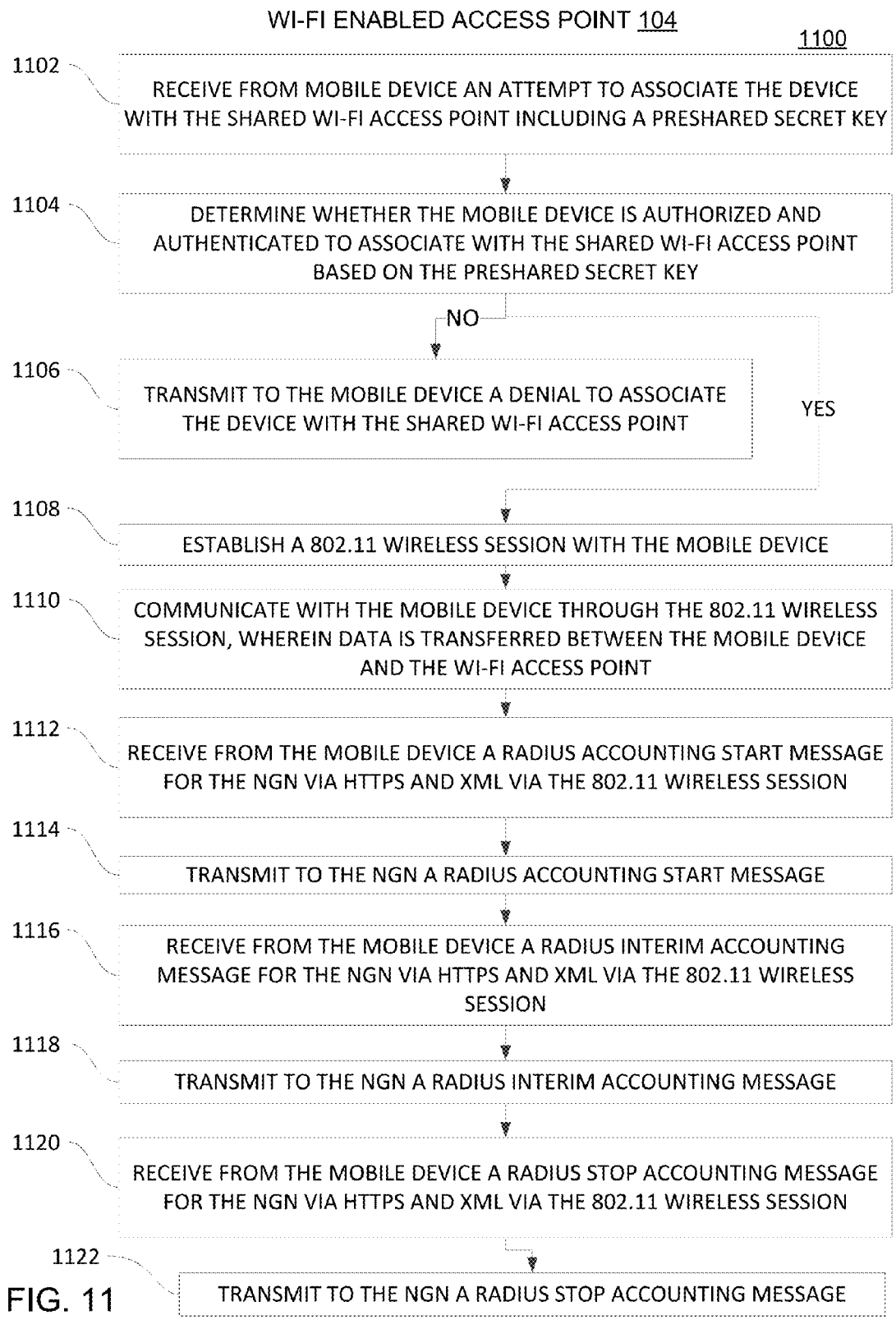
FIG. 11 illustrates a flowchart of a method of communication of a shared Wi-Fi access point between a mobile device and a next-generation network, according to an implementation.

FIG. 11 illustrates a flowchart of a method 1100 of communication of a shared Wi-Fi access point between a mobile device and a next-generation network, according to an implementation. Mobile device 102 in FIG. 1 and mobile device 1900 in FIG. 19 are examples of the mobile device of method 1100. Method 1100 is performed by a program executing on, or performed by firmware or hardware that is a part of, a computer, such as Wi-Fi access point 104 in FIG. 1 and FIG. 3 and Wi-Fi access point 404 in FIG. 4 or node 2102 in FIG. 21.

In some implementations, method 1100 includes receiving from the mobile device an attempt or request to associate the mobile device with the shared Wi-Fi access point including a preshared secret key, at block 1102.

In some implementations, method 1100 includes determining whether the mobile device is authorized and authenticated to associate with the shared Wi-Fi access point, at block 1104. The determining at block 1104 is performed in reference to the preshared secret key.

In some implementations, method 1100 includes transmitting to the mobile device a denial to associate the mobile device with the shared Wi-Fi access point, at block 1106.

In some implementations, method 1100 includes establishing a 802.11 wireless session with the mobile device, at block 1108. Some further implementations of the establishing at block 1108 include associating and logging-in with the selected shared Wi-Fi access point.

In some implementations, method 1100 includes communicating with the mobile device through the 802.11 wireless session, wherein data is transferred between the mobile device and the shared Wi-Fi access point, at block 1110. The data can be either voice or data or voice and data.

In some implementations, method 1100 includes receiving from the mobile device a Radius start-accounting message for the NGNO via HTTP or HTTPS and XML, via the 802.11 wireless session, at block 1112. In some implementations the message is transmitted using and/or any other prestablished data formatting such as Simple Object Access Protocol (SOAP) or JavaScript Object Notation (JSON).

In some implementations, method 1100 includes transmitting to the NGN a Radius start-accounting message, at block 1114.

In some implementations, method 1100 includes receiving from the mobile device a usage interim accounting message, such as a Radius Interim-Accounting message, for the NGN via HTTP or HTTPS and XML via the 802.11 wireless session, at block 1116. In some implementations the message is transmitted using and/or any other prestablished data formatting such as Simple Object Access Protocol (SOAP) or JavaScript Object Notation (JSON).

In some implementations, method 1100 includes transmitting to the NGN a usage interim accounting message, such as a Radius Interim-Accounting message, at block 1118.

In some implementations, method 1100 includes receiving from the mobile device a usage stop accounting message, such as a Radius Stop-Accounting message, for the NGN via HTTP or HTTPS and XML via the 802.11 wireless session, at block 1120. In some implementations the message is transmitted using and/or any other prestablished data formatting such as Simple Object Access Protocol (SOAP) or JavaScript Object Notation (JSON).

In some implementations, method 1100 includes transmitting to the NGN a usage stop accounting message, such as a Radius Stop-Accounting message, at block 1122.

Radius is a networking protocol that provides centralized authentication, authorization, and accounting (AAA) management for computers to connect and use a network service. Radius was developed by Livingston Enterprises, Inc., in 2191 as an access server authentication and accounting protocol and later brought into the Internet Engineering Task Force (IETF) standards. Radius is one example of a variety of AAA management that can be implemented by the systems, methods and apparatus described herein.

Because of the broad support and the ubiquitous nature of the Radius protocol, the Radius standard is often used by ISPs and enterprises to manage access to the Internet or internal networks, wireless networks, and integrated e-mail services. These networks may incorporate modems, DSL, access points, VPNs, network ports, web servers, etc.

Radius is a client/server protocol that runs in the application layer, using UDP as transport. The remote access server, the virtual private network server, the network switch with port-based authentication, and the network access server (NAS), are all gateways that control access to the network, and all have a Radius client component that communicates with the Radius server. Radius serves three functions: to authenticate mobile devices before granting access to a network; to authorize those mobile devices for certain network services; and to account for usage of those services by the mobile devices.

Radius servers use the AAA concept to manage network access in the following two-step process, also known as an "AAA transaction". AAA stands for "authentication, authorization and accounting". Authentication and authorization characteristics in Radius are described in RFC 2865 while accounting is described by RFC 2866 published by the IEFT.

In authentication and authorization, the mobile device sends a request to a remote access server (RAS) to gain access to a particular network resource using access credentials. The credentials are passed to the RAS device via the link-layer protocol—for example, Point-to-Point Protocol (PPP) in the case of many dialup or DSL providers or posted in an HTTP or HTTPS secure web form. In some implementations the request is transmitted using and/or any other prestablished data formatting such as Simple Object Access Protocol (SOAP) or JavaScript Object Notation (JSON). In turn, the RAS sends a Radius Access Request message to the Radius server, requesting authorization to grant access via the Radius protocol. This request includes access credentials, typically in the form of username and password or security certificate provided by the user. Additionally, the request may contain other information which the RAS knows about the user, such as its network address or phone number, and information regarding the user's physical point of attachment to the RAS. The Radius server checks that the information is correct using authentication schemes like PAP, CHAP or EAP. The user's proof of identification is verified, along with, optionally, other information related to the request, such as the user's network address or phone number, account status and specific network service access privileges. Historically, Radius servers checked the user's information against a locally stored flat file database. Modern Radius servers can do this, or can refer to external sources—commonly SQL, Kerberos, LDAP, or Active Directory servers—to verify the user's credentials.

The Radius server then returns one of three responses to the NAS: 1) Access Reject, 2) Access Challenge or 3) Access Accept. Access Reject—The user is unconditionally denied access to all requested network resources. Reasons may include failure to provide proof of identification or an unknown or inactive user account. An access challenge requests additional information from the user such as a secondary password, PIN, token or card. Access Challenge is also used in more complex authentication dialogs where a secure tunnel is established between the user machine and the Radius Server in a way that the access credentials are hidden from the RAS. In access accept the user is granted access. Once the user is authenticated, the Radius server will often check that the user is authorized to use the network service requested. A given user may be allowed to use a company's wireless network, but not its VPN service, for example. Again, this information may be stored locally on the Radius server, or may be looked up in an external source like LDAP or Active Directory. Each of these three Radius responses may include a Reply-Message attribute which may give a reason for the rejection, the prompt for the challenge, or a welcome message for the acceptance. The text in the attribute can be passed on to the user in a return web page. Authorization attributes are conveyed to the RAS stipulating terms of access to be granted. For example: the following authorization attributes may be included in an Access-Accept. The specific IP address to be assigned to the user address pool from which the user's IP should be chosen The maximum length that the mobile device may remain connected, an access list, priority queue or other restrictions on access L2TP parameters of the mobile device, VLAN parameters and QoS parameters

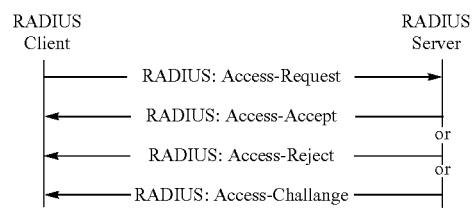

Accounting is described in RFC 2866 published by the IEFT. When network access is granted to the user by the NAS, an Accounting Start (a Radius Accounting Request packet containing an Acct-Status-Type attribute with the value "start") is sent by the NAS to the Radius server to signal the start of the user's network access. "Start" records typically contain the user's identification, network address, point of attachment and a unique session identifier. Periodically, Interim Update records (a Radius Accounting Request packet containing an Acct-Status-Type attribute with the value "interim-update") may be sent by the NAS to the Radius server, to update the NAS on the status of an active session. "Interim" records typically convey the current session duration and information on current data usage. Finally, when network access of the mobile device is closed, the NAS issues a final Accounting Stop record (a Radius Accounting Request packet containing an Acct-Status-Type attribute with the value "stop") to the Radius server, providing information on the final usage in terms of time, packets transferred, data transferred, reason for disconnect and other information related to the user's network access. Typically, the client sends Accounting-Request packets until client receives an Accounting-Response acknowledgement, using some retry interval. The primary purpose of this data is that the user can be billed accordingly; the data is also commonly used for statistical purposes and for general network monitoring.

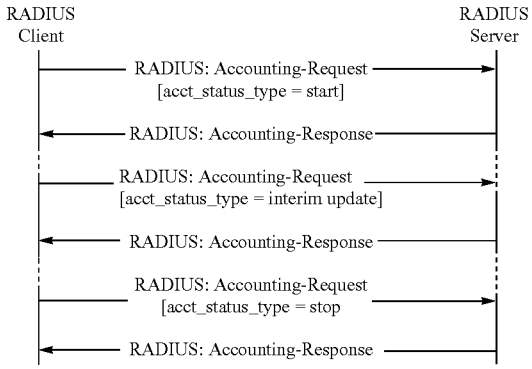

Radius is commonly used to facilitate roaming between ISPs, for example: by companies which provide a single global set of credentials that are usable on many public networks; by independent, but collaborating, institutions issuing their own credentials to their own users, that allow a visitor from one to another to be authenticated by their home institution, such as in Eduroam. Radius facilitates this by the use of realms, which identify where the Radius server should forward the AAA requests for processing.

Figure 12:
FIG. 12 illustrates a flowchart of a method of communication by a next-generation network to a 3G/4G network and a shared Wi-Fi access point, according to an implementation.

FIG. 12 illustrates a flowchart of a method 1200 of communication by a next-generation network to a 3G/4G network and a shared Wi-Fi access point, according to an implementation. Mobile device 102 in FIG. 1 and mobile device 1900 in FIG. 19 are examples of the mobile device of method 1200. Method 1200 is performed by a program executing on, or performed by firmware or hardware that is a part of, a computer, such as next-generation network 110 in FIG. 1 and FIG. 3 and shared Wi-Fi access point 404 in FIG. 4 or node 2102 in FIG. 21.

In some implementations, method 1200 includes registering the mobile device, at block 1202.

In some implementations, method 1200 includes registering the Wi-Fi access point, at block 1204. Registering the Wi-Fi access point at the NGN at block 1204 makes the Wi-Fi access point a shared Wi-Fi access point 124 because the NGN provide widespread access to the Wi-Fi access point.

In some implementations, method 1200 includes receiving from the mobile device via the 3G/4G network a request for a list of shared SSIDs, the request including GPS coordinates of the mobile device user ID and password, at block 1206. In some implementations the GPS coordinates of the mobile device are received from a GPS radio in the mobile device. In some implementations the GPS coordinates is based on information received by mobile device from the 3G/4G network.

In some implementations, method 1200 includes generating the list of shared SSIDs and corresponding preshared secret keys (PSK) in a one-for-one correspondence between the shared SSIDs and corresponding preshared secret keys in the vicinity of the mobile device based on GPS coordinates, at block 1208.

In some implementations, method 1200 includes transmitting the list of shared SSIDs and the corresponding preshared secret keys to the 3G/4G network the list of shared SSIDs, at block 1210.

In some implementations, method 1200 includes receiving from the mobile device via the shared Wi-Fi access point a Radius start-accounting message, at block 1212.

In some implementations, method 1200 includes starting accounting the 802.11 wireless session between the mobile device and the shared Wi-Fi access point, at block 1214.

In some implementations, method 1200 includes receiving from the mobile device via the shared Wi-Fi access point Radius interim-accounting message(s), at block 1216.

In some implementations, method 1200 includes receiving from the mobile device via the shared Wi-Fi access point a Radius end-accounting message, at block 1218.

Figure 13:
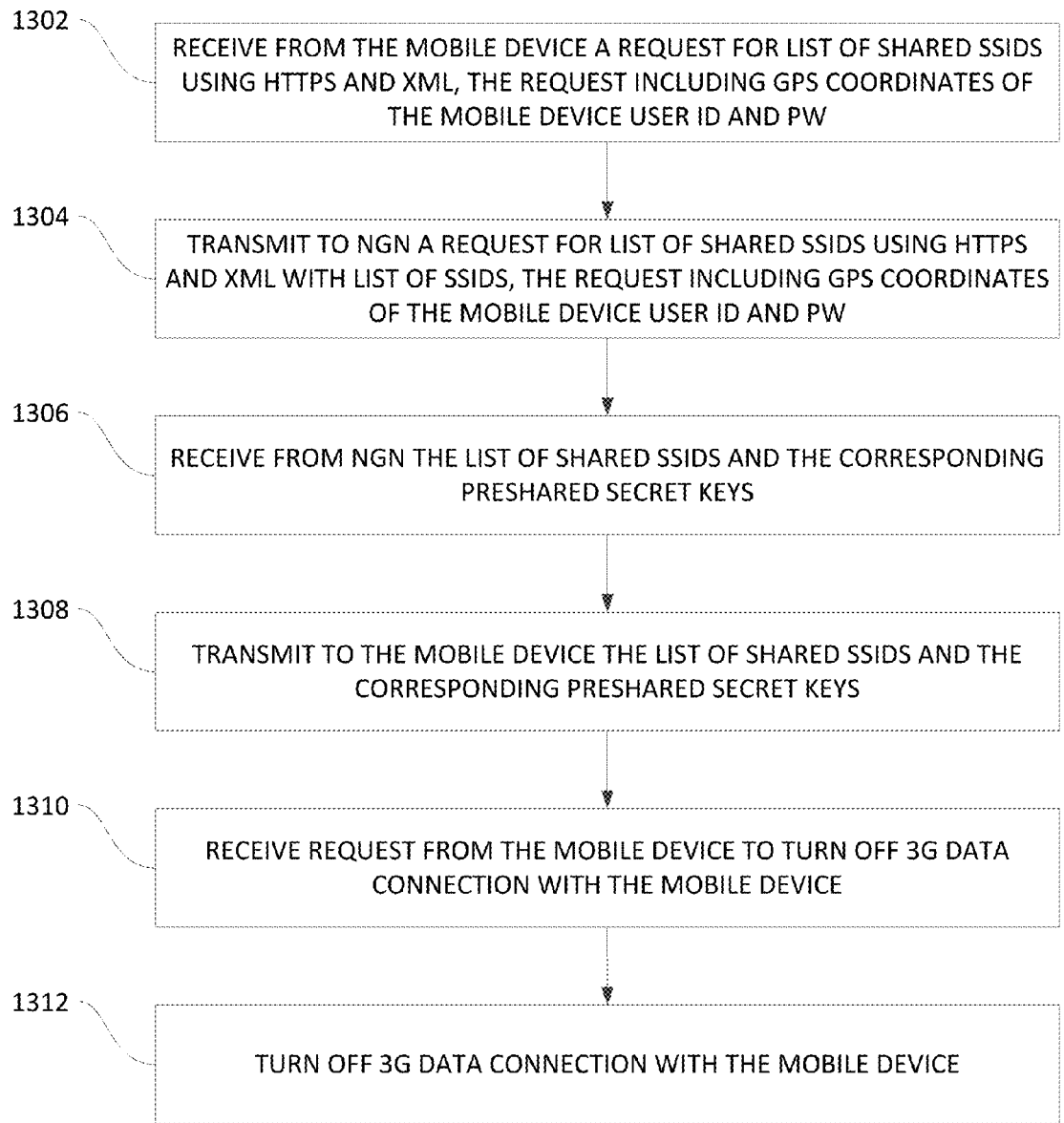
FIG. 13 illustrates a flowchart of a method of communication of a 3G/4G mobile network with a next-generation network, according to an implementation.

FIG. 13 illustrates a flowchart of a method 1300 of communication of a 3G/4G network with a next-generation network, according to an implementation. Mobile device 122 in FIG. 1 and mobile device 1900 in FIG. 19 are examples of the mobile device of method 1300. Method 1300 is performed by a program executing on, or performed by firmware or hardware that is a part of, a computer, such as the 3G/4G network 106 in FIG. 1, the 3G/4G network 312 in FIG. 3 or network 1905 in FIG. 19.

In some implementations, method 1300 includes receiving from the mobile device a request for a list of shared SSIDs using HTTP or HTTPS and XML with list of SSIDS, the request including GPS coordinates of the mobile device user ID and password, at block 1302. The user ID can be a simID or MAC address of the mobile device. In some implementations the message is received using and/or any other prestablished data formatting such as Simple Object Access Protocol (SOAP) or JavaScript Object Notation (JSON).

In some implementations, method 1300 includes transmitting to NGN a request for list of shared SSIDs using HTTP or HTTPS and XML with list of SSIDS. The request includes GPS coordinates of the mobile device user id and PW, at block 1304. In some implementations the message is transmitted using and/or any other prestablished data formatting such as Simple Object Access Protocol (SOAP) or JavaScript Object Notation (JSON).

In some implementations, method 1300 includes receiving from the NGN the list of shared SSIDs and the corresponding preshared secret keys, at block 1306.

In some implementations, method 1300 includes transmitting to the mobile device the list of shared SSIDs and the corresponding preshared secret keys, at block 1308.

In some implementations, method 1300 includes receiving a request from the mobile device to turn off 3G data connection with the mobile device (request to disable a wireless data session to the mobile device), at block 1310.

In some implementations, method 1300 includes turning off the 3G data connection with the mobile device, at block 1312, which in some implementations includes disabling a wireless data session to the mobile device.

In some implementations, methods 900-1300 are implemented as a sequence of instructions which, when executed by a processor, such as processing units 1904 in FIG. 19, cause the processor to perform the respective method. In other implementations, methods 900-1300 are implemented as a computer-accessible medium having executable instructions capable of directing a processor, such as processing units 1904 in FIG. 23, to perform the respective method. In varying implementations, the medium is a magnetic medium, an electronic medium, or an optical medium.

FIG. 14-18 are a series of sequence diagrams of the interaction between a mobile device, a shared Wi-Fi access point, a next-generation network and a 3G/4G mobile network, according to an implementation.

In FIG. 14, the NGN registers a mobile device 1402 and registers shared Wi-Fi enabled access point 1404.

The mobile device displays downloaded map of shared Wi-Fi access points within proximity of the device based on GPS of the device 902.

The mobile device scans SSID beacons, reading the signal strength and protection method 904 and transmit via a 3G/4G-network a request including GPS coordinates of the mobile device and user ID and PW to confirm scanned list of shared SSIDs to a NGN 906.

The 3G/4G network receives from the mobile device a request for list of shared SSIDs using HTTP or HTTPS and XML with list of SSIDS, the request including GPS coordinates of the mobile device user ID and PW 1302 and transmits to the NGN a request for list of shared SSIDs using HTTPS and XML with list of SSIDS, the request Including GPS coordinates of the mobile device user ID and PW 1304. In some implementations the message is received and transmitted using and/or any other prestablished data formatting such as Simple Object Access Protocol (SOAP) or JavaScript Object Notation (JSON).

Turning to FIG. 15, the NGN receives from the mobile device via the 3G/4G-network a request for a list of shared SSIDs, the request including GPS coordinates of the mobile device user ID and PW 1206, generates the list of shared SSIDs and corresponding preshared secret keys (PSK) in the vicinity of the mobile device based on GPS coordinates 1208 and transmits the list of shared SSIDs and the corresponding preshared secret keys to the 3G/4G-network the list of shared SSIDs 1210.

The 3G/4G network receives from the NGN the list of shared SSIDs and the corresponding preshared secret keys 1306 and transmits to the mobile device the list of shared SSIDs and the corresponding preshared secret keys 1308.

Turning to FIG. 16, the mobile device receives from the NGN an authentication and authorization message and the list of shared SSIDs and the corresponding preshared secret keys via the 3G/4G-network 916, receives from the NGN via the 3G/4G-network a location based service communication on the device 918, Display the list of shared SSIDS in response to the receiving 920, receives selection/identification of a single SSID in the list 922, activates a Wi-Fi transceiver of the mobile device when Wi-Fi transceiver not activated 924 and establishes a 802.11 wireless session with the shared Wi-Fi access point 926.

The shared Wi-Fi access point receives from mobile device an Attempt to associate the device with the shared Wi-Fi access point including a preshared secret key 1102, determine whether the mobile device is authorized and authenticated to associate with the shared Wi-Fi access point based on the preshared secret key 1104, establishes a 802.11 wireless session with the mobile device by associate and automatically login with the selected shared Wi-Fi access point 1108 and communicates with the mobile device through the 802.11 wireless session, wherein data is transferred between the mobile device and the shared Wi-Fi access point 1110.

Turning to FIG. 17, the mobile device turns off 3G data connection 928 and communicates with the shared Wi-Fi access point through the 802.11 wireless session with the shared Wi-Fi access point 930.

The 3G/4G network receives a request from the mobile device to turn off 3G data connection with the mobile device 1310 and turns off 3G data connection with the mobile device 1312.

The mobile device communicates with the shared Wi-Fi access point through the 802.11 wireless session with the shared Wi-Fi access point 930 and transmits a Radius start accounting message to the NGN via HTTP or HTTPS and XML via the 802.11 wireless session with the shared Wi-Fi access point 932. In some implementations the message is received and transmitted using and/or any other prestablished data formatting such as Simple Object Access Protocol (SOAP) or JavaScript Object Notation (JSON).

The shared Wi-Fi access point receives from the mobile device a Radius start accounting message for the NGN via HTTP or HTTPS and XML via the 802.11 wireless session 1112 and transmits to the NGN a Radius start accounting message 1114. In some implementations the message is received and transmitted using and/or any other prestablished data formatting such as Simple Object Access Protocol (SOAP) or JavaScript Object Notation (JSON).

The NGN receives from the mobile device via the shared Wi-Fi access point a Radius start accounting message 1212 and starts accounting the 802.11 wireless session between the mobile device and the shared Wi-Fi access point 1214. In some implementations the message is transmitted using and/or any other prestablished data formatting such as Simple Object Access Protocol (SOAP) or JavaScript Object Notation (JSON).

The mobile device optionally displays the location based service communication on the mobile device 934 and transmits interim radius accounting messages while the 802.11 wireless session is active and data is being transferred between the mobile device and the shared Wi-Fi access point 936.

Turning to FIG. 18, the shared Wi-Fi access point receives from the mobile device a Radius interim accounting message for the NGN via HTTP or HTTPS and XML via the 802.11 wireless session 1116 and transmits to the NGN a Radius interim accounting message 1118. In some implementations the message is received and transmitted using and/or any other prestablished data formatting such as Simple Object Access Protocol (SOAP) or JavaScript Object Notation (JSON).

The NGN receives from the mobile device via the shared Wi-Fi access point Radius interim accounting message(s) 1216.

The mobile device transmits radius stop accounting message when the user opts to log out or when Wi-Fi signal is lost 938.

The shared Wi-Fi access point receives from the mobile device a Radius stop accounting message for the NGN via HTTP or HTTPS and XML via the 802.11 wireless session 1120 and transmits to the NGN a Radius stop accounting message 1122. In some implementations the message is received and transmitted using and/or any other prestablished data formatting such as Simple Object Access Protocol (SOAP) or JavaScript Object Notation (JSON).

The NGN receives from the mobile device via the shared Wi-Fi access point a Radius end accounting message 1218.

The mobile device turns off the shared Wi-Fi transceiver in the mobile device 940 and turns on 3G data connection 942.

The 3G/4G network enables a wireless data session to the mobile device.

Hardware and Operating Environment

FIG. 19-22 are a block diagrams of a hardware and operating environment in which different implementations can be practiced. The descriptions provide an overview of computer hardware and a suitable computing environment in conjunction with which some implementations can be implemented. Implementations are described in terms of a computer executing computer-executable instructions. However, some implementations can be implemented entirely in computer hardware in which the computer-executable instructions are implemented in read-only memory. Some implementations can also be implemented in client/server computing environments where remote devices that perform tasks are linked through a communications network. Program modules can be located in both local and remote memory storage devices in a distributed computing environment.

Implementation

The implementations described herein generally relate to a mobile wireless communication device, hereafter referred to as a mobile device, which can be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smart-phones, wireless organizers, personal digital assistants, computers, laptops, handheld wireless communication devices, wirelessly enabled notebook computers and the like.

FIG. 19 is a block diagram of a mobile device 1900, according to an implementation. The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Mobile device 1900 is one implementation of mobile device 102 in FIG. 1. The mobile device 1900 includes a number of components such as a main processor 1902 that controls the overall operation of the mobile device 1900. Communication functions, including data and voice communications, are performed through a communication subsystem 1904. The communication subsystem 1904 receives messages from and sends messages to wireless networks 1905. The wireless networks 1905 include the 3G/4G network 110 in FIG. 1. In other implementations of the mobile device 1900, the communication subsystem 1904 can be configured in accordance with the Global System for Mobile Communication (GSM), General Packet Radio Services (GPRS), Enhanced Data GSM Environment (EDGE), Universal Mobile Telecommunications Service (UMTS), data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include Mobitex™ and DataTAC™ network communication systems. Examples of other voice-centric data networks include Personal Communication Systems (PCS) networks like GSM and Time Division Multiple Access (TDMA) systems.

The wireless link connecting the communication subsystem 1904 with the wireless network 1905 represents one or more different Radio Frequency (RF) channels. With newer network protocols, these channels are capable of supporting both circuit switched voice communications and packet switched data communications.

The main processor 1902 also interacts with additional subsystems such as a Random Access Memory (RAM) 1906, a flash memory 1908, a display 1910, an auxiliary input/output (I/O) subsystem 1912, a data port 1914, a keyboard 1916, a speaker 1918, a microphone 1920, short-range communications 1922 and other device subsystems 1924. In some implementations, the flash memory 1908 includes a hybrid femtocell/Wi-Fi protocol stack 1909. The stack 1909 supports authentication and authorization between the mobile device 1900 into a shared Wi-Fi network and both a 3G and 4G mobile networks. The PSK 108 is received by the communication subsystem 1904 and transferred by the main processor 1902 to the flash memory 1908. The PSK 108 is also transferred by the main processor 1902 from the flash memory 1908 through the short-range communications subsystem 1922 to the Wi-Fi access point 104.

Some of the subsystems of the mobile device 1900 perform communication-related functions, whereas other subsystems may provide "resident" or on-device functions. By way of example, the display 1910 and the keyboard 1916 may be used for both communication-related functions, such as entering a text message for transmission over the wireless network 1905, and device-resident functions such as a calculator or task list.

The mobile device 1900 can transmit and receive communication signals over the wireless network 1905 after required network registration or activation procedures have been completed. Network access is associated with a subscriber or user of the mobile device 1900. To identify a subscriber, the mobile device 1900 requires a SIM/RUIM card 1926 (i.e. Subscriber Identity Module or a Removable User Identity Module) to be inserted into a SIM/RUIM interface 1928 in order to communicate with a network. The SIM card or RUIM 1926 is one type of a conventional "smart card" that can be used to identify a subscriber of the mobile device 1900 and to personalize the mobile device 1900, among other things. Without the SIM card 1926, the mobile device 1900 is not fully operational for communication with the wireless network 1905. By inserting the SIM card/RUIM 1926 into the SIM/RUIM interface 1928, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 1926 includes a processor and memory for storing information. Once the SIM card/RUIM 1926 is inserted into the SIM/RUIM interface 1928, it is coupled to the main processor 1902. In order to identify the subscriber, the SIM card/RUIM 1926 can include some user parameters such as an International Mobile Subscriber Identity (IMSI). An advantage of using the SIM card/RUIM 1926 is that a subscriber is not necessarily bound by any single physical mobile device. The SIM card/RUIM 1926 may store additional subscriber information for a mobile device as well, including datebook (or calendar) information and recent call information. Alternatively, user identification information can also be programmed into the flash memory 1908.

The mobile device 1900 is a battery-powered device and includes a battery interface 1932 for receiving one or more rechargeable batteries 1930. In one or more implementations, the battery 1930 can be a smart battery with an embedded microprocessor. The battery interface 1932 is coupled to a regulator 1933, which assists the battery 1930 in providing power V+ to the mobile device 1900. Although current technology makes use of a battery, future technologies such as micro fuel cells may provide the power to the mobile device 1900.

The mobile device 1900 also includes an operating system 1934 and software components 1936 to 1946 which are described in more detail below. The operating system 1934 and the software components 1936 to 1946 that are executed by the main processor 1902 are typically stored in a persistent store such as the flash memory 1908, which may alternatively be a read-only memory (ROM) or similar storage element (not shown). Those skilled in the art will appreciate that portions of the operating system 1934 and the software components 1936 to 1946, such as specific device applications, or parts thereof, may be temporarily loaded into a volatile store such as the RAM 1906. Other software components can also be included.

The subset of software applications 1936 that control basic device operations, including data and voice communication applications, will normally be installed on the mobile device 1900 during its manufacture. Other software applications include a message application 1938 that can be any suitable software program that allows a user of the mobile device 1900 to transmit and receive electronic messages. Various alternatives exist for the message application 1938 as is well known to those skilled in the art. Messages that have been sent or received by the user are typically stored in the flash memory 1908 of the mobile device 1900 or some other suitable storage element in the mobile device 1900. In one or more implementations, some of the sent and received messages may be stored remotely from the device 1900 such as in a data store of an associated host system with which the mobile device 1900 communicates.

The software applications can further include a device state module 1940, a Personal Information Manager (PIM) 1942, and other suitable modules (not shown). The device state module 1940 provides persistence, i.e. the device state module 1940 ensures that important device data is stored in persistent memory, such as the flash memory 1908, so that the data is not lost when the mobile device 1900 is turned off or loses power.

The PIM 1942 includes functionality for organizing and managing data items of interest to the user, such as, but not limited to, e-mail, contacts, calendar events, voice mails, appointments, and task items. A PIM application has the ability to transmit and receive data items via the wireless network 1905. PIM data items may be seamlessly integrated, synchronized, and updated via the wireless network 1905 with the mobile device subscriber's corresponding data items stored and/or associated with a host computer system. This functionality creates a mirrored host computer on the mobile device 1900 with respect to such items. This can be particularly advantageous when the host computer system is the mobile device subscriber's office computer system.

The mobile device 1900 also includes a connect module 1944, and an IT policy module 1946. The connect module 1944 implements the communication protocols that are required for the mobile device 1900 to communicate with the wireless infrastructure and any host system, such as an enterprise system, with which the mobile device 1900 is authorized to interface. Examples of a wireless infrastructure and an enterprise system are given in FIGS. 21 and 22, which are described in more detail below.

The connect module 1944 includes a set of APIs that can be integrated with the mobile device 1900 to allow the mobile device 1900 to use any number of services associated with the enterprise system. The connect module 1944 allows the mobile device 1900 to establish an end-to-end secure, authenticated communication pipe with the host system. A subset of applications for which access is provided by the connect module 1944 can be used to pass IT policy commands from the host system to the mobile device 1900. This can be done in a wireless or wired manner. These instructions can then be passed to the IT policy module 1946 to modify the configuration of the device 1900. Alternatively, in some cases, the IT policy update can also be done over a wired connection.

The IT policy module 1946 receives IT policy data that encodes the IT policy. The IT policy module 1946 then ensures that the IT policy data is authenticated by the mobile device 1900. The IT policy data can then be stored in the flash memory 1906 in its native form. After the IT policy data is stored, a global notification can be sent by the IT policy module 1946 to all of the applications residing on the mobile device 1900. Applications for which the IT policy may be applicable then respond by reading the IT policy data to look for IT policy rules that are applicable.

The IT policy module 1946 can include a parser 1947, which can be used by the applications to read the IT policy rules. In some cases, another module or application can provide the parser. Grouped IT policy rules, described in more detail below, are retrieved as byte streams, which are then sent (recursively) into the parser to determine the values of each IT policy rule defined within the grouped IT policy rule. In one or more implementations, the IT policy module 1946 can determine which applications are affected by the IT policy data and transmit a notification to only those applications. In either of these cases, for applications that are not being executed by the main processor 1902 at the time of the notification, the applications can call the parser or the IT policy module 1946 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 1946 sends an acknowledgement back to the host system to indicate that the IT policy data was received and successfully applied.

Other types of software applications can also be installed on the mobile device 1900. These software applications can be third party applications, which are added after the manufacture of the mobile device 1900. Examples of third party applications include games, calculators, utilities, etc.

The additional applications can be loaded onto the mobile device 1900 through at least one of the wireless network 1905, the auxiliary I/O subsystem 1912, the data port 1914, the short-range communications subsystem 1922, or any other suitable device subsystem 1924. This flexibility in application installation increases the functionality of the mobile device 1900 and may provide enhanced on-device functions, communication-related functions, or both. For example, secure communication applications may enable electronic commerce functions and other such financial transactions to be performed using the mobile device 1900.

The data port 1914 enables a subscriber to set preferences through an external device or software application and extends the capabilities of the mobile device 1900 by providing for information or software downloads to the mobile device 1900 other than through a wireless communication network. The alternate download path may, for example, be used to load an encryption key onto the mobile device 1900 through a direct and thus reliable and trusted connection to provide secure device communication.

The data port 1914 can be any suitable port that enables data communication between the mobile device 1900 and another computing device. The data port 1914 can be a serial or a parallel port. In some instances, the data port 1914 can be a USB port that includes data lines for data transfer and a supply line that can provide a charging current to charge the battery 1930 of the mobile device 1900.

The short-range communications subsystem 1922 provides for communication between the mobile device 1900 and different systems or devices, without the use of the wireless network 1905. For example, the subsystem 1922 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 1904 and input to the main processor 1902. The main processor 1902 will then process the received signal for output to the display 1910 or alternatively to the auxiliary I/O subsystem 1912. A subscriber may also compose data items, such as e-mail messages, for example, using the keyboard 1916 in conjunction with the display 1910 and possibly the auxiliary I/O subsystem 1912. The auxiliary subsystem 1912 may include devices such as: a touch screen, mouse, track ball, infrared fingerprint detector, or a roller wheel with dynamic button pressing capability. The keyboard 1916 is preferably an alphanumeric keyboard and/or telephone-type keypad. However, other types of keyboards may also be used. A composed item may be transmitted over the wireless network 1905 through the communication subsystem 1904.

For voice communications, the overall operation of the mobile device 1900 is substantially similar, except that the received signals are output to the speaker 1918, and signals for transmission are generated by the microphone 1920. Alternative voice or audio I/O subsystems, such as a voice message recording subsystem, can also be implemented on the mobile device 1900. Although voice or audio signal output is accomplished primarily through the speaker 1918, the display 1910 can also be used to provide additional information such as the identity of a calling party, duration of a voice call, or other voice call related information.

Figure 20:
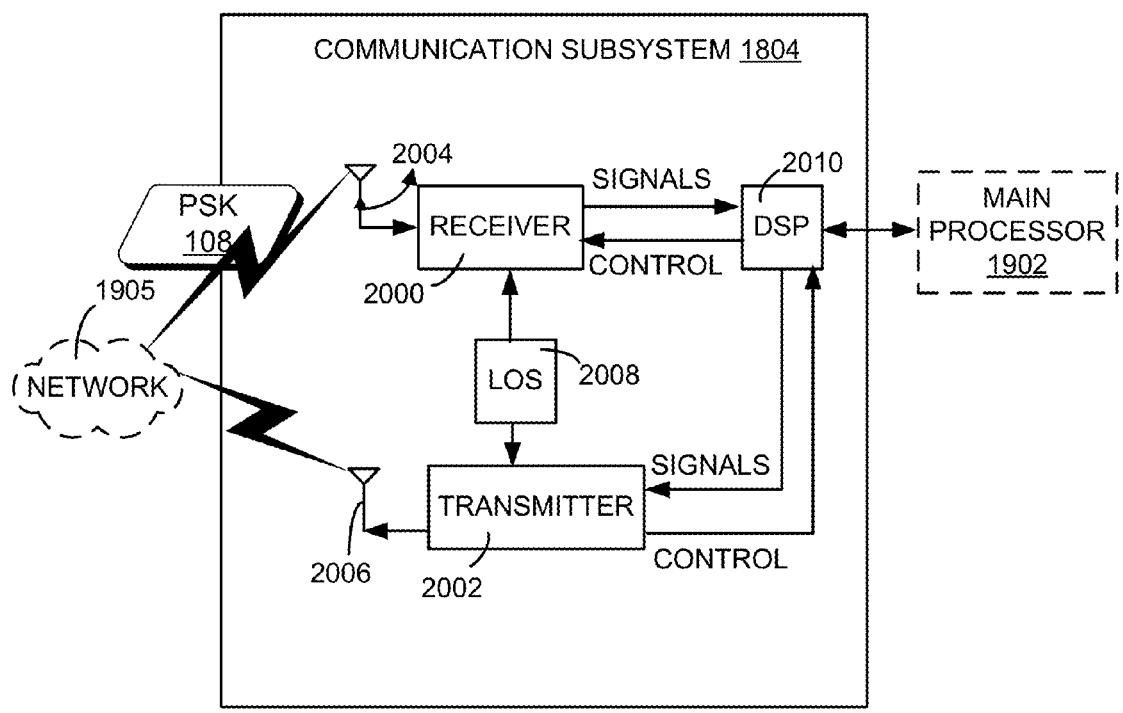
FIG. 20 is a block diagram of a communication subsystem component of the mobile device of FIG. 19, according to an implementation.

Referring now to FIG. 20, a block diagram of the communication subsystem component 1904 is shown, according to an implementation. The communication subsystem 1904 includes a receiver 2000, a transmitter 2002, as well as associated components such as one or more embedded or internal antenna elements 2004 and 2006, Local Oscillators (LOs) 2008, and a processing module such as a Digital Signal Processor (DSP) 2010. The particular implementation of the communication subsystem 1904 is dependent upon the communication wireless network 1905 with which the mobile device 1900 is intended to operate. Thus, it should be understood that the implementation illustrated in FIG. 20 serves only as one example.

Signals received by the antenna 2004 through the wireless network 1905 are input to the receiver 2000, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 2010. In a similar manner, signals to be transmitted are processed, including modulation and encoding, by the DSP 2010. These DSP-processed signals are input to the transmitter 2002 for digital-to-analog (D/A) conversion, frequency up conversion, filtering, amplification and transmission over the wireless network 1905 via the antenna 2006. The DSP 2010 not only processes communication signals, but also provides for receiver and transmitter control. For example, the gains applied to communication signals in the receiver 2000 and the transmitter 2002 may be adaptively controlled through automatic gain control algorithms implemented in the DSP 2010.

The wireless link between the mobile device 1900 and the wireless network 1905 can contain one or more different channels, typically different RF channels, and associated protocols used between the mobile device 1900 and the wireless network 1905. An RF channel is a limited resource that must be conserved, typically due to limits in overall bandwidth and limited battery power of the mobile device 1900.

When the mobile device 1900 is fully operational, the transmitter 2002 is typically keyed or turned on only when it is transmitting to the wireless network 1905 and is otherwise turned off to conserve resources. Similarly, the receiver 2000 is periodically turned off to conserve power until the receiver 2000 is needed to receive signals or information (if at all) during designated time periods.

The PSK 108 is received by the communication subsystem 1904 from the wireless network 1905 through the antenna 2004 of the receiver 2000 and transferred to the DSP 2010 and to the main processor 1902.

Referring now to FIG. 21, a block diagram of an exemplary implementation of a node 2102 of the wireless network 1905 is shown. In practice, the wireless network 1905 comprises one or more nodes 2102. In conjunction with the connect module 1944, the mobile device 1900 can communicate with the node 2102 within the wireless network 1905. In the exemplary implementation of FIG. 21, the node 2102 is configured in accordance with General Packet Radio Service (GPRS) and Global Systems for Mobile (GSM) technologies. The node 2102 includes a base station controller (BSC) 2104 with an associated tower station 2106, a Packet Control Unit (PCU) 2108 added for GPRS support in GSM, a Mobile Switching Center (MSC) 2110, a Home Location Register (HLR) 2112, a Visitor Location Registry (VLR) 2114, a Serving GPRS Support Node (SGSN) 2116, a Gateway GPRS Support Node (GGSN) 2118, and a Dynamic Host Configuration Protocol (DHCP) 2120. This list of components is not meant to be an exhaustive list of the components of every node 2102 within a GSM/GPRS network, but rather a list of components that are commonly used in communications through the wireless network 1905.

In a GSM network, the MSC 2110 is coupled to the BSC 2104 and to a landline network, such as a Public Switched Telephone Network (PSTN) 2122 to satisfy circuit switched requirements. The connection through the PCU 2108, the SGSN 2116 and the GGSN 2118 to a public or private network (Internet) 2124 (also referred to herein generally as a shared network infrastructure) represents the data path for GPRS capable mobile devices. In a GSM network extended with GPRS capabilities, the BSC 2104 also contains the Packet Control Unit (PCU) 2108 that connects to the SGSN 2116 to control segmentation, radio channel allocation and to satisfy packet switched requirements. To track the location of the mobile device 1900 and availability for both circuit switched and packet switched management, the HLR 2112 is shared between the MSC 2110 and the SGSN 2116. Access to the VLR 2114 is controlled by the MSC 2110. The PSK 108 is received by the host system 2150 and transmitted to the public or private network (Internet) 2124 to the GGSN 2118 of the node 2102, and then transmitted to the SGSN 2116 and then transmitted to the PCU 2108 and then transmitted to the BSC 2104 and then transmitted to the associated tower station 2106. Lastly, the associated tower station 2106 transmits the PSK 108 to the mobile device 102.

The tower station 2106 is a fixed transceiver station and together with the BSC 2104 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the tower station 2106. The fixed transceiver equipment normally performs such functions as modulation and possibly encoding and/or encryption of signals to be transmitted to the mobile device 1900 in accordance with particular, usually predetermined, communication protocols and parameters, under control of its controller. The fixed transceiver equipment similarly demodulates and possibly decodes and decrypts, if necessary, any communication signals received from the mobile device 1900 within its cell. Communication protocols and parameters may vary between different nodes. For example, one node may employ a different modulation scheme and operate at different frequencies than other nodes.

For all mobile devices 1900 registered with a specific network, permanent configuration data such as a user profile is stored in the HLR 2112. The HLR 2112 also contains location information for each registered mobile device and can be queried to determine the current location of a mobile device. The MSC 2110 is responsible for a group of location areas and stores the data of the mobile devices currently in its area of responsibility in the VLR 2114. Further, the VLR 2114 also contains information on mobile devices that are visiting other networks. The information in the VLR 2114 includes part of the permanent mobile device data transmitted from the HLR 2112 to the VLR 2114 for faster access. By moving additional information from a remote HLR 2112 node to the VLR 2114, the amount of traffic between these nodes can be reduced so that voice and data services can be provided with faster response times and at the same time requiring less use of computing resources.

The SGSN 2116 and the GGSN 2118 are elements added for GPRS support; namely packet switched data support, within GSM. The SGSN 2116 and the MSC 2110 have similar responsibilities within the wireless network 1905 by keeping track of the location of each mobile device 1900. The SGSN 2116 also performs security functions and access control for data traffic on the wireless network 1905. The GGSN 2118 provides internetworking connections with external packet switched networks and connects to one or more SGSN's 2116 via an Internet Protocol (IP) backbone network operated within the wireless network 1905. During normal operations, a given mobile device 1900 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 2120 connected to the GGSN 2118. There are many mechanisms for dynamic IP assignment, including using a combination of a Remote Authentication Dial-In User Service (Radius) server and a DHCP server. Once the GPRS Attach is complete, a logical connection is established from a mobile device 1900, through the PCU 2108, and the SGSN 2116 to an Access Point Node (APN) within the GGSN 2118. The APN represents a logical end of an IP tunnel that can either access direct Internet compatible services or private network connections. The APN also represents a security mechanism for the wireless network 1905, insofar as each mobile device 1900 must be assigned to one or more APNs and mobile devices 1900 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the wireless network 1905. To maximize use of the PDP Contexts, the wireless network 1905 will execute an idle timer for each PDP Context to determine if there is a lack of activity. When a mobile device 1900 is not using its PDP Context, the PDP Context can be de-allocated and the IP address returned to the IP address pool managed by the DHCP server 2120.

Figure 22:
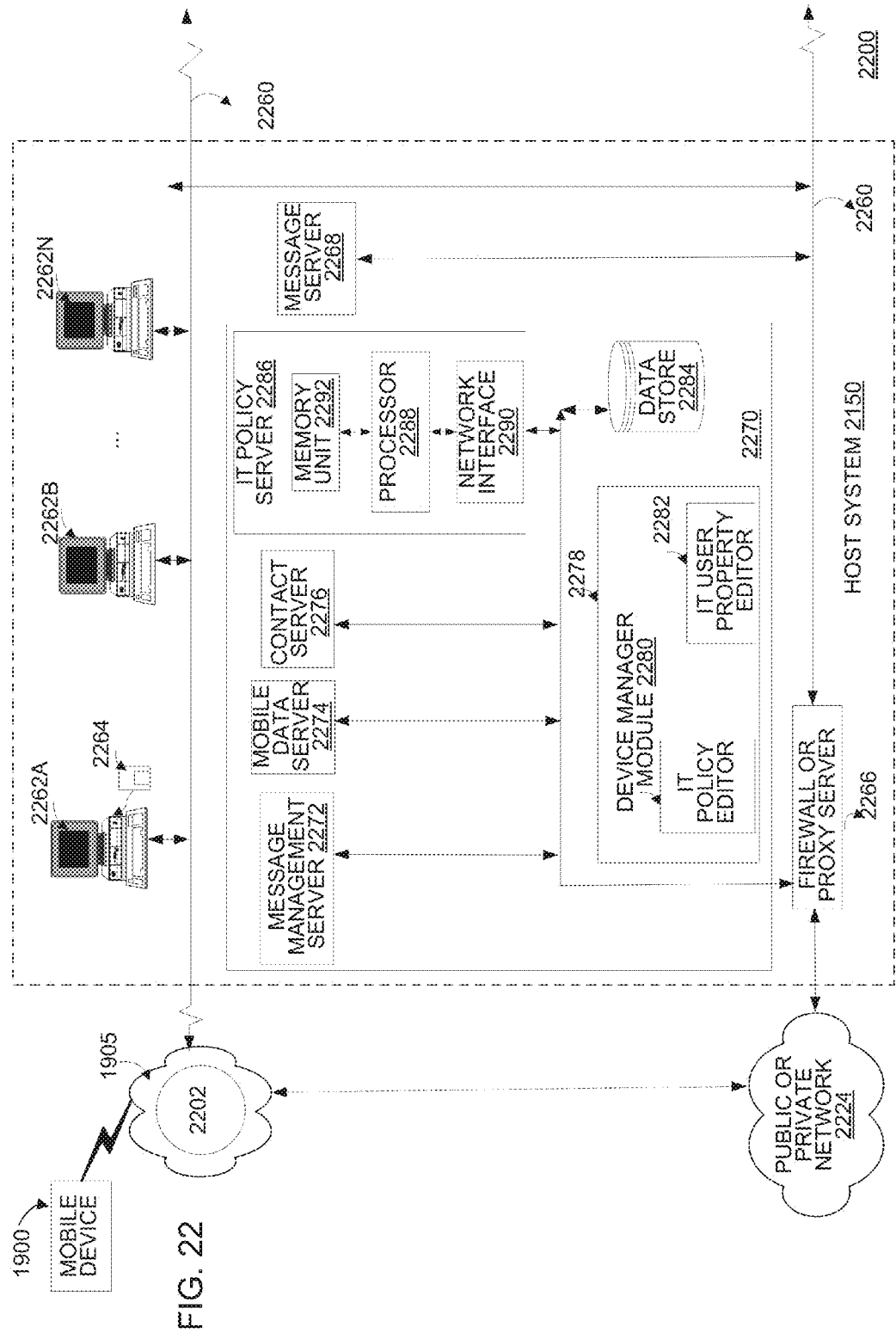
FIG. 22 is a block diagram illustrating components of a host system for use with the wireless network of FIG. 21 and the mobile device of FIG. 19, according to an implementation.

Referring now to FIG. 22, shown therein is a block diagram illustrating components of an exemplary configuration of a host system 2150 that the mobile device 1900 can communicate with in conjunction with the connect module 1944. The host system 2150 will typically be a corporate enterprise or other local area network (LAN), but may also be a home office computer or some other private system, for example, in variant implementations. In this example shown in FIG. 22, the host system 2250 is depicted as a LAN of an organization to which a user of the mobile device 1900 belongs. Typically, a plurality of mobile devices can communicate wirelessly with the host system 2150 through one or more nodes 2002 of the wireless network 1905.

The host system 2150 comprises a number of network components connected to each other by a network 2260. For instance, a user's desktop computer 2262a with an accompanying cradle 2264 for the user's mobile device 1900 is situated on a LAN connection. The cradle 2264 for the mobile device 1900 can be coupled to the computer 2262a by a serial or a Universal Serial Bus (USB) connection, for example. Other user computers 2262b-2262n are also situated on the network 2260, and each may or may not be equipped with an accompanying cradle 2264. The cradle 2264 facilitates the loading of information (e.g. PIM data, private symmetric encryption keys to facilitate secure communications) from the user computer 2262a to the mobile device 1900, and may be particularly useful for bulk information updates often performed in initializing the mobile device 1900 for use. The information downloaded to the mobile device 1900 may include certificates used in the exchange of messages.

It will be understood by persons skilled in the art that the user computers 2262a-2262n will typically also be connected to other peripheral devices, such as printers, etc. which are not explicitly shown in FIG. 22. Furthermore, only a subset of network components of the host system 2150 are shown in FIG. 22 for ease of exposition, and it will be understood by persons skilled in the art that the host system 2150 will comprise additional components that are not explicitly shown in FIG. 22 for this exemplary configuration. More generally, the host system 2150 may represent a smaller part of a larger network (not shown) of the organization, and may comprise different components and/or be arranged in different topologies than that shown in the exemplary implementation of FIG. 22.

To facilitate the operation of the mobile device 1900 and the wireless communication of messages and message-related data between the mobile device 1900 and components of the host system 2150, a number of wireless communication support components 2270 can be provided. In some implementations, the wireless communication support components 2270 can include a message management server 2272, a mobile data server 2274, a contact server 2276, and a device manager module 2278. The device manager module 2278 includes an IT Policy editor 2280 and an IT user property editor 2282, as well as other software components for allowing an IT administrator to configure the mobile devices 1900. In an alternative implementation, there may be one editor that provides the functionality of both the IT policy editor 2280 and the IT user property editor 2282. The support components 2270 also include a data store 2284, and an IT policy server 2286. The IT policy server 2286 includes a processor 2288, a network interface 2290 and a memory unit 2292. The processor 2288 controls the operation of the IT policy server 2286 and executes functions related to the standardized IT policy as described below. The network interface 2290 allows the IT policy server 2286 to communicate with the various components of the host system 2150 and the mobile devices 1900. The memory unit 2292 can store functions used in implementing the IT policy as well as related data. Those skilled in the art know how to implement these various components. Other components may also be included as is well known to those skilled in the art. Further, in some implementations, the data store 2284 can be part of any one of the servers.

In this exemplary implementation, the mobile device 1900 communicates with the host system 2150 through node 2002 of the wireless network 1905 and a shared network infrastructure 2224 such as a service provider network or the public Internet. Access to the host system 2150 may be provided through one or more routers (not shown), and computing devices of the host system 2150 may operate from behind a firewall or proxy server 2266. The proxy server 2266 provides a secure node and a wireless internet gateway for the host system 2150. The proxy server 2266 intelligently routes data to the correct destination server within the host system 2150.

In some implementations, the host system 2150 can include a wireless VPN router (not shown) to facilitate data exchange between the host system 2150 and the mobile device 1900. The wireless VPN router allows a VPN connection to be established directly through a specific wireless network to the mobile device 1900. The wireless VPN router can be used with the Internet Protocol (IP) Version 8 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 1900 in this alternative implementation.

Messages intended for a user of the mobile device 1900 are initially received by a message server 2268 of the host system 2150. Such messages may originate from any number of sources. For instance, a message may have been sent by a sender from the computer 2262b within the host system 2150, from a different mobile device (not shown) connected to the wireless network 1905 or a different wireless network, or from a different computing device, or other device capable of transmitting messages, via the shared network infrastructure 2224, possibly through an application service provider (ASP) or Internet service provider (ISP), for example.

The message server 2268 typically acts as the primary interface for the exchange of messages, particularly e-mail messages, within the organization and over the shared network infrastructure 2224. Each user in the organization that has been set up to transmit and receive messages is typically associated with a user account managed by the message server 2268. Some exemplary implementations of the message server 2268 include a Microsoft Exchange™ server, a Lotus Domino™ server, a Novell Groupwise™ server, or another suitable mail server installed in a corporate environment. In some implementations, the host system 2150 may comprise multiple message servers 2268. The message server 2268 may also be adapted to provide additional functions beyond message management, including the management of data associated with calendars and task lists, for example.

When messages are received by the message server 2268, they are typically stored in a data store associated with the message server 2268. In one or more implementations, the data store may be a separate hardware unit, such as data store 2284, with which the message server 2268 communicates. Messages can be subsequently retrieved and delivered to users by accessing the message server 2268. For instance, an e-mail client application operating on a user's computer 2262a may request the e-mail messages associated with that user's account stored on the data store associated with the message server 2268. These messages are then retrieved from the data store and stored locally on the computer 2262a. The data store associated with the message server 2268 can store copies of each message that is locally stored on the mobile device 1900. Alternatively, the data store associated with the message server 2268 can store all of the messages for the user of the mobile device 1900 and only a smaller number of messages can be stored on the mobile device 1900 to conserve memory. For instance, the most recent messages (i.e. those received in the past two to three months for example) can be stored on the mobile device 1900.

When operating the mobile device 1900, the user may wish to have e-mail messages retrieved for delivery to the mobile device 1900. The message application 1938 operating on the mobile device 1900 may also request messages associated with the user's account from the message server 2268. The message application 1938 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 1900 is assigned its own e-mail address, and messages addressed specifically to the mobile device 1900 are automatically redirected to the mobile device 1900 as they are received by the message server 2268.

The message management server 2272 can be used to specifically provide support for the management of messages, such as e-mail messages, that are to be handled by mobile devices. Generally, while messages are still stored on the message server 2268, the message management server 2272 can be used to control when, if, and how messages are sent to the mobile device 1900. The message management server 2272 also facilitates the handling of messages composed on the mobile device 1900, which are sent to the message server 2268 for subsequent delivery.

For example, the message management server 2272 may monitor the user's "mailbox" (e.g. the message store associated with the user's account on the message server 2268) for new e-mail messages, and apply user-definable filters to new messages to determine if and how the messages are relayed to the user's mobile device 1900. The message management server 2272 may also compress and encrypt new messages (e.g. using an encryption technique such as Data Encryption Standard (DES), Triple DES, or Advanced Encryption Standard (AES)) and push the compressed and encrypted messages to the 006Dobile device 1900 via the shared network infrastructure 2224 and the wireless network 1905. The message management server 2272 may also receive messages composed on the mobile device 1900 (e.g. encrypted using Triple DES), decrypt and decompress the composed messages, re-format the composed messages if desired so that they will appear to have originated from the user's computer 2262a, and re-route the composed messages to the message server 2268 for delivery.

Certain properties or restrictions associated with messages that are to be sent from and/or received by the mobile device 1900 can be defined (e.g. by an administrator in accordance with IT policy) and enforced by the message management server 2272. These may include whether the mobile device 1900 may receive encrypted and/or signed messages, minimum encryption key sizes, whether outgoing messages must be encrypted and/or signed, and whether copies of all secure messages sent from the mobile device 1900 are to be sent to a pre-defined copy address, for example.

The message management server 2272 may also be adapted to provide other control functions, such as only pushing certain message information or pre-defined portions (e.g. "blocks") of a message stored on the message server 2268 to the mobile device 1900. For example, in some cases, when a message is initially retrieved by the mobile device 1900 from the message server 2268, the message management server 2272 may push only the first part of a message to the mobile device 1900, with the part being of a pre-defined size (e.g. 2 KB). The user can then request that more of the message be delivered in similar-sized blocks by the message management server 2272 to the mobile device 1900, possibly up to a maximum pre-defined message size. Accordingly, the message management server 2272 facilitates better control over the type of data and the amount of data that is communicated to the mobile device 1900, and can help to minimize potential waste of bandwidth or other resources.

The mobile data server 2274 encompasses any other server that stores information that is relevant to the corporation. The mobile data server 2274 may include, but is not limited to, databases, online data document repositories, customer relationship management (CRM) systems, or enterprise resource planning (ERP) applications.

The contact server 2276 can provide information for a list of contacts for the user in a similar fashion as the address book on the mobile device 1900. Accordingly, for a given contact, the contact server 2276 can include the name, phone number, work address and e-mail address of the contact, among other information. The contact server 2276 can also provide a global address list that contains the contact information for all of the contacts associated with the host system 2150.

It will be understood by persons skilled in the art that the message management server 2272, the mobile data server 2274, the contact server 2276, the device manager module 2278, the data store 2284 and the IT policy server 2286 do not need to be implemented on separate physical servers within the host system 2150. For example, some or all of the functions associated with the message management server 2272 may be integrated with the message server 2268, or some other server in the host system 2150. Alternatively, the host system 2150 may comprise multiple message management servers 2272, particularly in variant implementations where a large number of mobile devices need to be supported.

Alternatively, in some implementations, the IT policy server 2286 can provide the IT policy editor 2280, the IT user property editor 2282 and the data store 2284. In some cases, the IT policy server 2286 can also provide the device manager module 2278. The processor 2288 of the IT policy server 2286 can be used to perform the various steps of a method for providing IT policy data that is customizable on a per-user basis as explained further below and in conjunction with FIGS. 9 to 13. The processor 2288 can execute the editors 2280 and 2282. In some cases, the functionality of the editors 2280 and 2282 can be provided by a single editor. In some cases, the memory unit 2292 can provide the data store 2284.

The device manager module 2278 provides an IT administrator with a graphical user interface with which the IT administrator interacts to configure various settings for the mobile devices 1900. As mentioned, the IT administrator can use IT policy rules to define behaviors of certain applications on the mobile device 1900 that are permitted such as phone, web browser or Instant Messenger use. The IT policy rules can also be used to set specific values for configuration settings that an organization requires on the mobile devices 1900 such as auto signature text, WLAN/VoIP/VPN configuration, security requirements (e.g. encryption algorithms, password rules, etc.), specifying themes or applications that are allowed to execute on the mobile device 1900, and the like.

Figure 23:
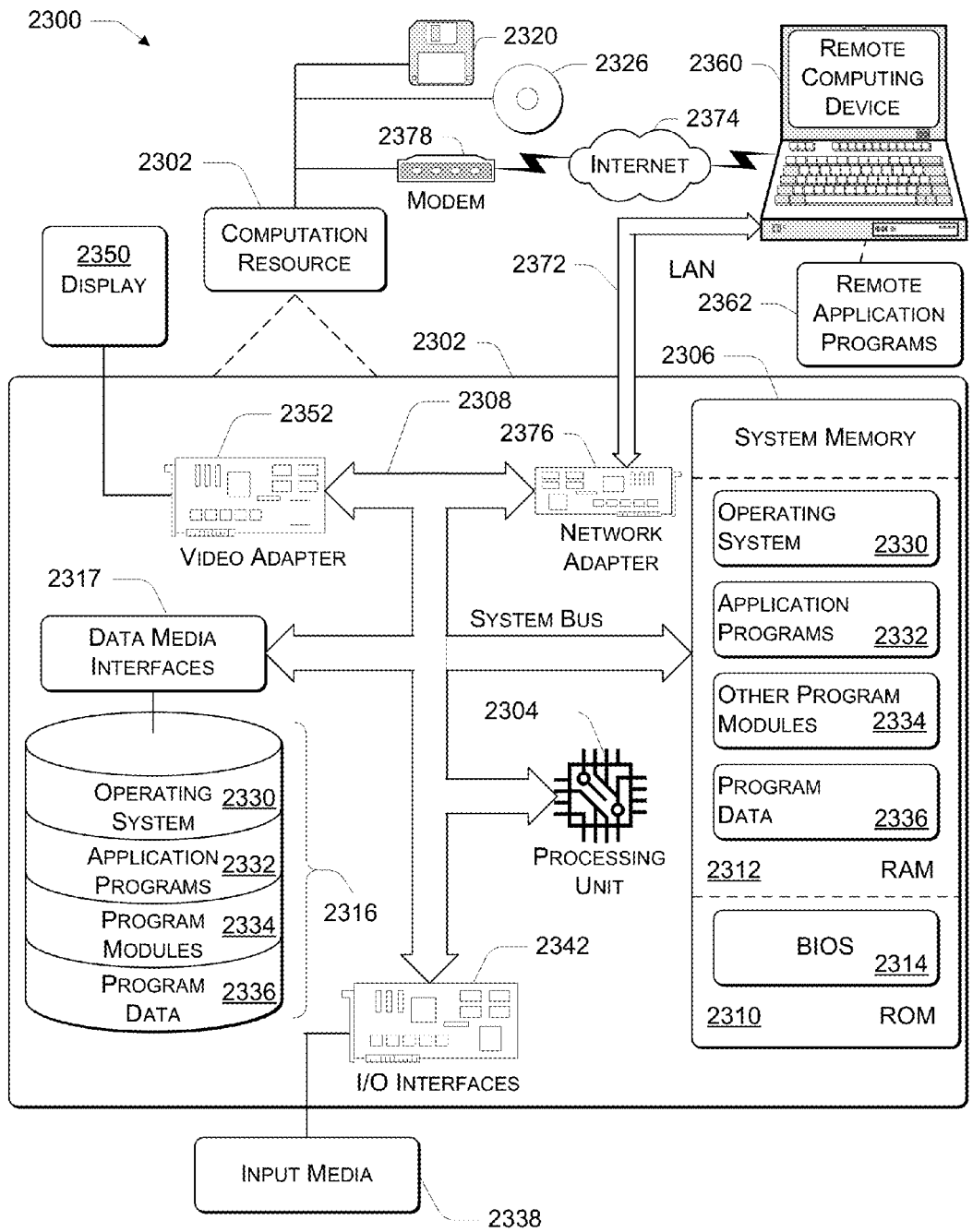
FIG. 23 illustrates an example of a general computer environment useful in the context of the environment of FIGS. 1-10 and 19-22, according to an implementation.

FIG. 23 illustrates an example of a general computer environment 2300 useful in the context of the environment of FIGS. 1-9 and 19-22, in accordance with an implementation of the disclosed subject matter. The general computer environment 2300 includes a computation resource 2302 capable of implementing the processes described herein. It will be appreciated that other devices can alternatively used that include more components, or fewer components, than those illustrated in FIG. 23.

The illustrated operating environment 2300 is only one example of a suitable operating environment, and the example described with reference to FIG. 23 is not intended to suggest any limitation as to the scope of use or functionality of the implementations of this disclosure. Other well-known computing systems, environments, and/or configurations can be suitable for implementation and/or application of the subject matter disclosed herein.

The computation resource 2302 includes one or more processors or processing units 2304, a system memory 2306, and a bus 2308 that couples various system components including the system memory 2306 to processor(s) 2304 and other elements in the environment 2300. The bus 2308 represents one or more of any of several types of bus structures, including a memory bus or memory controller, a peripheral bus, an accelerated graphics port and a processor or local bus using any of a variety of bus architectures, and can be compatible with SCSI (small computer system interconnect), or other conventional bus architectures and protocols.

The system memory 2306 includes nonvolatile read-only memory (ROM) 2310 and random access memory (RAM) 2312, which can or can not include volatile memory elements. A basic input/output system (BIOS) 2314, containing the elementary routines that help to transfer information between elements within computation resource 2302 and with external items, typically invoked into operating memory during start-up, is stored in ROM 2310.

The computation resource 2302 further can include a nonvolatile read/write memory 2316, represented in FIG. 23 as a hard disk drive, coupled to bus 2308 via a data media interface 2317 (e.g., a SCSI, ATA, or other type of interface); a magnetic disk drive (not shown) for reading from, and/or writing to, a removable magnetic disk 2320 and an optical disk drive (not shown) for reading from, and/or writing to, a removable optical disk 2326 such as a CD, DVD, or other optical media.

The non-volatile read/write memory 2316 and associated computer-readable media provide nonvolatile storage of computer-readable instructions, data structures, program modules and other data for the computation resource 2302. Although the exemplary environment 2300 is described herein as employing a non-volatile read/write memory 2316, a removable magnetic disk 2320 and a removable optical disk 2326, it will be appreciated by those skilled in the art that other types of computer-readable media which can store data that is accessible by a computer, such as magnetic cassettes, FLASH memory cards, random access memories (RAMs), read only memories (ROM), and the like, can also be used in the exemplary operating environment.

A number of program modules can be stored via the non-volatile read/write memory 2316, magnetic disk 2320, optical disk 2326, ROM 2310, or RAM 2312, including an operating system 2330, one or more application programs 2332, other program modules 2334 and program data 2336. Examples of computer operating systems conventionally employed for some types of three-dimensional and/or two-dimensional medical image data include the NUCLEUS® operating system, the LINUX® operating system, and others, for example, providing capability for supporting application programs 2332 using, for example, code modules written in the C++® computer programming language.

A user can enter commands and information into computation resource 2302 through input devices such as input media 2338 (e.g., keyboard/keypad, tactile input or pointing device, mouse, foot-operated switching apparatus, joystick, touchscreen or touchpad, microphone, antenna etc.). Such input devices 2338 are coupled to the processing unit 2304 through a conventional input/output interface 2342 that is, in turn, coupled to the system bus. A monitor 2350 or other type of display device is also coupled to the system bus 2308 via an interface, such as a video adapter 2352.

The computation resource 2302 can include capability for operating in a networked environment (as illustrated in FIG. 20 and FIG. 21, for example) using logical connections to one or more remote computers, such as a remote computer 2360. The remote computer 2360 can be a personal computer, a server, a router, a network PC, a peer device or other common network node, and typically includes many or all of the elements described above relative to the computation resource 2302. In a networked environment, program modules depicted relative to the computation resource 2302, or portions thereof, can be stored in a remote memory storage device such as can be associated with the remote computer 2360. By way of example, remote application programs 2362 reside on a memory device of the remote computer 2360. The logical connections represented in FIG. 23 can include interface capabilities, a storage area network (SAN, not illustrated in FIG. 23), local area network (LAN) 2372 and/or a wide area network (WAN) 2374, but can also include other networks.

Such networking environments are commonplace in modern computer systems, and in association with intranets and the Internet. In certain implementations, the computation resource 2302 executes an Internet Web browser program (which can optionally be integrated into the operating system 2330), such as the "Internet Explorer®" Web browser manufactured and distributed by the Microsoft Corporation of Redmond, Wash.

When used in a LAN-coupled environment, the computation resource 2302 communicates with or through the local area network 2372 via a network interface or adapter 2376. When used in a WAN-coupled environment, the computation resource 2302 typically includes interfaces, such as a modem 2378, or other apparatus, for establishing communications with or through the WAN 2374, such as the Internet. The modem 2378, which can be internal or external, is coupled to the system bus 2308 via a serial port interface.

In a networked environment, program modules depicted relative to the computation resource 2302, or portions thereof, can be stored in remote memory apparatus. It will be appreciated that the network connections shown are exemplary, and other means of establishing a communications link between various computer systems and elements can be used.

A user of a computer can operate in a networked environment 2100 using logical connections to one or more remote computers, such as a remote computer 2360, which can be a personal computer, a server, a router, a network PC, a peer device or other common network node. Typically, a remote computer 2360 includes many or all of the elements described above relative to the computer 2300 of FIG. 23.

The computation resource 2302 typically includes at least some form of computer-readable media. Computer-readable media can be any available media that can be accessed by the computation resource 2302. By way of example, and not limitation, computer-readable media can comprise computer storage media and communication media.

Computer storage media include volatile and nonvolatile, removable and non-removable media, implemented in any method or technology for storage of information, such as computer-readable instructions, data structures, program modules or other data. The term "computer storage media" includes, but is not limited to, RAM, ROM, EEPROM, FLASH memory or other memory technology, CD, DVD, or other optical storage, magnetic cassettes, magnetic tape, magnetic disk storage or other magnetic storage devices, or any other media which can be used to store computer-intelligible information and which can be accessed by the computation resource 2302.

Communication media typically embodies computer-readable instructions, data structures, program modules.

By way of example, and not limitation, communication media include wired media, such as wired network or direct-wired connections, and wireless media, such as acoustic, RF, infrared and other wireless media. The scope of the term computer-readable media includes combinations of any of the above.

More specifically, in the computer-readable program implementation, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in general computer environment 2100 in FIG. 23, or on at least as many computers as there are components.

Figure 24:
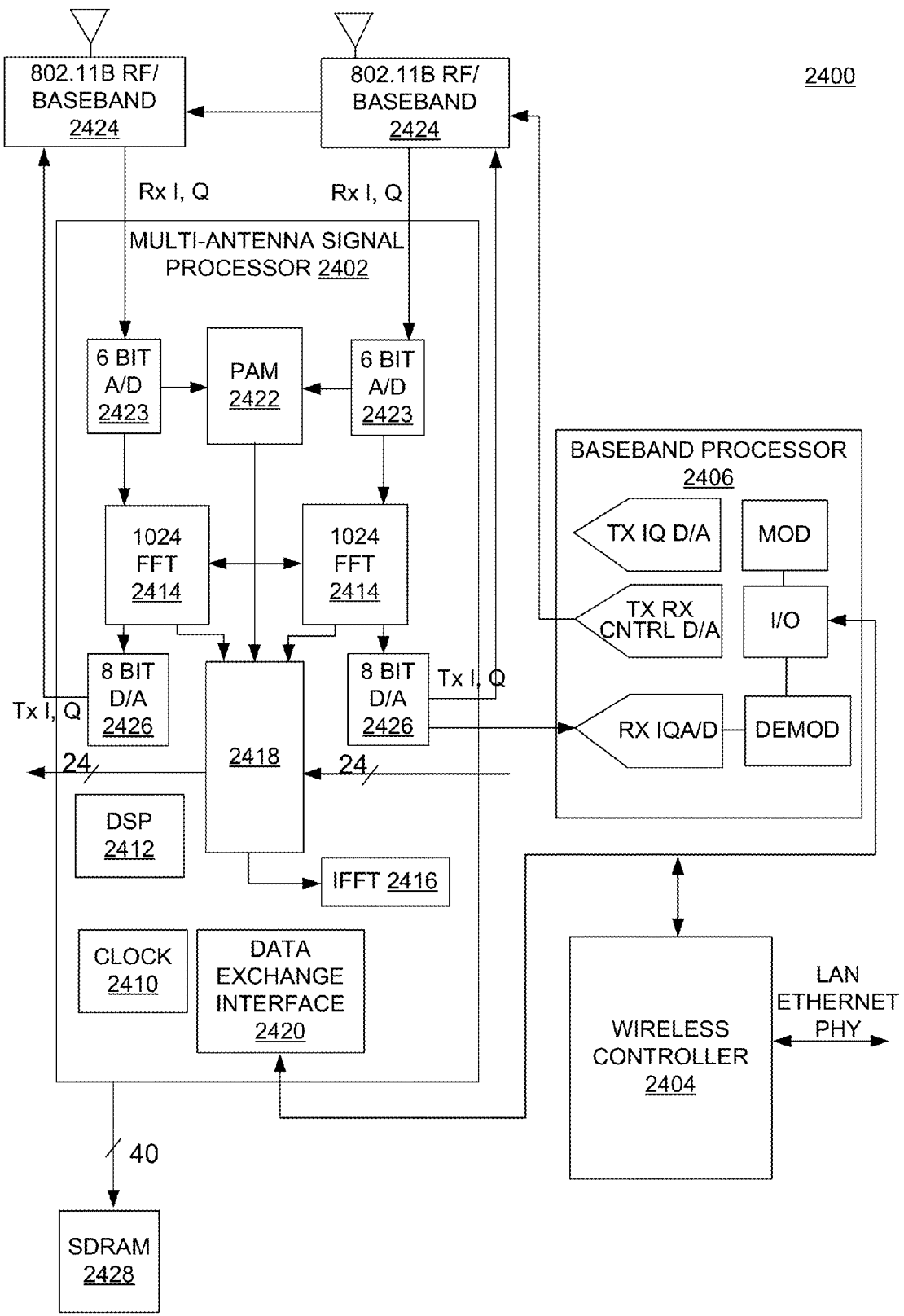
FIG. 24 is a block diagram of a Wi-Fi access point, according to an implementation.

FIG. 24 is a block diagram of a Wi-Fi access point 2400, according to an implementation. The Wi-Fi access point 2400 is one example of the shared Wi-Fi access point 104 in FIG. 1. The Wi-Fi access point 2400 includes a multi-antenna signal processor 2402, a wireless media access controller 2404 and a baseband processor 2406, which can be incorporated as part of a single chip integrated circuit. In some implementations, can include a clock generator 2410 which generates a set of clocks for all internal modules from a 44 MHz master clock, a SDRAM buffer interface address generator in a DSP 2412 a 22 mhz three 1024-point FFT switchable circuit 2414 operable to transform received signal samples of multiple RF to the frequency domain using FFT, a 22 mhz three 1024-point IFFT switchable circuit 2416 operable to reconstruct a received signal in the time domain, a separation matrix multiplier 2418 operable to separate signals, an on chip parameter memory bank, an inter-chip data exchange interface 2420 which controls software access to internal registers as well as reading/writing of signaling messages, a digital signal processor interface, a preamble acquisition module (sync-circuit) 2422 operable to acquire timing of the received signal samples relative to a local PN code in a PLCP preamble, synchronize the signal samples to FFT frame, and use the known FFT of a preamble to estimate RF channels, four Gbit 22 MHz A/D 2423 performs A/D conversion for 1 and Q baseband signals received from RF/Baseband front end circuits 2424, and four 8 bit 44 MHz D/A 2426 operable to convert the recovered signal to an analog form and sending it out to a standard 802.11b DSSS receiver for decoding.

The general purpose DSP 2456, which, in combination with SDRAM 2428 and D/A blocks 2426 and other elements of ASIC 2402 performs the following basic operations: Framing of the information bit stream to be transmitted; symbol mapping/encoding of the bits in a transmit frame, scrambling the transmitted data to be transmitted, modulating transmission symbols with Baker or CCK codes necessary for spreading the spectrum of the transmitted data and pre-equalizing the generated waveforms in a frequency domain.

Webpages in FIG. 25-37 are served by a NGN, such as NGN 110 in FIG. 1. Any device, such as computer 2300 or mobile device 1900 is operable to receive and render (display) the webpages in FIG. 25-37 through a browser.

FIG. 25 illustrates a webpage 2500 that supports registration of Users of mobile devices, according to an implementation. The webpage 2500 receives a user name in field 2502 and a password in field 2504 that is entered by an operator of the device and when a 'log in' button 2506 is clicked by the operator, the user name and password is transmitted to the NGN for authentication.

Figure 26:
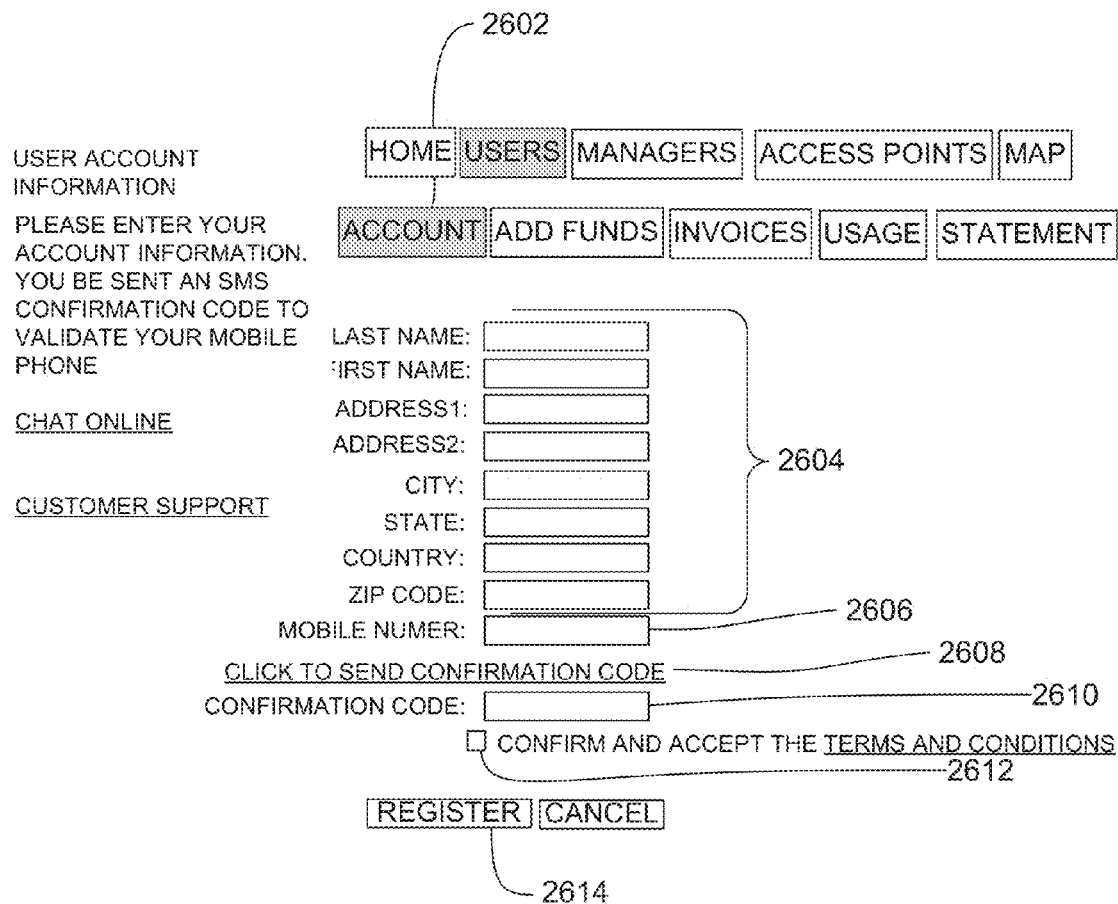
FIG. 26 illustrates a webpage that supports User account information for Registration, according to an implementation.

FIG. 26 illustrates a webpage 2600 that supports user account information for registration, according to an implementation. When a user selects "account" 2602 webpage 2600 receives contact information in a number of fields 2604 and the phone number of a mobile device in field 2606 of the "user name". When the "click to send confirmation code" 2608 is clicked by an operator, the NGN receives a HTTP message to send a confirmation code to the phone number in field 2606 and the NGN sends a confirmation code to the phone number in field 2606. Webpage 2600 receives the confirmation code in field 2610 and when the operator selects a "confirmation" radio button 2612 and clicks a "register" button 2614, the confirmation code in field 2610 and the other fields 2604, 2606 are transmitted to the NGN for registration of the user.

FIG. 27 illustrates a webpage 2700 that supports adding funds to User Accounts, according to an implementation. When a user selects "add funds" webpage 2700 displays a current account balance of the "user name" in field 2704 and webpage 2700 receives a payment amount in field 2706 and a method of payment is selected by the user. In one implementation, third party payment services over the Internet may be selected, or amount directly charged to a debit/credit card. The payment amount is then transmitted to the NGN via the Internet.

Figure 28:
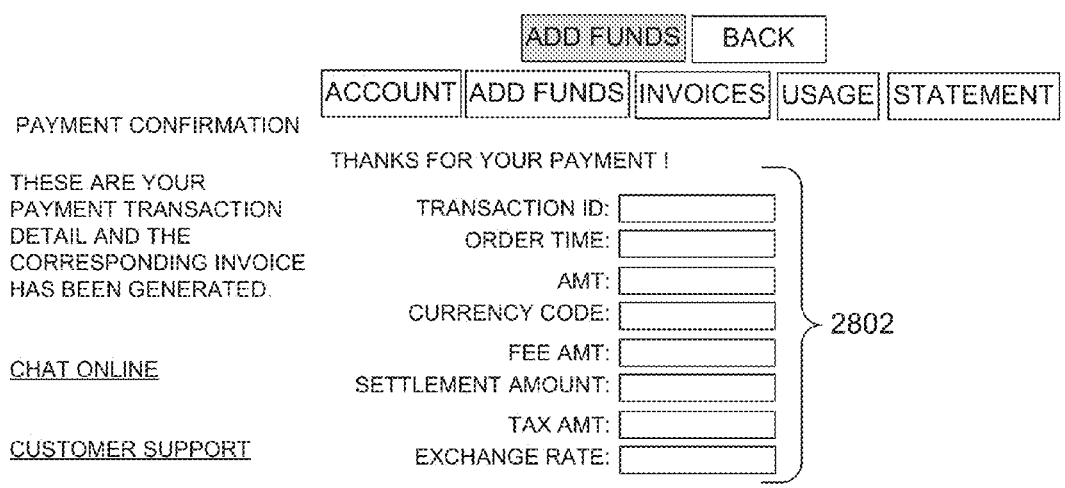
FIG. 28 illustrates a webpage that supports adding funds using Paypal®, according to an implementation.

FIG. 28 illustrates a webpage 2800 that supports adding funds using Paypal®, according to an implementation. After the data of fields in webpage 2700 is received by the NGN, the NGN processes the payment described in the data fields in webpage 2700 and presents webpage 2800. Webpage 2800 displays a number of fields 2802 describing the processed payment.

Figure 29:
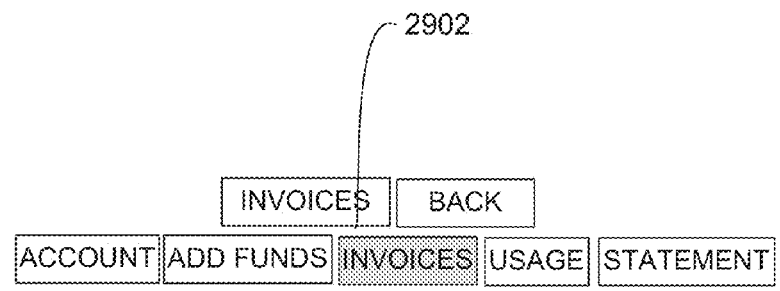
FIG. 29 illustrates a webpage that supports Users may also consult invoices, mobile data usage, and account statement, according to an implementation.

FIG. 29 illustrates a webpage 2900 that supports Users may also consult invoices, mobile data usage, and account statement, according to an implementation. When an operator selects "invoices" 2902, webpage 2900 presents a list of pending and/or historical invoices 2904. Each item in the list 2904 includes a hyperlink 2906 that when selected will cause the NGN to display detailed information on the invoice.

Figure 30:
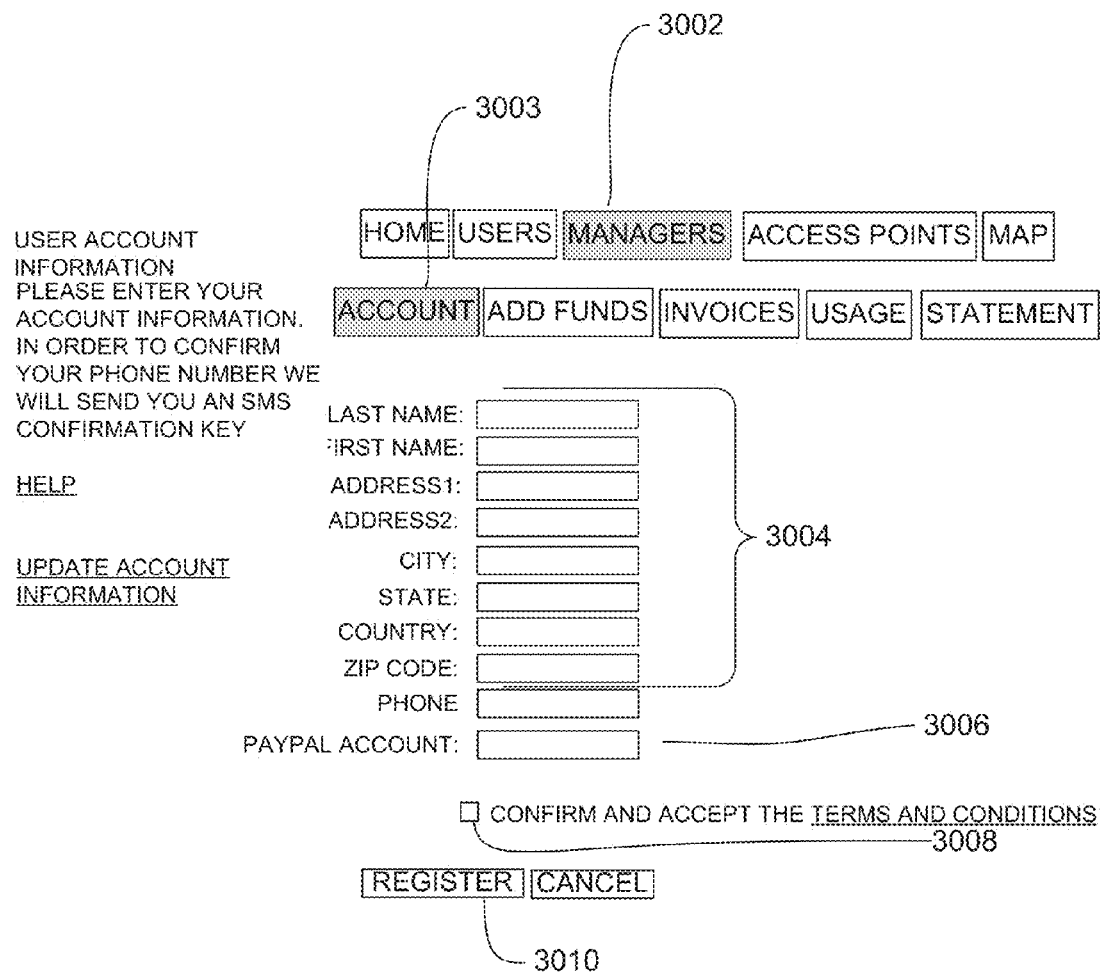
FIG. 30 illustrates a webpage that supports Wi-Fi AP Owner (Manager) registration, according to an implementation.

FIG. 30 illustrates a webpage 3000 that supports Wi-Fi AP Owner (Manager) registration, according to an implementation. When an operator is logged-in as the Wi-Fi AP Owner (Manager) 3002, and when the operator selects "account" 3303 the webpage 3000 receives contact information in a number of fields 3004 and a PayPal® account number in field 3006 of the Wi-Fi AP Owner (Manager). When the operator selects a "confirmation" check box or radio button 3008 and clicks a "register" button 3010, the contact information in a number of fields 3004 and PayPal® account number in field 3006 are transmitted to the NGN for registration of the Wi-Fi AP Owner (Manager).

Figure 31:
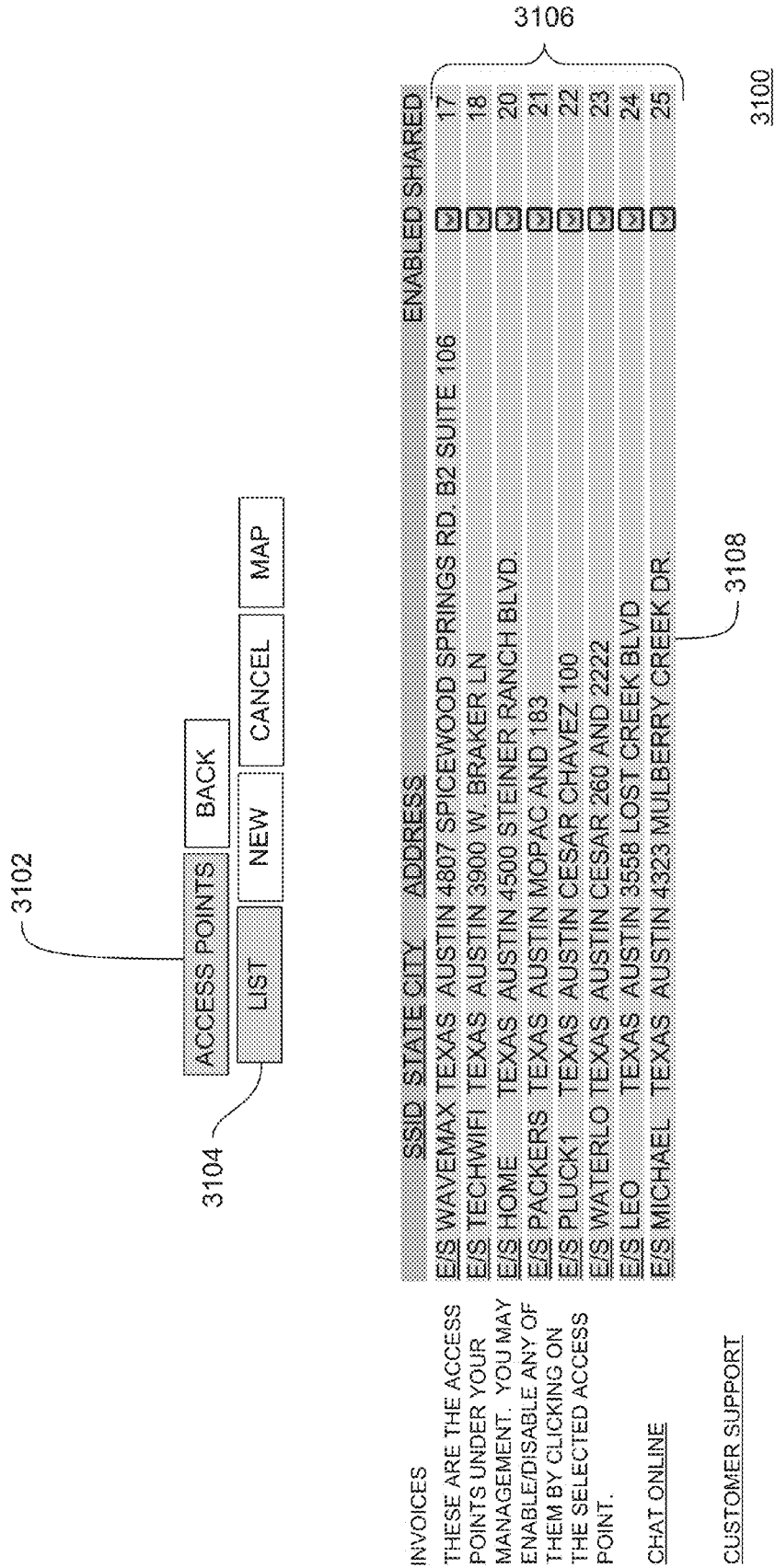
FIG. 31 illustrates a webpage that supports listing Wi-Fi APs owned by manager, according to an implementation.

FIG. 31 illustrates a webpage 3100 that supports listing Wi-Fi APs owned by manager, according to an implementation. When an operator is logged-in as the Wi-Fi AP Owner (Manager), and when the operator selects "access points" 3102 and then selects "list", webpage 3100 presents a list 3106 of access points that are associated with the Wi-Fi AP Owner (Manager). Each item in the list 3106 includes a hyperlink 3108 that when selected will cause the NGN to display detailed information on the access point.

Figure 32:
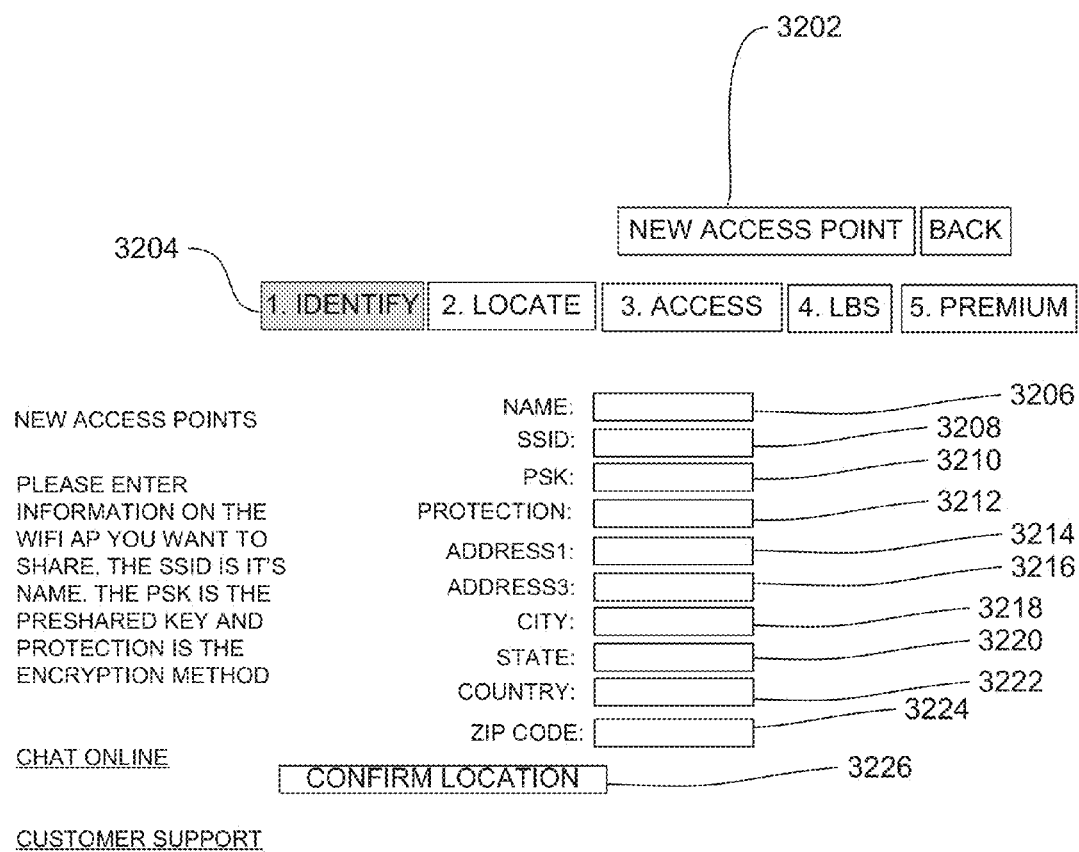
FIG. 32 illustrates a webpage that supports registering new Wi-Fi Aps owned by manager, according to an implementation.

FIG. 32 illustrates a webpage 3200 that supports registering new Wi-Fi Aps owned by manager, according to an implementation. When an operator is logged-in as the Wi-Fi AP Owner (Manager), and when the operator selects "new access point" 3202 and then selects "identify", webpage 3200 receives the name, SSID, PSK, protection, address, city, state, nation, and zipcode of a newly enter access point in fields 3206, 3208, 3210, 3212, 3214, 3216, 3218, 3220 and 3224, respectively. When the operator selects a "confirm location" check box or radio button 3226, the data in fields 3206, 3208, 3210, 3212, 3214, 3216, 3218, 3220 and 3224 are transmitted to the NGN for registration of the access point in regards to the Wi-Fi AP Owner (Manager).

Figure 33:
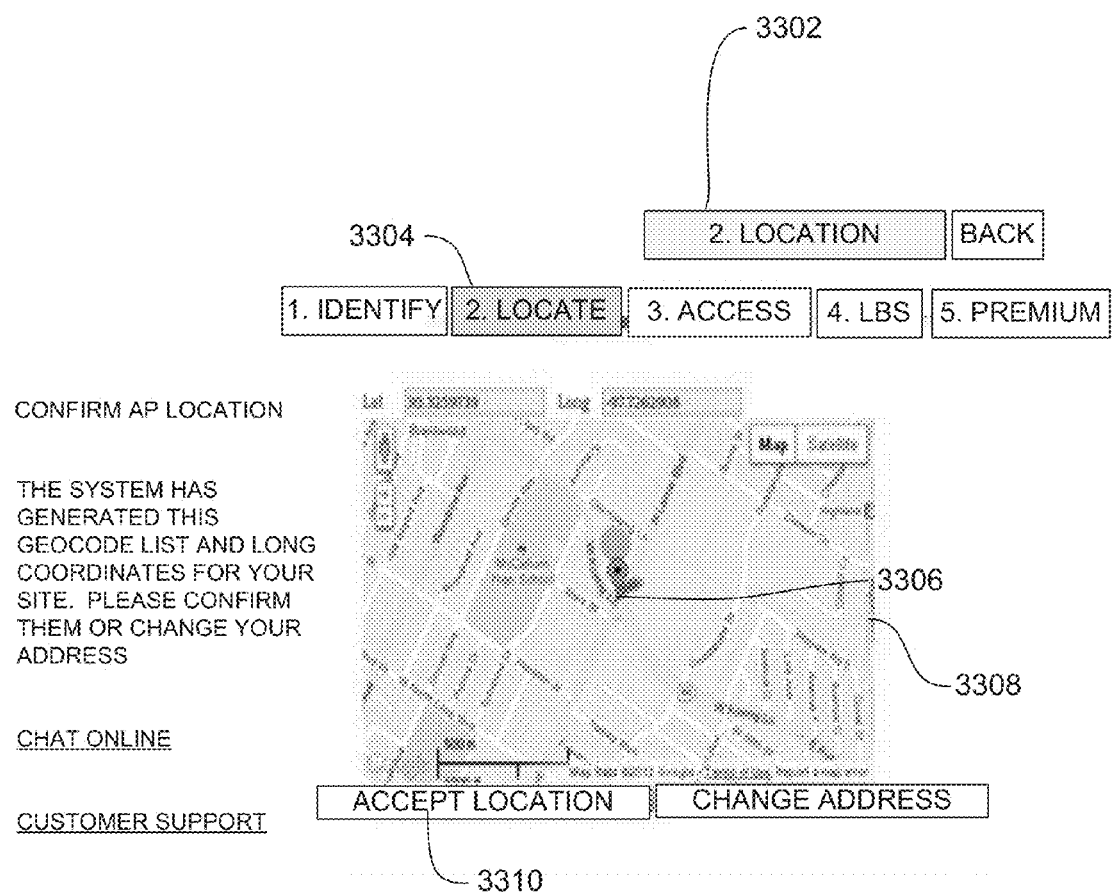
FIG. 33 illustrates a webpage that supports confirming location of new Wi-Fi AP, according to an implementation.

FIG. 33 illustrates a webpage 3300 that supports confirming location of new Wi-Fi AP, according to an implementation. When an operator is logged-in as a Wi-Fi AP Owner (Manager), and when the operator selects "location" 3302 and then selects "locate" 3304, webpage 3300 receives a mouse click that is associated with a location 3306 on a map 3308. When the operator selects a "accept location" button 3310, the location 3306 is transmitted to the NGN for location of the access point in regards to the Wi-Fi AP Owner (Manager).

FIG. 34 illustrates a webpage 3400 that supports configuring Wi-Fi AP accessibility, according to an implementation.

When an operator is logged-in as a Wi-Fi AP Owner (Manager), and when the operator selects "accessibility" 3402 and then selects "access" 3404, webpage 3400 receives data in a number of fields 3406 that describe times and days of weeks of shared accessibility of the access point. When the operator selects a "accept and continue" check box or radio button 3408, the data in fields 3406 are transmitted to the NGN for registration of the access point in regards to the Wi-Fi AP Owner (Manager).

Figure 35:
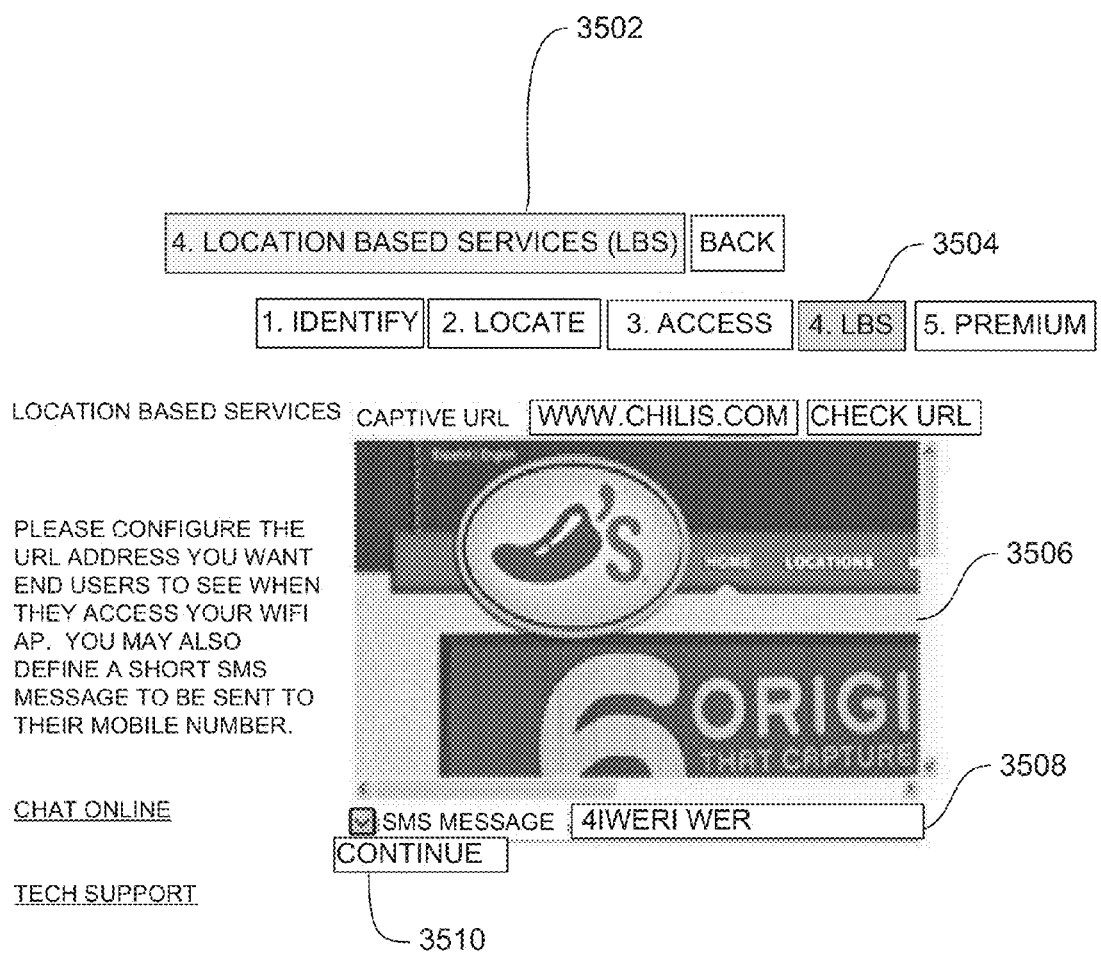
FIG. 35 illustrates a webpage that supports defining Wi-Fi AP location based services, according to an implementation.

FIG. 35 illustrates a webpage 3500 that supports defining Wi-Fi AP location based services (LBS), according to an implementation. When an operator is logged-in as a Wi-Fi AP Owner (Manager), and when the operator selects "location based services" 3502 and then selects "LBS" 3504, webpage 3500 receives an Internet address (URL) in a field 3506, an image 3508 (such an advertisement or other location based communication) and a SMS message text 3510. When the operator selects a "continue" button 3512, the data in fields 3506, 3508 and 3510 are transmitted to the NGN for registration of the access point in regards to the Wi-Fi AP Owner (Manager).

Figure 36:
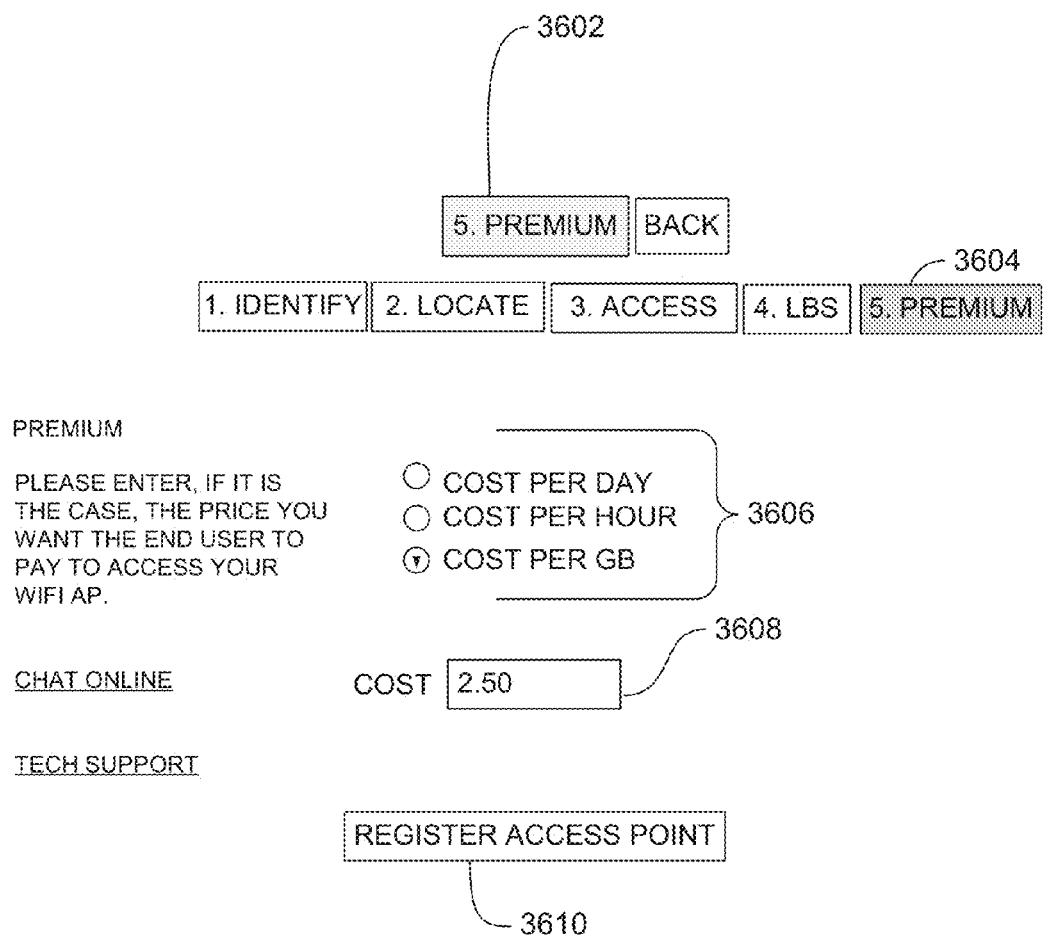
FIG. 36 illustrates a webpage that supports defining premium costs for Wi-Fi AP data usage, according to an implementation.

FIG. 36 illustrates a webpage 3600 that supports defining premium costs for Wi-Fi AP data usage, according to an implementation. When an operator is logged-in as a Wi-Fi AP Owner (Manager), and when the operator selects "premium" 3602 and then selects "premium" 3604, webpage 3600 receives one of plurality of mutually exclusive radio buttons or check boxes of fields 3606 of usage accounting metrics and a field 3608 of the cost in relation to the usage accounting metric 3606. When the operator selects a "register" button 3608, the data in fields 3606, 3608 and 3610 are transmitted to the NGN for registration of the access point in regards to the Wi-Fi AP Owner (Manager).

Figure 37:
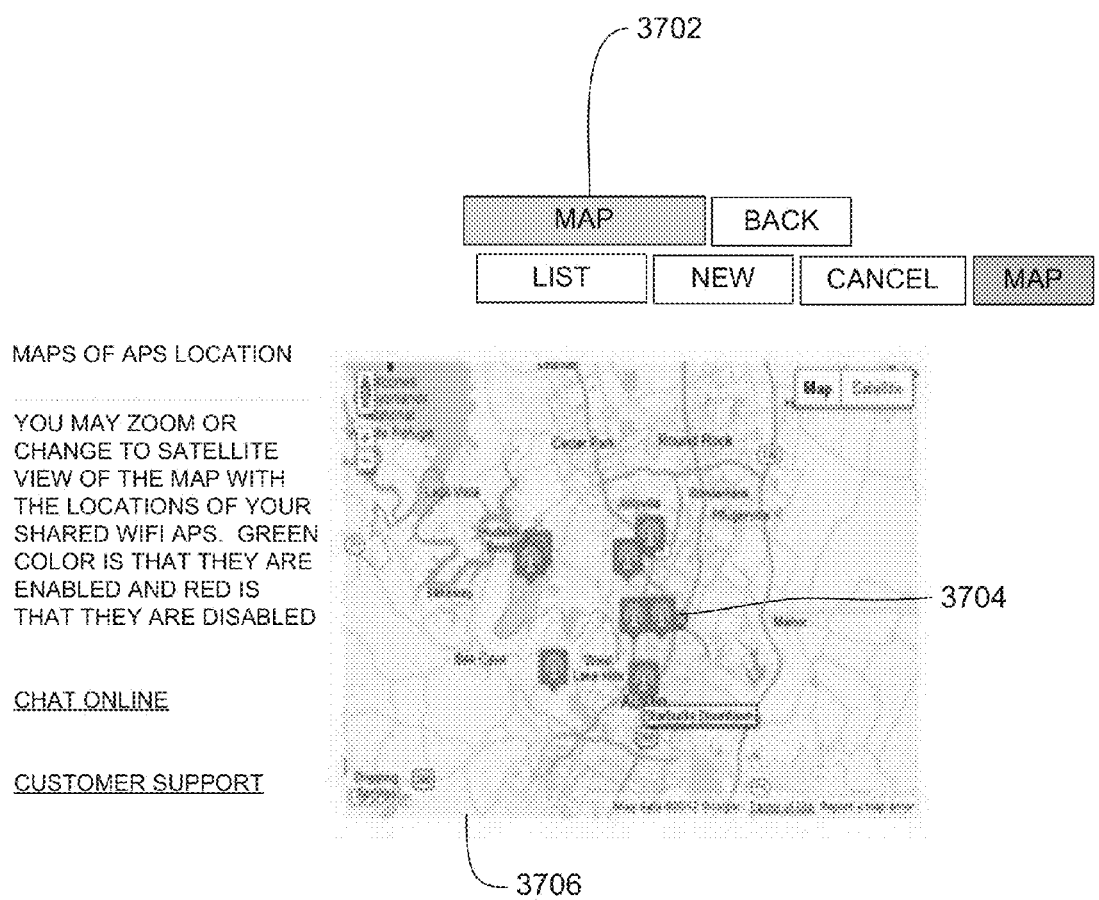
FIG. 37 illustrates a webpage that supports mapping all Wi-Fi APs that a Manager is sharing, according to an implementation.

FIG. 37 illustrates a webpage 3700 that supports mapping all Wi-Fi APs that a manager is sharing, according to an implementation. When an operator is logged-in as a Wi-Fi AP Owner (Manager), and when the operator selects "map" 3702, webpage 3700 an icon for each of one or more access point(s) 3704 on a map 3706.

Figure 38:
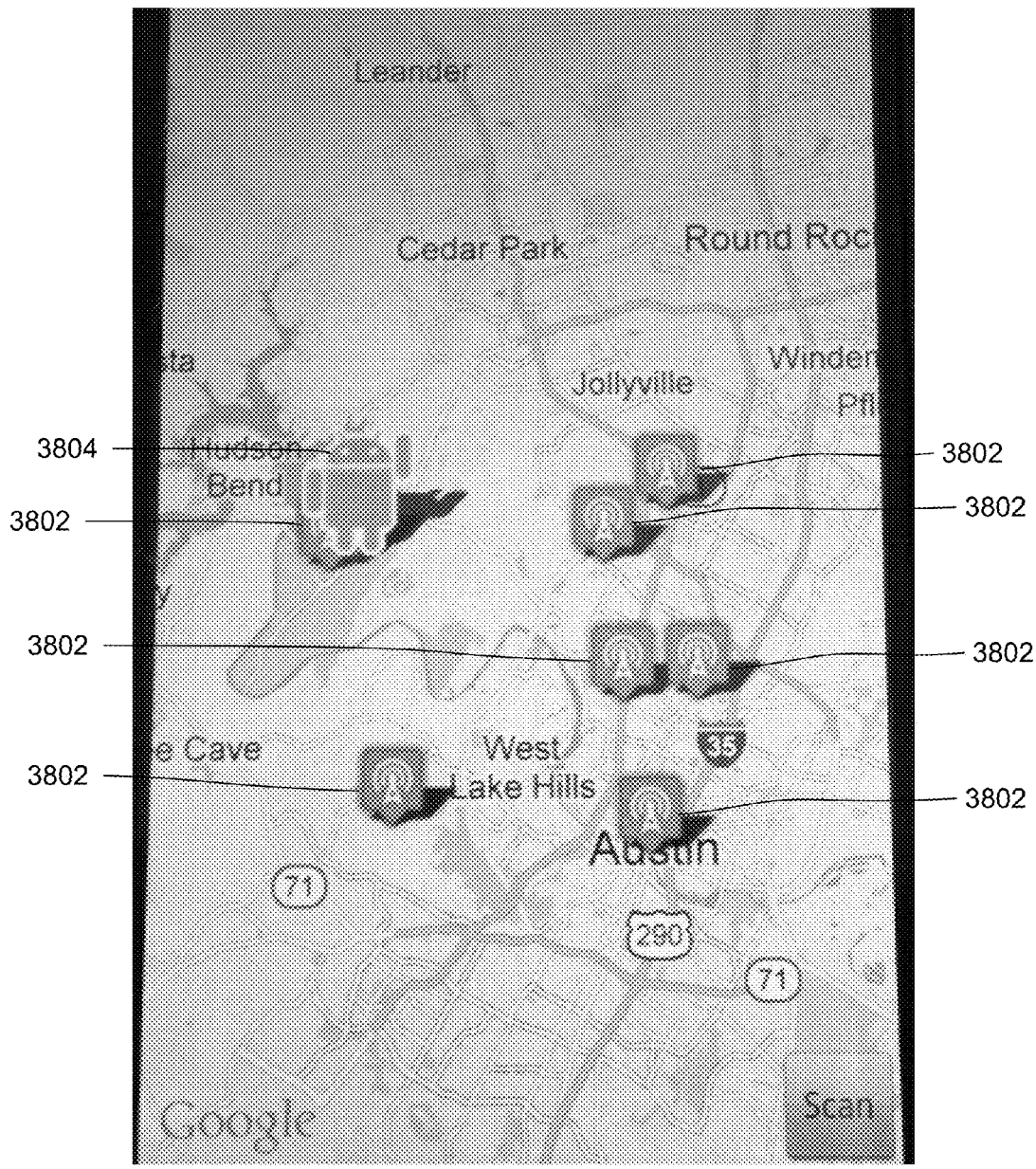
FIG. 38 illustrates a webpage that supports mapping Wi-Fi APs that are within proximity of a mobile device, according to an implementation.

FIG. 38 illustrates a webpage 3800 that supports mapping Wi-Fi Aps that are within proximity of a mobile device, according to an implementation. The webpage 3800 displays a downloaded map of shared Wi-Fi access points that are within proximity of the mobile device. The proximity is based on the location of the shared Wi-Fi access points that is within a distance of the location of the mobile device. The center of the map is about the center of the location of the shared Wi-Fi access points. The location of each of the shared Wi-Fi access points are represented on the map with an icon 3802. The location of the mobile device is represented by an icon 3804.

Figure 39:
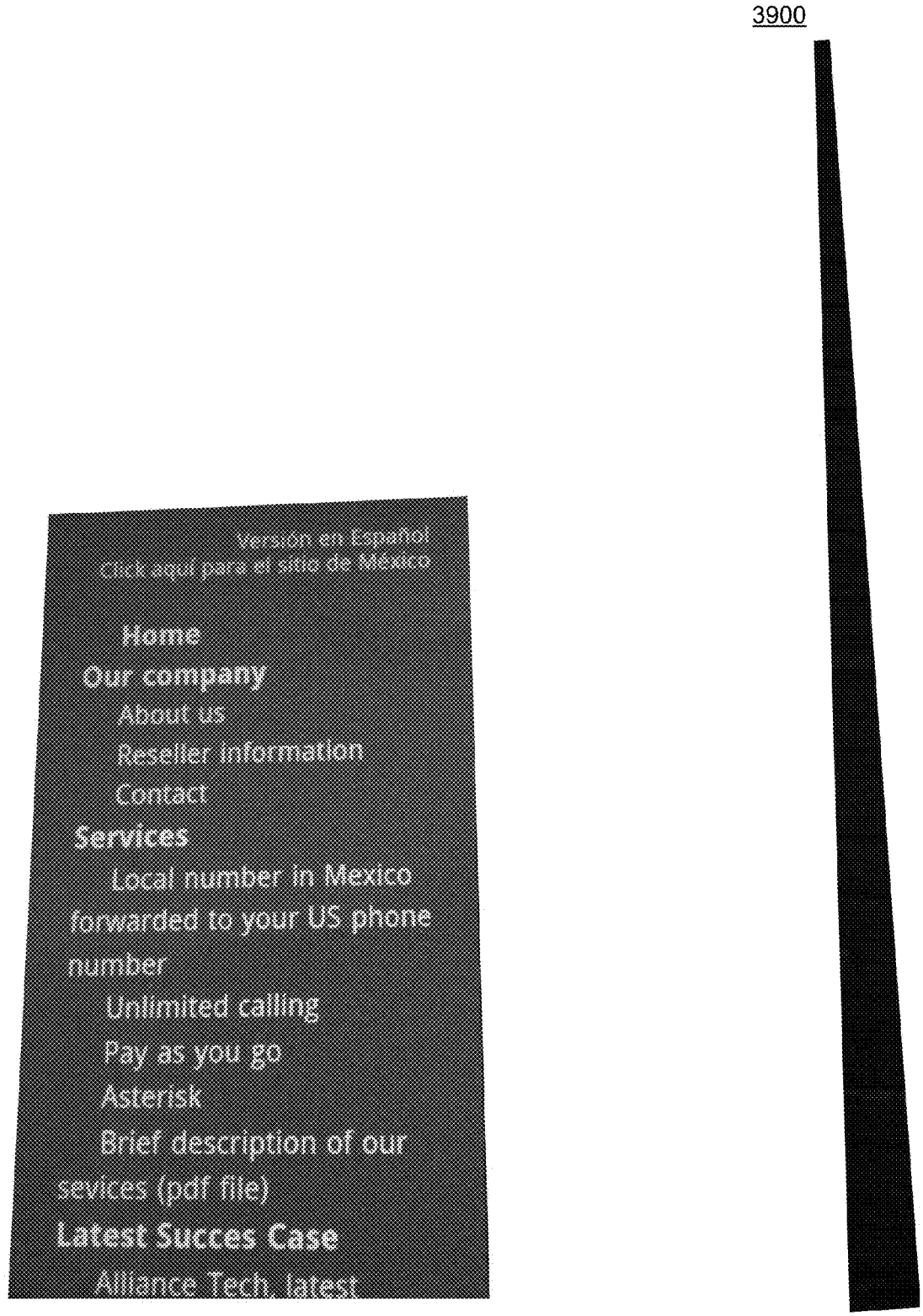
FIG. 39 illustrates a webpage that supports display of a location based communication, according to an implementation.

FIG. 39 illustrates a webpage 3900 that supports display of a location based communication, according to an implementation. The location based communication is an advertisement. In the example shown in FIG. 39, the location based communication is adapted for, and displayed on, a mobile device.

Figure 40:
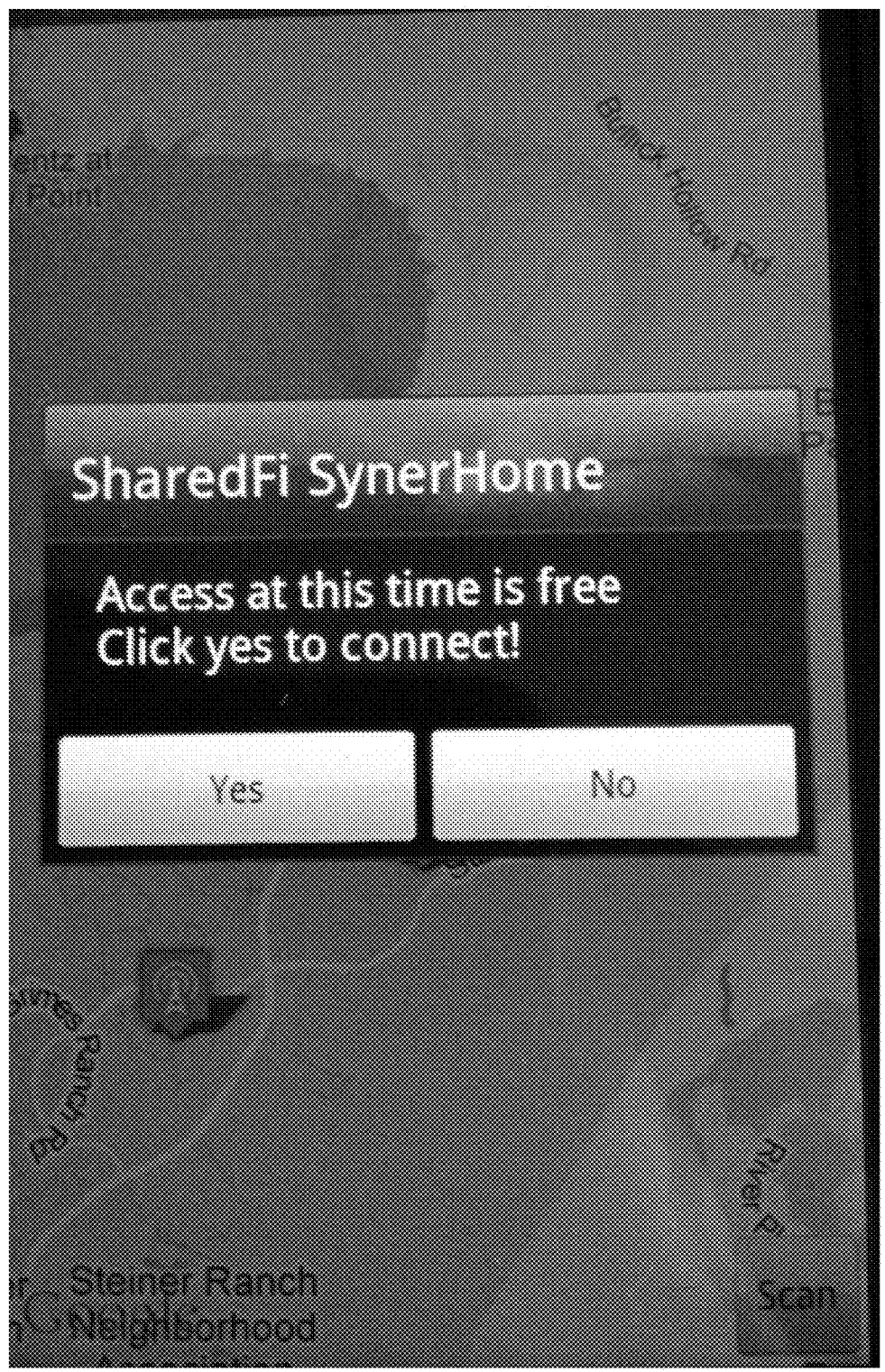
FIG. 40 illustrates a webpage that supports access to a shared Wi-Fi access point on a mobile device, according to an implementation.

FIG. 40 illustrates a webpage 4000 that supports access to a shared Wi-Fi access point on a mobile device; according to an implementation. Webpage 4000 is displayed when an operator of a mobile device selects a shared Wi-Fi access point, such as clicking on an icon 3802 in FIG. 38 that represents a shared Wi-Fi access point.

CONCLUSION

A cloud-based system to share secure, protected Wi-Fi access points is described. A technical effect of the cloud-based system to share locked, protected Wi-Fi access points is sharing of preshared keys of the secure, protected Wi-Fi access points that enables access to the secure, protected Wi-Fi access points to be shared. The disclosure herein describes in some implementations mobile data offload with QoS and security for mobile operators, carriers, cable companies. Although specific implementations have been illustrated and described herein, it will be appreciated by those of ordinary skill in the art that any arrangement which is calculated to achieve the same purpose may be substituted for the specific implementations shown. This disclosure is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit implementations. Furthermore, additional methods and apparatus can be added to the components, functions can be rearranged among the components, and new components to correspond to future enhancements and physical devices used in implementations can be introduced without departing from the scope of implementations. One of skill in the art will readily recognize that implementations are applicable to future communication devices, different file systems, and new data types.

The terminology used in this application is meant to include all wireless mobile devices, Wi-Fi access points and communication environments and alternate technologies which provide the same functionality as described herein.

The invention claimed is:

1. A method of communication by a next-generation network with a mobile device, with a 3G/4G network and with a shared Wi-Fi access point, the method comprising:
   receiving from the mobile device via the 3G/4G network a request for a list of shared SSIDs, the request including GPS coordinates of the mobile device, a user ID and a password;
   generating the list of shared SSIDs and a list of corresponding preshared secret keys in a one-for-one correspondence between the shared SSIDs and corresponding preshared secret keys; wherein the shared SSIDs are in a vicinity of the mobile device based on the GPS coordinates;
   transmitting the list of shared SSIDs and the corresponding preshared secret keys to the 3G/4G network; and
   accounting data usage of a 802.11 wireless session between the mobile device and the shared Wi-Fi access point,
   wherein the accounting data usage of the 802.11 wireless session between the mobile device and the shared Wi-Fi access point further comprises:
      receiving from the mobile device via the shared Wi-Fi access point a usage start-accounting message;
      receiving from the mobile device via the shared Wi-Fi access point a usage interim accounting message; and
      receiving from the mobile device via the shared Wi-Fi access point a usage end-accounting message.

2. The method of claim 1 further comprising:
registering the mobile device.

3. The method of claim 1 further comprising:
registering the shared Wi-Fi access point.

4. The method of claim 1 further comprising:
registering the mobile device; and
registering the shared Wi-Fi access point.

5. The method of claim 4, wherein registering the shared Wi-Fi access point is performed after the registering the mobile device.

6. The method of claim 1 wherein the method further comprises:
transmitting a location based service communication via the 3G/4G network.

7. A method of communication by a next-generation network with a mobile device, with a 3G/4G network and with a shared Wi-Fi access point, the method comprising:
receiving from the mobile device via the 3G/4G network a request for a list of shared SSIDs, the request including GPS coordinates of the mobile device, a user ID and a password;
generating the list of shared SSIDs and corresponding preshared secret keys in a one-for-one correspondence between the shared SSIDs and corresponding preshared secret keys in a vicinity of the mobile device based on the GPS coordinates;
transmitting the list of shared SSIDs and the corresponding preshared secret keys to the 3G/4G network,
receiving from the mobile device via the shared Wi-Fi access point a usage start-accounting message;
starting accounting a 802.11 wireless session between the mobile device and the shared Wi-Fi access point;
receiving from the mobile device via the shared Wi-Fi access point a usage interim accounting message; and
receiving from the mobile device via the shared Wi-Fi access point a usage end-accounting message.

8. The method of claim 7 further comprising:
registering the mobile device; and
registering the shared Wi-Fi access point.

9. The method of claim 8, wherein registering the shared Wi-Fi access point is performed after the registering the mobile device.

10. The method of claim 7 further comprising:
transmitting a location based service communication via the 3G/4G network.

11. A method of communication by a next-generation network with a mobile device, with a 3G/4G network and with a shared Wi-Fi access point, the method comprising:
registering the shared Wi-Fi access point;
registering the mobile device;
receiving from the mobile device via the 3G/4G network a request for a list of shared SSIDs, the request including GPS coordinates of the mobile device, a user ID and a password;
generating the list of shared SSIDs and corresponding preshared secret keys in a one-for-one correspondence between the shared SSIDs and corresponding preshared secret keys in a vicinity of the mobile device based on the GPS coordinates;
transmitting the list of shared SSIDs and the corresponding preshared secret keys to the 3G/4G network,
receiving from the mobile device via the shared Wi-Fi access point a usage start-accounting message;
starting accounting a 802.11 wireless session between the mobile device and the shared Wi-Fi access point;
receiving from the mobile device via the shared Wi-Fi access point a usage interim accounting message; and
receiving from the mobile device via the shared Wi-Fi access point a usage end-accounting message.

12. The method of claim 11, wherein registering the shared Wi-Fi access point is performed after the registering of the mobile device.

13. The method of claim 11 further comprising:
transmitting a location based service communication via the 3G/4G network.

14. An apparatus of communication between a mobile device, a 3G/4G network and a shared Wi-Fi access point, the apparatus comprising:
a receiver of a request for a list of shared SSIDs from the mobile device via the 3G/4G network, the request including GPS coordinates of the mobile device, a user ID and a password;
a transmitter of the list of shared SSIDs and corresponding preshared secret keys to the 3G/4G network, the transmitter operably coupled to the receiver, and
a data usage tracker of a 802.11 wireless session between the mobile device and the shared Wi-Fi access point, the data usage tracker operably coupled to the transmitter.

15. The apparatus of claim 14, further comprising:
a generator of the list of shared SSIDs and corresponding preshared secret keys in a one-for-one correspondence between the shared SSIDs and corresponding preshared secret keys in a vicinity of the mobile device based on the GPS coordinates, the generator operably coupled to the receiver.

16. The apparatus of claim 14, further comprising:
a registrar of the shared Wi-Fi access point, the registrar operably coupled to the transmitter; and
a registrar of the mobile device, wherein the registrar of the of the mobile device operably coupled to the transmitter.

17. The apparatus of claim 16, wherein the shared Wi-Fi access point is registered after the mobile device.

18. The apparatus of claim 14, further comprising:
a transmitter of a location based service communication via the 3G/4G network.

19. The apparatus of claim 18 further comprising:
a receiver of a usage start accounting message;
an initiator of accounting of the 802.11 wireless session between the mobile device and the shared Wi-Fi access point;
a receiver of a usage interim accounting message; and
a receiver of a usage end-accounting message.

20. The apparatus of claim 18, wherein the location based service communication further comprises:
an advertisement that is related to a GPS locale of the mobile device.

* * * * *